US011072356B2

(12) United States Patent
Mong et al.

(10) Patent No.: US 11,072,356 B2
(45) Date of Patent: *Jul. 27, 2021

(54) VEHICLE CONTROL SYSTEM

(71) Applicant: Transportation IP Holdings, LLC, Norwalk, CT (US)

(72) Inventors: Tab Robert Mong, Erie, PA (US); Stephen Francis Bush, Niskayuna, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,831

(22) Filed: Apr. 20, 2018

(65) Prior Publication Data
US 2018/0237039 A1  Aug. 23, 2018

Related U.S. Application Data

(63) Continuation-in-part of application No. 15/671,204, filed on Aug. 8, 2017, and a continuation-in-part of
(Continued)

(51) Int. Cl.
*H04L 29/08* (2006.01)
*B61L 15/00* (2006.01)
(Continued)

(52) U.S. Cl.
CPC ....... *B61L 15/0072* (2013.01); *B61L 15/0036* (2013.01); *B61L 15/0081* (2013.01);
(Continued)

(58) Field of Classification Search
None
See application file for complete search history.

(56) References Cited

U.S. PATENT DOCUMENTS 5,741,898 A   4/1998  Hanley
6,225,776 B1  5/2001  Chai
(Continued)

FOREIGN PATENT DOCUMENTS

CN   103166975 A1   6/2013
CN   103731504 A1   4/2014
(Continued)

OTHER PUBLICATIONS

Philipp Meyer, Extending IEEE 802.1 AVB with Time-triggered Scheduling: A Simulation Study of the Coexistence of Synchronous and Asynchronous Traffic, Dec. 2013,IEEE, pp. 47-54 (Year: 2013).*
(Continued)

*Primary Examiner* — Kouroush Mohebbi
(74) *Attorney, Agent, or Firm* — Josef L. Hoffmann; The Small Patent Law Group

(57) ABSTRACT

A locomotive control system includes a controller configured to control communication between or among plural locomotive devices that control movement of a locomotive via a network that communicatively couples the vehicle devices. The controller also is configured to control the communication using a data distribution service (DDS) and with the network operating as a time sensitive network (TSN). The controller is configured to direct a first set of the locomotive devices to communicate using time sensitive communications, a different, second set of the locomotive devices to communicate using best effort communications, and a different, third set of the locomotive devices to communicate using rate constrained communications.

24 Claims, 34 Drawing Sheets

Related U.S. Application Data application No. 15/199,368, filed on Jun. 30, 2016, now Pat. No. 10,524,025, and a continuation-in-part of application No. 15/485,982, filed on Apr. 12, 2017, now Pat. No. 10,447,606, and a continuation-in-part of application No. 15/485,946, filed on Apr. 12, 2017, now Pat. No. 10,218,628, and a continuation-in-part of application No. 15/835,056, filed on Dec. 7, 2017, now Pat. No. 10,511,403, and a continuation-in-part of application No. 15/833,732, filed on Dec. 6, 2017, now Pat. No. 10,819,462.

(60) Provisional application No. 62/396,487, filed on Sep. 19, 2016, provisional application No. 62/575,719, filed on Oct. 23, 2017, provisional application No. 62/646,189, filed on Mar. 21, 2018.

(51) Int. Cl.
- *B61L 23/00* (2006.01)
- *H04L 29/06* (2006.01)
- *H04L 12/54* (2013.01)
- *H04L 12/723* (2013.01)
- *H04L 12/801* (2013.01)
- *H04L 12/851* (2013.01)

(52) U.S. Cl.
CPC ............ *B61L 23/005* (2013.01); *H04L 65/80* (2013.01); *H04L 67/12* (2013.01); *H04L 67/322* (2013.01); *H04L 12/56* (2013.01); *H04L 45/50* (2013.01); *H04L 47/11* (2013.01); *H04L 47/2433* (2013.01)

(56) References Cited

U.S. PATENT DOCUMENTS

| | | |
|---|---|---|
| 6,603,857 B1 | 8/2003 | Batten-Carew |
| 6,658,485 B1 | 12/2003 | Baber |
| 7,002,977 B1 | 2/2006 | Jogalekar |
| 7,068,790 B1 | 6/2006 | Elliott |
| 7,093,256 B2 | 8/2006 | Bloks |
| 7,142,536 B1 | 11/2006 | Gossett |
| 7,149,187 B1 | 12/2006 | Jacobson |
| 7,260,102 B2 | 8/2007 | Mehrvar |
| 7,289,514 B2 | 10/2007 | Robotham |
| 7,339,948 B2 | 3/2008 | Balasubramanian |
| 7,374,647 B2 | 5/2008 | Mundheim |
| 7,460,670 B1 | 12/2008 | Elliott |
| 7,519,076 B2 | 4/2009 | Janssen |
| 7,533,128 B1 | 5/2009 | Sanchez |
| 7,548,512 B2 | 6/2009 | Sexton |
| 7,553,415 B2 | 6/2009 | Stoehr |
| 7,572,858 B2 | 8/2009 | Wang |
| 7,577,996 B1 | 8/2009 | Merchant |
| 7,590,151 B2 | 9/2009 | Middleton |
| 7,602,710 B2 | 10/2009 | Grippo |
| 7,627,453 B2 | 12/2009 | Keefe |
| 7,675,919 B2 | 3/2010 | Vestal |
| 7,720,013 B1 | 5/2010 | Kelliher |
| 7,747,735 B1 | 6/2010 | Kahn |
| 7,773,360 B2 | 8/2010 | O'Leary |
| 7,852,879 B2 | 12/2010 | Arnold |
| 7,900,321 B2 | 3/2011 | Fitz |
| 7,917,624 B2 | 3/2011 | Gidwani |
| 7,933,228 B2 | 4/2011 | Coley |
| 7,936,770 B1 | 5/2011 | Frattura |
| 7,970,014 B2 | 6/2011 | Voith |
| 8,064,482 B2 | 11/2011 | Krause |
| 8,150,988 B2 | 4/2012 | Pardo-Castellote |
| 8,255,791 B2 | 8/2012 | Koren |
| 8,340,067 B2 | 12/2012 | Buga |
| 8,345,591 B2 | 1/2013 | MacInnis |
| 8,386,078 B1 | 2/2013 | Hickman |
| 8,509,953 B2 | 8/2013 | Taft |
| 8,526,621 B2 | 9/2013 | Rabin |
| 8,650,270 B2 | 2/2014 | Gerovac |
| 8,665,900 B2 | 3/2014 | Rabie |
| 8,671,135 B1 | 5/2014 | Joshi |
| 8,817,623 B2 | 8/2014 | Gupta |
| 8,842,534 B2 | 9/2014 | Hahn |
| 8,874,686 B2 | 10/2014 | Jun |
| 8,929,217 B2 | 1/2015 | Torres |
| 9,015,672 B2 | 4/2015 | Dause |
| 9,054,994 B2 | 6/2015 | Rabie |
| 9,246,847 B2 | 1/2016 | Mishra |
| 9,319,332 B2 | 4/2016 | Thubert |
| 9,331,962 B2 | 5/2016 | Lida |
| 9,348,897 B2 | 5/2016 | Shoham |
| 9,429,677 B2 | 8/2016 | AlShaikh |
| 9,456,453 B2 | 9/2016 | Zellner |
| 9,461,821 B1 | 10/2016 | Machani |
| 9,525,617 B2 | 12/2016 | Vasseur |
| 9,740,513 B2 | 8/2017 | Gatherer |
| 9,763,131 B2 | 9/2017 | Han |
| 9,815,203 B1 | 11/2017 | Yunjung |
| 2001/0023445 A1 | 9/2001 | Sundqvist |
| 2002/0095493 A1 | 7/2002 | Byrnes |
| 2002/0097726 A1 | 7/2002 | Garcia-Luna-Aceves |
| 2002/0110245 A1 | 8/2002 | Gruia |
| 2003/0005130 A1 | 1/2003 | Cheng |
| 2003/0007453 A1 | 1/2003 | Ogier |
| 2003/0016630 A1 | 1/2003 | Vega-Garcia |
| 2003/0045285 A1 | 3/2003 | Parkman |
| 2003/0067653 A1 | 4/2003 | Aicklen |
| 2003/0076838 A1 | 4/2003 | Shaio |
| 2003/0177154 A1 | 9/2003 | Vrancic |
| 2004/0130292 A1 | 7/2004 | Buchanan |
| 2005/0036495 A1 | 2/2005 | Wishneusky |
| 2005/0190694 A1 | 9/2005 | Ben-Nun |
| 2005/0198207 A1 | 9/2005 | Hoblit |
| 2005/0251806 A1 | 11/2005 | Auslander |
| 2006/0015615 A1 | 1/2006 | Merle |
| 2006/0104230 A1 | 5/2006 | Gidwani |
| 2006/0104232 A1 | 5/2006 | Gidwani |
| 2007/0041364 A1 | 2/2007 | Kakadia |
| 2007/0042706 A1 | 2/2007 | Ledeczi |
| 2007/0089114 A1 | 4/2007 | MacInnis |
| 2007/0183310 A1 | 8/2007 | Nakamura |
| 2007/0280367 A1 | 12/2007 | Nakao |
| 2008/0077705 A1 | 3/2008 | Li |
| 2008/0084920 A1 | 4/2008 | Okazaki |
| 2008/0109562 A1 | 5/2008 | Ramakrishnan |
| 2008/0112439 A1 | 5/2008 | Vestal |
| 2008/0198814 A1 | 8/2008 | Wengerter |
| 2008/0263647 A1 | 10/2008 | Barnett |
| 2008/0292102 A1 | 11/2008 | Wang |
| 2009/0031008 A1 | 1/2009 | Elliott |
| 2009/0080885 A1 | 3/2009 | Mehrotra |
| 2009/0198814 A1 | 8/2009 | Oono |
| 2010/0017249 A1 | 1/2010 | Fincham |
| 2010/0134067 A1 | 6/2010 | Baxter |
| 2010/0191585 A1 | 7/2010 | Smith |
| 2010/0278177 A1 | 11/2010 | Chase |
| 2011/0038382 A1 | 2/2011 | Peterson |
| 2011/0046837 A1 | 2/2011 | Khosla |
| 2011/0066854 A1 | 3/2011 | Poledna |
| 2011/0133693 A1 | 6/2011 | Lowenthal |
| 2011/0137684 A1 | 6/2011 | Peak |
| 2011/0167147 A1 | 7/2011 | Anderson |
| 2011/0213656 A1 | 9/2011 | Turner |
| 2011/0215758 A1 | 9/2011 | Stahlin |
| 2011/0246252 A1 | 10/2011 | Uesugi |
| 2011/0317587 A1 | 12/2011 | Lida |
| 2012/0018277 A1 | 1/2012 | Masuda |
| 2012/0036569 A1 | 2/2012 | Cottrell |
| 2012/0072380 A1 | 3/2012 | Liu |
| 2012/0078440 A1 | 3/2012 | Oravis |
| 2012/0105001 A1 | 5/2012 | Gallegos |
| 2012/0109515 A1 | 5/2012 | Uyeki |
| 2012/0109519 A1 | 5/2012 | Uyeki |
| 2012/0184277 A1 | 7/2012 | Hiltunen |
| 2013/0003680 A1 | 1/2013 | Yamamoto |

(56) References Cited

U.S. PATENT DOCUMENTS

| | | | |
|---|---|---|---|
| 2013/0041547 | A1 | 2/2013 | Goodermuth |
| 2013/0058217 | A1 | 3/2013 | Smithgall |
| 2013/0073764 | A1 | 3/2013 | Deb |
| 2013/0091170 | A1 | 4/2013 | Zhang |
| 2013/0163584 | A1 | 6/2013 | Jayaraman |
| 2013/0201857 | A1 | 8/2013 | Bharagava |
| 2013/0221919 | A1 | 8/2013 | Gallegos |
| 2013/0223446 | A1 | 8/2013 | Ernstrom |
| 2014/0129060 | A1* | 5/2014 | Cooper ............... G05D 1/0295 701/19 |
| 2014/0160997 | A1 | 6/2014 | Rhee |
| 2014/0173628 | A1 | 6/2014 | Rawakrishnan Nair |
| 2014/0250017 | A1 | 9/2014 | Khan |
| 2014/0341234 | A1 | 11/2014 | Asterjadhi |
| 2015/0019789 | A1 | 1/2015 | Subramaniyan |
| 2015/0039734 | A1 | 2/2015 | King |
| 2015/0043384 | A1 | 2/2015 | Hui |
| 2015/0078404 | A1 | 3/2015 | Diab |
| 2015/0169369 | A1 | 6/2015 | Baskaran |
| 2015/0178034 | A1 | 6/2015 | Penilla |
| 2015/0188996 | A1 | 7/2015 | Park |
| 2015/0195159 | A1 | 7/2015 | Kim |
| 2015/0230274 | A1 | 8/2015 | Sharma |
| 2016/0021014 | A1 | 1/2016 | Wetterwald |
| 2016/0021017 | A1 | 1/2016 | Thubert |
| 2016/0023351 | A1 | 1/2016 | Kuffner |
| 2016/0059783 | A1 | 3/2016 | Sisbot |
| 2016/0063332 | A1 | 3/2016 | Sisbot |
| 2016/0112308 | A1 | 4/2016 | Ficara |
| 2016/0127268 | A1 | 5/2016 | Gotz |
| 2016/0142993 | A1 | 5/2016 | Lim |
| 2016/0150459 | A1 | 5/2016 | Patil |
| 2016/0191572 | A1 | 6/2016 | Joy |
| 2016/0192303 | A1 | 6/2016 | Tender |
| 2016/0198423 | A1 | 7/2016 | Liu |
| 2016/0248586 | A1 | 8/2016 | Hughes |
| 2016/0274558 | A1 | 9/2016 | Strohmenger |
| 2016/0308793 | A1 | 10/2016 | Levy-Abegnoli |
| 2017/0012895 | A1 | 1/2017 | Zhao |
| 2017/0019479 | A1 | 1/2017 | Rangarajan |
| 2017/0047775 | A1 | 2/2017 | Itaya |
| 2017/0099226 | A1 | 4/2017 | Vasseur |
| 2017/0102690 | A1 | 4/2017 | Sait |
| 2017/0220011 | A1 | 8/2017 | Hart |
| 2017/0351630 | A1 | 12/2017 | Li |
| 2017/0366467 | A1 | 12/2017 | Martin |
| 2018/0004953 | A1 | 1/2018 | Smith, II |
| 2018/0024537 | A1 | 1/2018 | Chauvet |
| 2018/0048578 | A1 | 2/2018 | Rollet |
| 2018/0203959 | A1 | 7/2018 | Refsnaes |
| 2018/0225135 | A1 | 8/2018 | Xiao |
| 2018/0234514 | A1 | 8/2018 | Rajiv |
| 2018/0237040 | A1 | 8/2018 | Mong |
| 2018/0246981 | A1 | 8/2018 | Wei |
| 2018/0310078 | A1 | 10/2018 | Szymanski |
| 2019/0089502 | A1 | 3/2019 | Yi |
| 2019/0253339 | A1* | 8/2019 | Mehmedagic ...... H04L 45/3065 |

FOREIGN PATENT DOCUMENTS

| | | |
|---|---|---|
| CN | 102780581 B1 | 10/2014 |
| CN | 104734957 A1 | 6/2015 |
| CN | 105262651 A1 | 1/2016 |
| EP | 0762590 A1 | 3/1997 |
| KR | 20110046837 A1 | 5/2011 |
| RU | 2378760 C2 | 1/2010 |
| RU | 2601837 C2 | 11/2016 |
| WO | 2013147873 A1 | 10/2013 |
| WO | 2014160997 A1 | 10/2014 |
| WO | 2015195159 A1 | 12/2015 |
| WO | 2017059550 A1 | 4/2017 |

OTHER PUBLICATIONS

Asrodia, Pallavi et al., "Network Monitoring and Analysis by Packet Sniffing Method", International Journal of Engineering Trends and Technology (IJETT), vol. 4, Issue 5, May 2013, ISSN:2231-5381 (pp. 2133-2135, 3 total pages).

Australian Office Action dated Apr. 3, 2019 which was issued in connection with Australian Patent No. 2018202791 which was filed on Apr. 22, 2018.

Chou, C. W., Hume, D. B., Rosenband, T., & Wineland, D. J. (2010). "Optical Clocks and Relativity". Science, 329 (5999), Sep. 24, 2010, 1630-1633. (5 Pages).

Christian Boiger, "Time Aware Shaper—Flush Queue Event", IEEE 802 Plenary, IEEE 802.1 TSN TG, Deggendorf University of Applied Sciences, Mar. 20, 2013.

International Search Report and Written Opinion issued in connection with corresponding PCT Application No. PCT/US2017/046839 dated Feb. 22, 2018.

International Search Report and Written Opinion issued in connection with corresponding PCT Application No. PCT/US2018/026403 dated Jul. 27, 2018.

International Search Report issued in connection with corresponding PCT Application No. PCT/US2018/027221 dated Jul. 27, 2018.

Search Report issued in connection with corresponding EA Application No. 201890745 dated Nov. 30, 2018.

"Data Centre Switching Solutions White Paper", Cisco Systems, http://www.cisco.com/c/en/us/solutions/collateral/data-center-virtualization/data-center-switching/net_implentation_white_paper0900aecd8053495a.html, Document ID 1458600822267844, Mar. 12, 2015, (pp. 1-15, 15 total pages).

Derradji et al., "The BXI Interconnect Architecture", IEEE 23rd Annual Symposium on High-Performance Interconnects, Aug. 26-28, 2015, 32pgs.

Deshpande et al., "Coordinated Sampling to Improve the Efficiency of Wireless Network Monitoring", Networks, 2007. 4 ICON 2007. 15th IEEE International Conference on, Nov. 19-21, 2007, pp. 353-358. (6 pages).

Diogenes et al., "Getting started with Microsoft Azure security", Microsoft Azure, https://docs.microsoft.com/en-us/azure/security/azure-security-getting-started, May 19, 2016, 13 pages.

Donohue, J. M., Agnew, M., Lavoie, J., & Resch, K. J. (2013). Coherent ultrafast measurement of time-bin encoded photons. Physical Review Letters, 111(15), 1-10.

Dzymanski, An Ultra-Low-Latency Guaranteed-Rate Internet for Cloud Services, IEE/ACM Transactions on Networking, Feb. 2016, vol. 24, Issue 1, pp. 123-136.

Emfinger et al., "Analysis, Verification, and Management Toolsuite for Cyber-Physical Applications on Time-Varying Networks (Work in Progress)", Proceedings of the 4th ACM SIGBED International Workshop on Design, Modeling, and Evaluation of Cyber-Physical Systems, pp. 44-47, Berlin, Germany, Apr. 14-17, 2014. (4 pages).

Goetz, "IEEE 802.1 AS bt (gPTP) & IEE 1588 v3 (PTP v3)" Siemens, IEEE 802.1 TSN TG Meeting Orlando/USA, Mar. 19, 2013, (13 pages).

Hyung-Taek Lim et al., "Performance Analysis of the IEEE 802.1 Ethernet Audio Bridging Standard", SIMUTOOLS 12 Proceedings of the 5th International ICST Conference on Simulation Tools and Techniques, pp. 27-36, Mar. 19-23, 2012.

IEEE Standards Association "IEEE Standard for Ethernet—Amendment 5: Specification and Management Parameters for Interspersing Express Traffic", (Amendment to IEEE Std 802.3-2015 as amended by IEEE Std 802.3bw-2015, IEEE Std 802.3by-2016, IEEE Std 802.3bq-2016, and IEEE Std 802.3bp-2016), Approved Jun. 30, 2016, Published Oct. 14, 2016, (58pages).

IEEE Standards Association, "IEEE Standard for Local and Metropolitan Area Networks-Bridges and Bridged Networks—Amendment 25: Enhancements for Scheduled Traffic", (Amendment to IEEE Std 802.1Q-2014 as amended by IEEE Std 802.1Qcd-2015, and IEEE Std 802.1Q2014/Cor 1-2015), vol., No., pp. 1-57, Mar. 18, 2016. (57 pages).

IEEE Standards Association, "IEEE Standard for Local and Metropolitan Area Networks-Corrigendum 1: Technical and Editorial

(56) References Cited

OTHER PUBLICATIONS

Corrections", IEEE Std 802.1Q-2014/Cor1-2015 (Corrigendum to IEEE Std 802.1Q-2014), Approved Dec. 5, 2015, Published Jan. 12, 2016, (122 pages).

IEEE Standards Association, "Time-Sensitive Networking (TSN) for Industry 4.0", Standards for Time-Sensitive Networking for use in Industrial Automation Networks, 2017 (2 Pages).

IEEE Standards Association, "IEEE Standard for Local and Metropolitan Area Networks-Timing and Synchronization for Time-Sensitive Applications in Bridged Local Area Networks", IEEE Std 802.1 AS-2011, Status: PAR approved, technical development in process, task group ballots., Mar. 30, 2011, (292 pages).

Itin et al., "Optimising non-real time frame handling in real time ethernet nodes", 2015 IEEE World Conference on Factory Communication Systems (WFCS), pp. 1-8, 2015, 8pp.

Jin, Guijun et al., "Control Transmission Pace at IP Layer to Avoid Packet Drop", 2004 IEEE International Workshop on IP Operations and Management, Oct. 11-13, 2004, (pp. 60-66, 7 total pages).

Jamshed, Muhammad Ali et al., "An Energy Efficient Priority Based Wireless Multimedia Sensor Node Dynamic Scheduler", 2015 12th International Conference on High-capacity Optical Networks and Enabling/Emerging Technologies (HONET), Dec. 21-23, 2015, (pp. 1-4, 4 total pages).

Kamieth, J., et al., "Design of TDMA-based In-Car Networks: Applying Multiprocessor Scheduling Strategies on Wime-triggered Switched Ethernet Communication," IEEE Emerging Technologies and Factory Automation (ETFA), pp. ?-9 (Sep. 16-19, 2014).

Kapur et al., "Secure data transfer in MANET using symmetric and asymmetric cryptography", 2015 4th International Conference on Reliability, Infocom Technologies and Optimization (ICRITO) (Trends and Future Directions), pp. 1-5, Noida, Sep. 2-4, 2015 (5 Pages).

Kehrer et al., "A Comparison of Fault-Tolerance Concepts for IEEE 802.1 Time Sensitive Networks (TSN)", Emerging Technology and Factory Automation (ETFA), IEEE, Sep. 16-19, 2014, Barcelona, pp. 1-8. (8 pages).

Ko, Jaewoong et al., "Research on optimal bandwidth allocation for the scheduled traffic in IEEE 802.1 AVB"., Vehicular Electronics and Safety (ICVES), 2015 IEEE International Conference on, Nov. 5-7, 2015, Yokohama, (pp. 31-35, 4 total pages).

Liao et al., "A novel QoS-Enable Real-Time Publish-Subscribe Service", https://www.computer.org/csdl/proceedings/ispa/2008/3471a019-abs.html, IEEE Computer Society, Dec. 10, 2008 to Dec. 12, 2008.

Marcikic, I., de Riedmatten, H., Tittel, W., Scarani, V., Zbinden, H., & Gisin, N. (2002). "Femtosecond Time-Bin Entangled Qubits for Quantum Communication", Dec. 2002, vol. 66, Iss.6 (6 Pages).

Mehic, M., Maurhart, O., Rass, S., Komosny, D., & Rezac, F. (2017). Key Distribution Link, IEEE Journal of Quantum Electronics, vol. 53, No. 5, Oct. 5, 2017, (8 Pages).

Meyer et al.; "Extending IEEE 802.1 AVB with Time-triggered Scheduling: A Simulation Study of the Coexistence of Synchronous and Asynchronous Traffic", Vehicular Networking Conference (VNC), 2013, DOI: 10.1109/VNC.2013.6737589, Boston, MA, USA. (8 pages).

Mong, T. R., et al., Locomotive Control System, GE Co-Pending Application No. 15/958839, filed on Apr. 20, 2018.

Pardo-Castellote, G.; "OMG data distribution service: architectural overview", Real-Time Innovations, Inc., Proceedings of the 23rd International Conference on Distributed Computing Systems Workshops, Military Communications Conference, MILCOM '03, 2003 IEEE, vol. 1, pp. 242-247, Oct. 13-16, 2003. (7 pages).

IEEE Standards Association, "IEEE Standard for Local and Metropolitan Area Networks—Bridges and Bridged Networks—Amendment 26: Frame Preemption" (Amendment to IEEE Std 802.1Q-2014 as amended by IEEE Std 802.1Qca-2015, IEEE Std 802.1Qcd-2015, and IEEE Std 802.1Q-2014/Cor 1-2015), vol., No., pp. 1-57, Mar. 18, 2016. (52 pages).

Search Report from corresponding GB Application No. GB1211287.6 dated Oct. 8, 2012.

Shoemaker; "MIT Develops WiFi with X-ray Vision, Can See a Human Through Walls", GEEK Newsletter, https://www.geek.com/NEWS/MIT-DEVELOPS-WIFI-WITH-X-RAY-VISION-CAN-SEE-A-HUMAN-THROUGH-WALLS-1638206/, pp. 1-11, Oct. 29, 2016. (11 pages).

Silviu S. Craciunas et al., "Scheduling Real-Time Communication in IEEE 802.2Qbv Time Sensitive Networks", the 24th International Conference on Real-Time Networks and Systems (RTNS), ACM, 2016.

Stocia et al., "A proportional share resource allocation algorithm for real-time, time-shared systems", 17th IEEE Real-Time Systems Symposium, pp. 288-299, 1996, 12pp.

Szymanski, "An Ultra-Low-Latency Guaranteed-Rate Internet for Cloud Services", IEEE/ACM Transactions on 5 Networking, Feb. 2016, vol. 24, Issue 1, pp. 123-136. (14 pages).

Thiele et al., "Real-time Calculus for Scheduling Hard Real-time Systems, Circuits and Systems", Int. Symposium on Circuits and Systems ISCAS, Geneva, Switzerland, Mar. 2000, vol. 4, pp. 101-104. (4 pages).

Yu, Cheng-Chi et al., "Dynamic Scheduling of Real-Time Messages Over an Optical Network", Proceedings of Sixth International Conference on Computer Communications and Networks, Sep. 22-25, 1997, (pp. 336-339, 4 total pages).

Dodson, D. W. U.S. Pat. No. 911,954 Feb. 9, 1909, 50 pages.

\* cited by examiner

VEHICLE CONTROL SYSTEM

CROSS-REFERENCE TO RELATED APPLICATIONS

This application is a continuation-in-part of and claims priority to U.S. patent application Ser. No. 15/671,204, which was filed 8 Aug. 2017 (the "'204 application"), and which claims priority to U.S. Provisional Patent Application No. 62/396,487, which was filed 19 Sep. 2016 (the "'487 application"). This application also is a continuation-in-part of and claims priority to U.S. patent application Ser. No. 15/199,368, which was filed 30 Jun. 2016 (the "'368 application"). This application also is a continuation-in-part of and claims priority to U.S. patent application Ser. No. 15/485,982, which was filed 12 Apr. 2017 (the "'982 application"). This application also is a continuation-in-part of and claims priority to U.S. patent application Ser. No. 15/485,946, which was filed 12 Apr. 2017 (the "'946 application"). This application also is a continuation-in-part of and claims priority to U.S. patent application Ser. No. 15/835,056, which was filed 7 Dec. 2017 (the "'056 application"), which claims priority to U.S. Provisional Patent Application No. 62/575,719, which was filed on 23 Oct. 2017 (the "'719 application"). This application also is a continuation-in-part of and claims priority to U.S. patent application Ser. No. 15/833,732, which was filed 6 Dec. 2017 (the "'732 application"), which claims priority to the "'719 application". This application also claims priority to U.S. Provisional Patent Application No. 62/646,189, which was filed 21 Mar. 2018 (the "'189 application"). The entire disclosures of these applications are incorporated herein by reference.

FIELD

Embodiments of the present disclosure generally relate to systems and methods for controlling and communicating with rail vehicles.

BACKGROUND

Movement of vehicles is controlled by control systems that receive user input and communicate control signals to components of the vehicles to implement actions dictated by the user input. For example, a vehicle operator may depress a pedal, move a lever, or take other action to change a throttle setting of a vehicle or activate a brake of the vehicle. Responsive to this operator input, a control system of the vehicle may communicate signals (e.g., changes in voltages, currents, etc.) to engines, motors, brakes, etc., of the vehicle to implement the operator input (and change the throttle or activate the brake, as appropriate).

The control systems of some vehicles may be complex in that many components communicate with each other. Not all of these components, however, may communicate signals of the same or similar importance or criticality to operation of the vehicle. For example, components that measure operations of the vehicle (e.g., location, speed, etc.), components that record events occurring during movement of the vehicle, components that measure fuel onboard the vehicle, etc., may communicate signals that are less important to ensuring the safe operation of the vehicle compared to other communications, such as signals communicated with motors of the vehicle, signals communicated with input/output devices, etc.

The control systems may use different communication networks within a vehicle to ensure that the more important or critical communications and the less important or less critical communications are all successfully communicated. But, using many different communication networks within a vehicle can present unnecessarily complexity. For example, some components may not be able to communicate with each other without the communications being relayed and/or converted by another component. As the number of networks and components needed to communicate within a vehicle control system increases, the potential points of failure and complexity of ensuring that communications successful occur increase.

Various types of control systems communicate data between different sensors, devices, user interfaces, etc., to enable control operations of other powered systems. For example, locomotives, automobiles, surgical suites, power plants, etc., include many systems that communicate with each other to control operations of the locomotives, automobiles, surgical suites, and power plants.

The operations of these powered systems may rely on on-time and accurate delivery of data frames among various devices. Failure to deliver some data at or within designated times may result in failure of the powered system, which can have significant consequences. For example, the failure to deliver sensor data to a control system of a locomotive or rail vehicle system can result in the locomotive or rail vehicle system not applying brakes early enough to avoid a collision. Other control systems may fail to implement protective measures to avoid damage or injury to the systems or other equipment if data is not supplied at or within the designated times. Without timely information, feedback control systems cannot maintain performance and stability.

Some systems may use a time sensitive network (TSN) to communicate data. Communications within a TSN may be scheduled using a single device (e.g., an offline scheduling system) that assumes fixed, non-changing paths through the network nodes between communicating devices (e.g., writers and readers). The TSN schedules are developed offline and then loaded onto network devices. This can require that the offline scheduling system has accurate knowledge of the network topology, network devices, and configuration, and that the schedule is developed in a centralized location resulting in a static file to be uploaded after the schedule is generated. This can be a time-consuming process, particularly for small changes in the network, and can be prone to errors.

Additionally, some scheduling systems generate schedules that assume fixed communication paths through the TSN. This can result in inefficient and/or ineffective schedules for communications. As a result, some time sensitive communications may not reach addressed recipients (e.g., readers) in time and/or an unnecessarily reduced amount of bandwidth may be available for use by non-time sensitive communications, such as rate constrained communications and "best effort" communications.

Some TSNs are used to communicate data using a single device (e.g., an offline scheduling system) that assumes fixed, non-changing paths through the network nodes between communication devices. The TSN may also receive non-time sensitive communications, such as rate constrained communications and "best effort" communications. However, the communications received by the TSN for transmission through the network may not include any indication of whether they are a time-sensitive communication or a non-time sensitive communication. This makes it difficult to configure and schedule all TSN traffic flows in a network.

BRIEF DESCRIPTION

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a node device includes routing circuitry configured to receive data from one or more other node devices within a communication network and to send the data to at least one other node device or a final destination device and a scheduling controller configured to generate schedules for sending the data through the routing circuitry within the communication network. The scheduling controller communicates with one or more other scheduling controllers in the one or more other node devices to generate the schedules for sending the data through the communication network.

In one embodiment, a method includes determining (at one or more scheduling controllers in a time sensitive network) one or more of estimates of data to be routed through different communication paths in the time sensitive network, amounts of the data to be communicated through different node devices of the time sensitive network, and/or time periods in which different communications of the data occur during a communication cycle of the same node device of the time sensitive network. The method also includes generating (at the one or more scheduling controllers in the time sensitive network) schedules for sending the data through the different node devices based on one or more of: the estimates of data to be routed through the different communication paths by avoiding scheduling data to be communicated through at least one of the communication paths having a larger estimate of data, the amounts of the data to be communicated through the different node devices by avoiding scheduling data to be communicated through at least one of the node devices having a larger amount of the data to be communicated through the at least one of the node devices, and/or the time periods in which different communications of the data occur during the communication cycle of the node device by scheduling the different communications to occur during non-overlapping time periods in the communication cycle.

In one embodiment, a communication system includes node devices configured to route data packets between one or more writer devices of a data distribution service and one or more reader devices of the data distribution service according to schedules of the node devices. Each of the node devices can include a scheduling controller that determines the schedule for the corresponding node device. In one embodiment, two or more of the node devices can share the same scheduling controller.

According to some embodiments, a method includes receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of an installed product based on the transmitted one or more data frames.

According to some embodiments, a system includes an installed product, including a plurality of components; a computer programmed with a Time Sensitive Network (TSN) module for the installed product, the TSN module for controlling operations of the installed product; the computer including a processor and a memory in communication with the processor, the memory storing the TSN module and additional program instructions, wherein the processor is operative with the TSN module and additional program instructions to perform functions as follows: receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of the installed product based on the transmitted one or more data frames.

According to some embodiments, a non-transitory, computer-readable medium storing instructions that, when executed by a computer processor, cause the computer processor to perform a method comprising: receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of an installed product based on the transmitted one or more data frames.

According to some embodiments, a method includes receiving, at a verification module, a schedule for transmission of one or more data frames to one or more destination nodes via a Time Sensitive Network (TSN); receiving, at the verification module, a destination for each data frame; receiving, at the verification module, a maximum tolerable latency for each data frame; determining, via the verification module, the received schedule is correct; transmitting one or more data frames according to the schedule; accessing, via the verification module, the one or more destination nodes; verifying, via the verification module, the one or more data frames were transmitted to the one or more destination nodes within a maximum tolerable latency, based on accessing the one or more destination nodes; and controlling one or more operations of an installed product based on the transmitted one or more data frames.

According to some embodiments, a system includes an installed product, including a plurality of components; a computer programmed with a verification module for the installed product, the verification module for verifying a schedule to control operations of the installed product; the computer including a processor and a memory in communication with the processor, the memory storing the verification module and additional program instructions, wherein the processor is operative with the verification module and additional program instructions to perform functions as follows: receive a schedule for transmission of one or more data frames to one or more destination nodes via a Time Sensitive Network (TSN); receive a destination for each data frame; receive a maximum tolerable latency for each data frame; determine the received schedule is correct; transmit one or more data frames according to the schedule; access the one or more destination nodes; verify the one or more data frames were transmitted to the one or more destination nodes within a maximum tolerable latency, based on accessing the one or more destination nodes; and control one or more operations of an installed product based on the transmitted one or more data frames.

According to some embodiments, a non-transitory, computer-readable medium storing instructions that, when executed by a computer processor, cause the computer processor to perform a method comprising: receiving, at a verification module, a schedule for transmission of one or more data frames to one or more destination nodes via a Time Sensitive Network (TSN); receiving, at the verification module, a destination for each data frame; receiving, at the verification module, a maximum tolerable latency for each data frame; determining, via the verification module, the received schedule is correct; transmitting one or more data frames according to the schedule; accessing, via the verification module, the one or more destination nodes; verifying, via the verification module, the one or more data frames were transmitted to the one or more destination nodes within a maximum tolerable latency, based on accessing the one or more destination nodes; and controlling one or more operations of an installed product based on the transmitted one or more data frames.

In one embodiment, a method includes determining a clock drift and a clock variance of each node in plural nodes of a time-sensitive Ethernet network, determining an accumulated clock offset along a time-sensitive network path in the time-sensitive network based on the clock drifts and the clock variances that are determined, determining a guard band having a dynamic size based on the accumulated clock offset, and restricting when Ethernet frames are communicated through the nodes by communicating the guard band with the dynamic size to one or more of the nodes.

In one embodiment, a system includes one or more processors configured to determine a clock drift and a clock variance of each node in plural nodes of a time-sensitive network. The one or more processors also are configured to determine an accumulated clock offset along a time-sensitive network path in the time-sensitive network based on the clock drifts and the clock variances that are determined. The one or more processors also are configured to determine a guard band having a dynamic size based on the accumulated clock offset and to communicate the guard band with the dynamic size to the nodes. The one or more processors are configured to allocate the guard band to at least one of the nodes. The guard band restricts when Ethernet frames are communicated through the at least one of the nodes.

In one embodiment, a system includes one or more processors configured to determine clock drifts and clock variances of plural nodes in a time-sensitive Ethernet network. The one or more processors also are configured to determine an eigenvalue centrality metric based on a location of one or more of the nodes in the time-sensitive network. The one or more processors are configured to dynamically allocate a guard band to one or more of the nodes to prevent communication of one or more Ethernet frames through the one or more nodes during the guard band in a time sensitive network schedule of the Ethernet network. The one or more processors are configured to dynamically allocate the guard band based on the clock drifts, the clock variances, and the eigenvalue centrality metric.

In one embodiment, a method includes determining whether communication devices that communicate data frames with each other in a time-sensitive network are moving relative to each other, calculating a temporal offset based on relative movement of the communication devices, and changing a scheduled communication cycle of at least one of the communication devices based on the temporal offset.

In one embodiment, a method includes determining whether communication devices that communicate data frames with each other in a time-sensitive network are moving relative to each other, determining an impact of the Doppler effect on when the data frames are received by at least one of the communication devices due to relative movement between the communication devices, and contracting or delaying one or more fetching times of a scheduled communication cycle for at least one of the communication devices based on the impact of the Doppler effect.

In one embodiment, a method includes determining whether communication devices that communicate data frames with each other in a time-sensitive network have different accelerations, calculating a guard band based on the different accelerations of the communication devices, and applying the guard band to one or more scheduled fetching times of a scheduled communication cycle of at least one of the communication devices. The one or more scheduled fetching times indicate when different types of the data frames are scheduled to be communicated. The guard band extends a duration of the one or more scheduled fetching times to which the guard band is applied.

In one embodiment, a system includes a scheduling device of a time-sensitive network. The scheduling device is configured to determine whether communication devices that communicate data frames with each other in the time-sensitive network are moving relative to each other. The scheduling device also is configured to calculate a temporal offset based on relative movement of the communication devices and to change a scheduled communication cycle of at least one of the communication devices based on the temporal offset.

In one embodiment, a system includes a scheduling device of a time-sensitive network, the scheduling device configured to determine whether communication devices that communicate data frames with each other in a time-sensitive network are moving relative to each other. The scheduling device also is configured to determine an impact of the Doppler effect on when the data frames are received by at least one of the communication devices due to relative movement between the communication devices. The scheduling device also is configured to contract or delay one or more fetching times of a scheduled communication cycle for at least one of the communication devices based on the impact of the Doppler effect.

In one embodiment, a system includes a scheduling device of a time-sensitive network. The scheduling device is configured to determine whether communication devices that communicate data frames with each other in a time-sensitive network have different accelerations. The scheduling device also is configured to calculate a guard band based on the different accelerations of the communication devices. The scheduling device also is configured to apply the guard band to one or more scheduled fetching times of a scheduled communication cycle of at least one of the communication devices. The one or more scheduled fetching times indicate times at which different types of the data frames are (scheduled) to be communicated. The guard band extends a duration of the one or more scheduled fetching times to which the guard band is applied.

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate.

In one embodiment, a method includes instructing computing devices that communicate messages with each other via a time-sensitive network to secure communication of the messages using shared secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
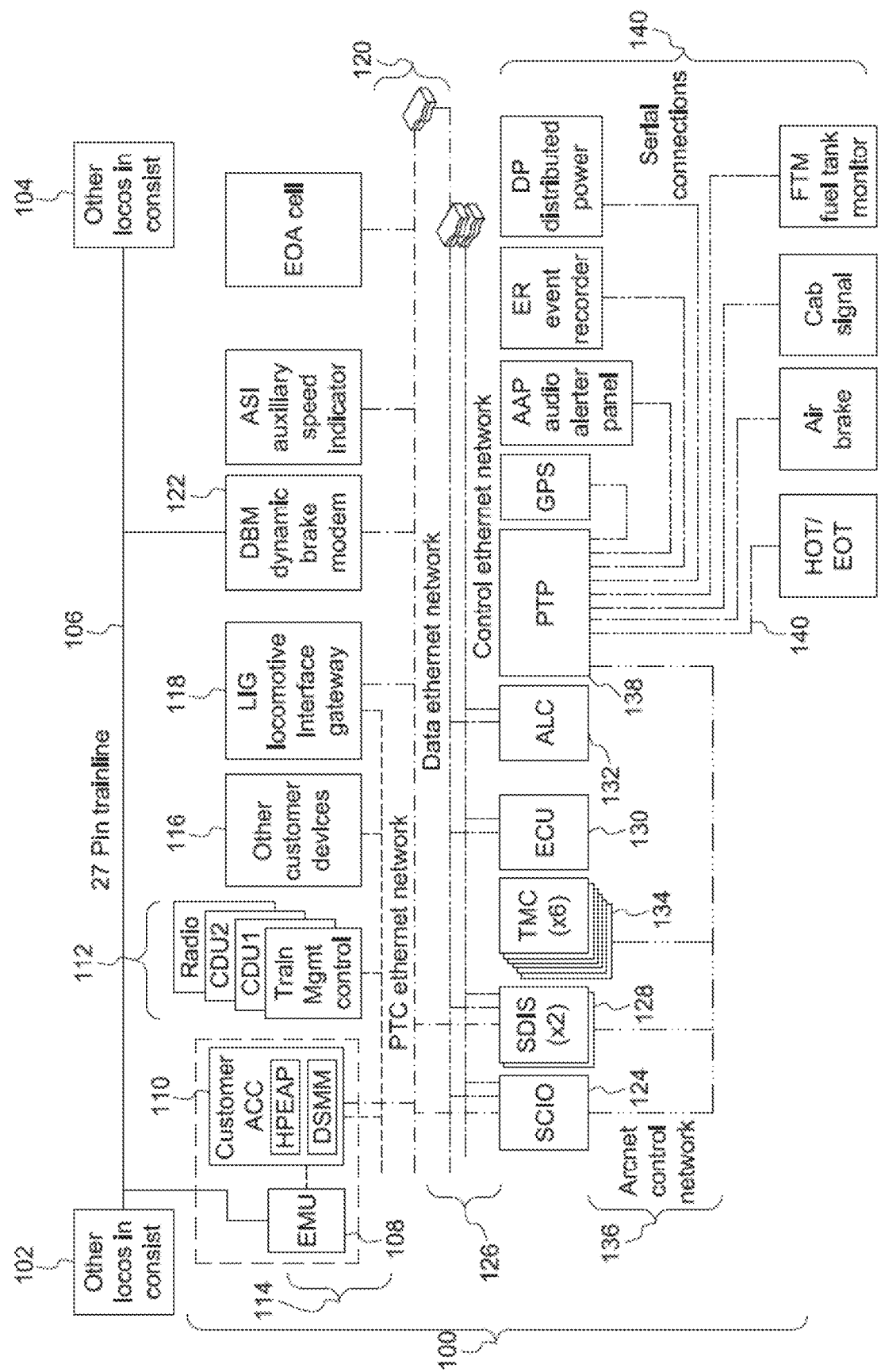
FIG. 1 illustrates one example of a vehicle control system.

FIG. 1 illustrates one example of a vehicle control system 100. The vehicle control system 100 may be disposed onboard one or more vehicles of a vehicle system. For example, the control system 100 may be disposed onboard a locomotive of a rail vehicle system formed from the locomotive and one or more other locomotives 102, 104. The locomotives in the vehicle system are communicatively coupled by a wired connection 106, such as a 27-pin trainline cable. Other control systems identical or similar to the control system 100 shown in FIG. 1 may be disposed onboard the other locomotives 102, 104, with the various control systems 100 communicatively coupled (e.g., able to communicate with each other) via the wired connection 106. While the control system 100 is shown as being disposed onboard a locomotive of a rail vehicle system, alternatively, the control system 100 may be disposed onboard another type of vehicle. For example, the control system 100 may be disposed onboard an automobile, a marine vessel, a mining vessel, or another off-highway vehicle (e.g., a vehicle that is not legally permitted or that is not designed for travel along public roadways).

The control system 100 communicates via the wired connection 106 via a vehicle system interface device 108 ("EMU" in FIG. 1), such as an Ethernet over a multiple unit (MU) cable interface. The interface device 108 represents communication circuitry, such as modems, routing circuitry, etc. A front-end controller 110 ("Customer ACC" in FIG. 1) is coupled with the interface device 108 by one or more wired connections. The controller 110 represents hardware circuitry that couples with (e.g., receives) one or more other circuits (e.g., compute cards) that control operation of the control system 100. As shown in FIG. 1, the controller 110 also may be connected with the second communication network 120.

Several control devices 112, such as a radio, display units, and/or vehicle system management controllers, are connected with the interface device 108 and the controller 110 via a first communication network 114 ("PTC Ethernet Network" in FIG. 1). The communication network 114 may be an Ethernet network that communicates data packets between components connected to the network 114. One or more other devices 116 may be connected with the network 114 to provide other functions or control over the vehicle.

The networks described herein can be formed from a structure of communication devices and hardware, such as cables interconnecting devices, wireless devices interconnecting other devices, routers interconnecting devices, switches interconnecting devices, transceivers, antennas, and the like. One or more networks described herein can be entirely off-board all vehicles. Optionally, at least part of a network can be disposed onboard one or more vehicles, such as by having one or more hardware components that form the network being onboard a vehicle and communicating in the network as the vehicle is moving. Additionally or alternatively, a network can be disposed entirely onboard a vehicle or vehicle system, such as when the components communicating with each other to form the network are all disposed onboard the same vehicle or onboard multiple vehicles that travel together along routes as a vehicle system.

An interface gateway 118 also is connected with the first communication network 114. The interface gateway 118 is referred to as a locomotive interface gateway ("LIG" shown in FIG. 1), but optionally may be referred to by another name depending on the type of vehicle that the interface gateway 118 is disposed upon. The interface gateway 118 represents hardware circuitry that communicatively couples the first network 114 with at least a second communication network 120. In the illustrated embodiment, the second communication network 120 is referred to as a data Ethernet network, and can represent an Ethernet network similar to the first network 114.

The interface gateway 118 can provide a communication bridge between the two networks 114, 120. For example, the interface gateway 118 can change protocols of communications between the two networks 114, 120, can determine which communications to allow to be communicated from a device on one network 114 or 120 to a device on the other network 120 or 114 (for example, by applying one or more rules to determine which communications may be allowed to pass between the networks 114, 120), or otherwise control communications between the two networks 114, 120.

A dynamic brake modem 122 ("DBM" in FIG. 1) also is connected with the second network 120. This brake modem 122 also can be referred to as a dynamic brake modem. The dynamic brake modem 122 also may be connected with the wired connection 106. The dynamic brake modem 122 represents hardware circuitry that receives control signals from one or more other vehicles 102, 106 via the wired connection 106 and/or via the second network 120 in order to control one or more brakes of the vehicle. For example, the dynamic brake modem 122 may receive a control signal from the vehicle 102, 104 or from an input/output device 124 ("SCIO" shown in FIG. 1 and described below) that reports the dynamic braking capability of the vehicle so that the braking capacity of the entire consist can be computed. The dynamic brakes can represent traction motors that operate in a regenerative braking mode to slow or stop movement of the vehicle. The dynamic brake modem is a FRA (Federal Rail Administration) required item for modern control systems.

The input/output device 124 represents one or more devices that receive input from an operator onboard the vehicle and/or that present information to the operator. The input/output device 124 may be referred to as a super centralized input/output device (one device), and can represent one or more touchscreens, keyboards, styluses, display screens, lights, speakers, or the like. The input/output device 124 is connected with the second communication network 120 and also is connected with a third communication network 126. The third communication network 126 also can be an Ethernet network, and may be referred to as a control Ethernet network, as shown in FIG. 1. This network can also be either single path or can be implemented in a redundant network.

Several display devices 128 may be connected with the input/output device 124 via the third network 126 and optionally may be connected with the input/output devices 124 and other components via the second communication network 120. An engine control unit 130 ("ECU" in FIG. 1) represents hardware circuitry that includes and/or is connected with one or more processors (for example, one or more microprocessors, field programmable gate arrays, and/or integrated circuits) that generate control signals communicated to an engine of the vehicle (for example, based on input provided by the input/output device 124) to control operation of the engine of the vehicle.

An auxiliary load controller 132 ("ALC" in FIG. 1) represents hardware circuitry that includes and/or is connected with one or more processors (for example, one or more microprocessors, field programmable gate arrays, and/or integrated circuits) that control operation of one or more auxiliary loads of the vehicle. The auxiliary loads may be loads that consume electric current without propelling movement of the vehicle. These auxiliary loads can include, for example, fans or blowers, battery chargers, or the like.

One or more traction motor controllers 134 ("TMC" in FIG. 1) control operation of traction motors of the vehicle. The traction motor controllers 134 represent hardware circuitry that includes and/or is connected with one or more processors (for example, one or more microprocessors, field programmable gate arrays, and/or integrated circuits) that generate control signals to control operation of the traction motors. For example, based on or responsive to a throttle setting selected by an operator input via the input/output devices 124 and communicated to the traction motor controllers 134 via a fourth communication network 136, the traction motor controllers 134 may change a speed at which one or more of the traction motors operate to implement the selected throttle setting.

In the illustrated example, the communication network 136 differs from the communication networks 114, 120, 126 in that the fourth communication network 136 may be a deterministic communication network. The fourth communication network 136 is an ARCnet control network, which is a deterministic communication network. A deterministic communication network may be a communication network that ensures successful communication between devices communicating with each other through the network by only allowing certain devices to communicate with each other at different times. In one example, a deterministic communication network 136 may only allow a device to communicate with another device during a time period that the device sending the communication has or is associated with a communication token. For example, if the input/output device 124 has the token during a first time period, then the input/output device 124 can send control signals or other signals to the display devices 128, the traction motor controllers 134, and/or a protocol translator 138 during the first time period, but none of the display devices 128, traction motor controllers 134, or protocol translator 138 may be allowed to send communications to any other device on the fourth location network 136 during this first time period.

During a subsequent, non-overlapping second time period, the protocol translator 138 may have the token and is allowed to communicate with other devices. No other components connected with the fourth communication network 136 other than the protocol translator 138 may be allowed to send communications during the second time period. In contrast, the Ethernet communication networks 114, 120, 126 may allow multiple, or all, devices connected to the respective network 114, 120, 126 to communicate with each other at the same time. For example, two or more of the components connected to the network 114, 120, and/or 126 can communicate with each other at the same time by concurrently or simultaneously sending data packets in the network 114, 120, and/or 126.

The protocol translator 138 ("PTP" shown in FIG. 1) represents hardware circuitry that converts a protocol of signals communicated by one or more additional devices 140 of the vehicle. These devices 140 may communicate using signals having a different protocol (e.g., a different syntax, a different format, or the like) than signals communicated by the devices communicating on the deterministic communication network 136. For example, the devices 140 may communicate with the protocol translator 138 over serial connections 142. The devices 140 may include sensors that monitor operation of the vehicle. Examples of these devices 140 include a location determining device (for example, a global positioning system receiver), an audio alarm panel ("AAP" in FIG. 1), an event recorder or log ("ER" in FIG. 1), a distributed power device ("DP" in FIG. 1, such as a device that coordinates operations of the vehicle with the operations of other vehicles 102, 104 in the same vehicle system), a head of train/end of train communication device ("HOT/EOT" in FIG. 1), an airbrake controller ("Air brake" in FIG. 1), a signaling controller ("Cab signal" in FIG. 1), a fuel gauge or fuel tank sensor ("FTM" in FIG. 1), or the like.

As shown in FIG. 1, the control system 100 includes many communication networks 114, 120, 126, 136, and the serial connections 142 of the devices. These many communication networks add increased cost and complexity to control system 100, and may provide for additional points of failure in a control system 100. Simply reducing the number of networks in the control system 100, however, may present additional problems. For example, merely connecting the devices that control movement of the vehicle (e.g., the input/output device 124, the display devices 128, the engine control unit 130, the auxiliary load controller 132, and/or the traction motor controllers 134) with an Ethernet network (that may or may not be connected with one or more of the devices 140) could result in so much information or data being communicated in the network that communications with the devices that control movement of the vehicle may be prevented, interrupted, or otherwise interfered with.

Figure 2:
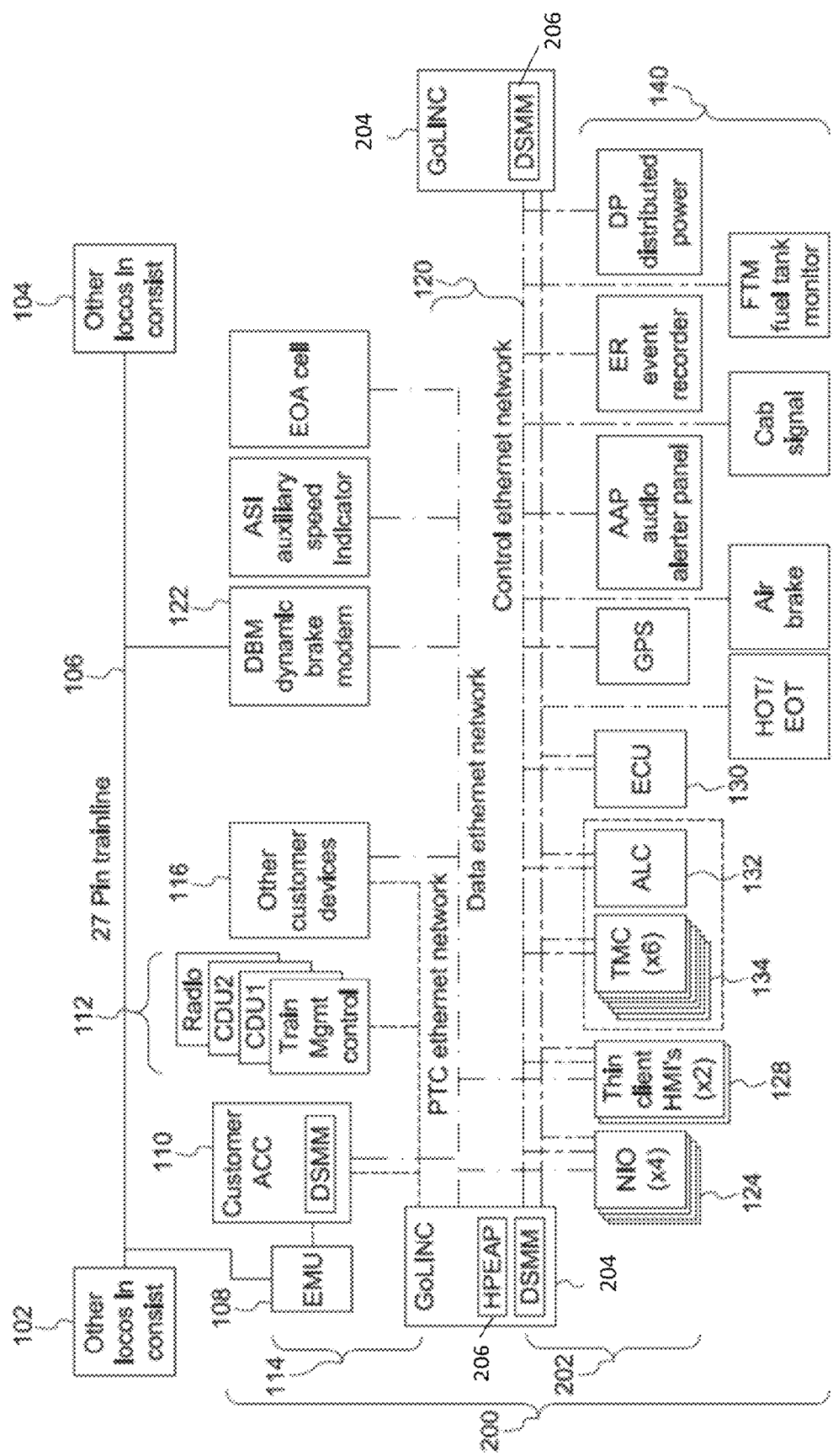
FIG. 2 illustrates a vehicle control system according to one embodiment of the subject matter described herein.

FIG. 2 illustrates a vehicle control system 200 according to one embodiment of the subject matter described herein. Similar to the control system 100 shown in FIG. 1, the control system 200 is described in connection with a rail vehicle system, but optionally may be used in connection with another type of vehicle, such as automobile, marine vessel, a mining vehicle, or the like. The control system 200 may be disposed onboard a vehicle in a vehicle system that includes the one or more other vehicles 102, 104. The wired connection 106 may communicatively coupled with the vehicle on which the control system 200 is disposed, as well as the vehicles 102, 104, as described above. The control system 200 includes many of the same components described above in connection with the control system 100.

One difference between the control system 100 and the control system 200 shown in FIG. 2 is that the devices 140 that do not control movement of the vehicle and the devices that control movement of the vehicle (e.g., the engine control unit 130, the auxiliary load controller 132, the traction motor controllers 134, the display devices 128, and input/output devices 124) are all connected with a common (e.g., the same) communication network 202. This communication network 202 may be an Ethernet network, such as a control Ethernet network. The network 120 described above in connection with FIG. 1 may also be present in the control system 200 and also may be connected with the display devices 128 and the input/output devices 124, as described above and shown in FIG. 2.

Another difference between the control systems 100, 200 is that the devices 140 are directly connected with the network 202 without having to be connected with the other devices 124, 128, 130, 132, 134 by the protocol translator 138 shown in FIG. 1. This allows for the devices 140 to directly communicate with each other and/or with the devices 124, 128, 130, 132, 134 without having to communicate via the translator 138.

One additional difference between the control systems 100, 200 is that the interface gateway 118 is not present between the communication networks 114, 120. Instead, one or more linking gateways 204 are connected with the communication network 202 and/or the networks 114, 120, as shown in FIG. 2. The linking gateways 204 represent hardware circuitry that can control which signals are communicated between the different networks 114, 120, 202. For example, the linking gateways 204 can determine whether a communication is permitted to pass from one device connected with the network 120 to one or more devices connected to the network 202. The linking gateways 204 may receive one or more computing cards 206 that provide customizable functionality, such as one or more operations or functions desired by a customer or user of the control system 200. In contrast, the interface gateway 118 shown in FIG. 1, may not be customizable by an end-user, but instead the operations of the interface gateway 118 may be dictated by the manufacturer of the control system 100.

The devices 140 can provide data or other information that is useful for the monitoring and control of the vehicle system, but this information and data may be less important to the safe operation of the vehicle and vehicle system relative to communications and information communicated between other devices connected to the same network 202 (e.g., the input/output devices 124, the display devices 128, the traction motor controllers 134, auxiliary load controllers 132, and/or the engine control unit 130). For example, while determining the location of the vehicle may be useful from one of the devices 140, it may be more important to the safe operation of the vehicle to be able to ensure communication between the traction motor controller and the input/output devices 124.

Connecting these more critical devices with less critical devices 140 on the same Ethernet network 202 could present problems with increased risk of communications to and/or from the more critical components not being received or sent to or from these components due to the increased traffic on the network caused by data indicated by the less critical devices 140. While communications to or from the devices 124, 128, 130, 132, 134 may be assigned with higher priorities than communications with the devices 140, the amount of data being communicated on the Ethernet network 202 may, at times, be too large to ensure the communications to or from the devices 124, 128, 130, 132, 134 are received.

To ensure these communications with the devices 124, 128, 130, 132, 134, 140 are sent and/or received in time (for example, that a change to a throttle setting received by the input/output devices 124 is received by the traction motor controllers 134 within a designated period of time, such as within a few milliseconds), the communication network 202 may operate as a data distribution service (DDS) running on a time sensitive network (TSN).

In one embodiment, the data distribution service is an object management group middleware communication standard for communication between and/or among the devices 124, 128, 130, 132, 134, 140 using the network 202. The devices 124, 128, 130, 132, 134, 140 that communicate using the data distribution service may be referred to as publishers and/or subscribers. A publisher is a device 124, 128, 130, 132, 134, 140 that provides data or information for one or more other devices 124, 128, 130, 132, 134, 140 to obtain. A subscriber is a device 124, 128, 130, 132, 134, 140 that receives or obtains this data or information (and performs some function using that data or information). The same device 124, 128, 130, 132, 134, 140 may be both a publisher of some data and a subscriber to other data. For example, the input/output device 124 may be a publisher of some data (e.g., instructions received from an operator to change a throttle setting) and a subscriber of other data (e.g., sensor data provided by one or more of the devices 140 for display to the operator).

In one embodiment, the data distribution service is used by the devices 124, 128, 130, 132, 134, 140 to communicate data through the network 202 that is established according to at least some of the standards developed by the Time-Sensitive Networking Task Group, which may include or otherwise comply with one or more of the IEEE 802.1 standards. In contrast to an Ethernet network operating without TSN that communicates data frames or packets in a random manner, the TSN network 202 may communicate data frames or packets according to a type or category of the data or information being communicated. This can ensure that the data is communicated within designated time periods or at designated times. In other Ethernet networks, some data may not reach devices in sufficient time for the devices to operate using the data. With respect to some vehicle control systems, the late arrival of data can have significantly negative consequences, such as an inability to slow or stop movement of a vehicle in time to avoid a collision.

The TSN-based Ethernet network 202, however, can dictate when certain data communications occur to ensure that certain data frames or packets are communicated within designated time periods or at designated times. Data transmissions within the TSN-based Ethernet network 202 can be based on times or time slots in which the devices 124, 128, 130, 132, 134, 140 communicate being scheduled for at least some of the devices 124, 128, 130, 132, 134, 140. The communications between or among some of the devices 124, 128, 130, 132, 134, 140 may be time sensitive communications or include time sensitive data. Time sensitive communications involve the communication of time sensitive data within designated periods of time. For example, data indicative of a change in a brake setting may need to be communicated from the input/output device 124 to the traction motor controllers 134 within several milliseconds of being sent by the input/output device 124 into the network 202. The failure to complete this communication within the designated time limit or period of time may prevent the vehicle from braking in time. Other non-time sensitive communications may be communications that do not necessarily need to be communicated within a designated period of time, such as communication of a location of the vehicle from the GPS receiver, a measurement of the amount of fuel from the fuel sensor, etc. These non-time sensitive communications may be best effort communications or rate constrained communications.

Best effort communications may be communicated within the network 202 when there is sufficient bandwidth in the network 202 to allow for the communications to be successfully completed without decreasing the available bandwidth in the network 202 below a bandwidth threshold needed for the communication of time sensitive communications between publishers and subscribers. For example, if 70% of the available bandwidth in the network 202 is needed at a particular time to ensure that communications with the engine control unit 130 and traction motor controllers 134 successfully occur, then the remaining 30% of the available bandwidth in the network 202 may be used for other communications, such as best effort communications with the auxiliary load controller 132. The bandwidth threshold may be a user-selected or default amount of bandwidth. The communication of these best effort communications may be delayed to ensure that the time sensitive communications are not delayed.

Rate constrained communications are communications that are communicated using the remaining amount of bandwidth, if any, in the network 202. For example, a rate constrained communication may be sent between devices using the bandwidth in the network 202 that is not used by the time sensitive communications and the best effort communications. If no bandwidth is available (e.g., the time sensitive and best effort communications consume all the available bandwidth), then the rate constrained communication may not occur until more bandwidth is available.

The type of communication with a device may be set by the controller 110 and/or the operator of the system 200. For example, the controller 110 may designate that all communications to and/or from the engine control unit 130, the traction motor controllers 134, and the input/output devices 124 are time sensitive communications, communications to and/or from the display devices 128 and auxiliary load controller 132 are best effort communications, and the communications to and/or from the devices 140 are rate constrained communications. Optionally, the type of information being communicated by these devices may determine the type of communications. For example, the controller 110 may establish that control signals (e.g., signals that change operation of a device, such as by increasing or decreasing a throttle of a vehicle, applying brakes of a vehicle, etc.) communicated to the engine control unit 130 and/or traction motor controllers 134 may be time sensitive communications while status signals (e.g., signals that indicate a current state of a device, such as a location of the vehicle) communicated from the engine control unit 130 and/or traction motor controllers 134 are best effort or rate constrained communications. In one embodiment, different types of communication can be used to send command signals that control movement or other operation of a vehicle. For example, a command signal can be communicated to a vehicle to change a throttle of the vehicle, apply brakes of the vehicle, release brakes of the vehicle, or the like, as a time sensitive communication, a rate constrained communication, and/or a best effort communication.

Figure 3:
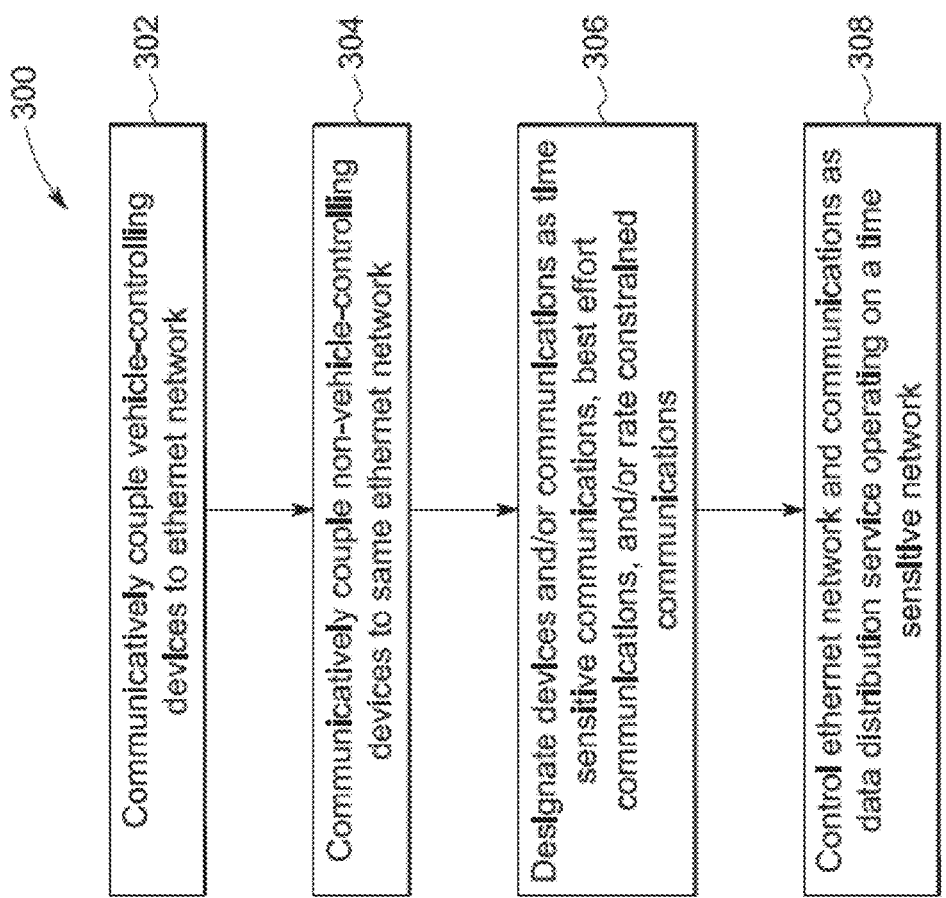
FIG. 3 illustrates one embodiment of a method for establishing a communication network between devices of a vehicle control system.

FIG. 3 illustrates one embodiment of a method 300 for establishing a communication network between devices of a vehicle control system. The method 300 may be used to create the network 202 shown in FIG. 2. At 302, several different vehicle-controlling devices 124, 130, 134 are communicatively coupled with each other by an Ethernet network. These devices 124, 130, 134 are components that operate to control a vehicle, such as by changing throttle settings, applying or disengaging brakes, or the like, to control movement of the vehicle.

At 304, several non-vehicle-controlling devices 128, 132, 140 are communicatively coupled with each other and with the vehicle-controlling devices 124, 130, 134 by the same Ethernet network as the vehicle-controlling devices 124, 130, 134. For example, the devices 128, 132, 140 may send and/or receive data that is used to monitor and/or diagnose operation of the vehicle, but that is not used to control movement of the vehicle during movement of the vehicle. These devices 128, 132, 140 may be connected with the same network as the vehicle-controlling devices 124, 130, 134 without a protocol translator being used to change protocols or other aspects of the communications from and/or to the non-vehicle-controlling devices 128, 132, 140.

At 306, the devices and/or communications connected to the same Ethernet network are designated as time sensitive communications, best effort communications, or rate constrained communications. As described above, the time sensitive communications may be communications with devices that need to be completed in a short period of time (e.g., within a designated period of time, such as thirty milliseconds) to ensure that the vehicle is safely controlled, while best effort and/or rate constrained communications may not need to be completed within such short periods of time.

At 308, the network is controlled as a data distribution service operating on a time sensitive network. The controller 110 can control communications within the network in this manner to provide a flexible Ethernet network that can have additional devices added to and/or devices removed from the network, without sacrificing or risking the time sensitive communications of some devices on the network. For example, the addition of a device 140 to the network 202 can be completed without the network 202 changing the communications to and/or from the devices 124, 130, 134 from time sensitive communications to another type of communication. The devices 124, 130, 134 may continue communicating with each other and/or other devices using the time sensitive communications of the network 202, while the new and/or other devices can continue communicating as best effort and/or rate constrained communications.

In one embodiment, a data distribution service as described herein can operate on a network that is operating as a time sensitive network implementation of the IEEE 802.1 Ethernet standards.

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the network is an Ethernet network at least partially disposed onboard the vehicle.

In one example, the vehicle devices include two or more of an input/output device, an engine control unit, a traction motor controller, a display device, an auxiliary load controller, and/or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the network while the second and third set of the vehicle devices communicate the best effort communications and the rate constrained communications using a remaining amount of bandwidth of the network that is not used by the time sensitive communications.

In one example, the vehicle is a rail vehicle.

In one example, the vehicle is an automobile.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the Ethernet network is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the Ethernet network while the second and third set of the vehicle devices communicate the best effort communications and the rate constrained communications using a remaining amount of bandwidth of the Ethernet network that is not used by the time sensitive communications.

In one example, the vehicle is a rail vehicle.

In one example, the vehicle is an automobile.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the TSN network is an Ethernet network that is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the TSN network while the second and third set of the vehicle devices communicate the best effort communications and the rate constrained communications using a remaining amount of bandwidth of the TSN network that is not used by the time sensitive communications.

In one example, the vehicle is a rail vehicle.

One or more embodiments of the subject matter described herein provide systems and methods that distribute the scheduling tasks for time sensitive networks (TSN). The TSN may be formed from several node devices that communicate with each other. In contrast to a network having a single scheduler or scheduling device that determines when different communications occur through these node devices, one or more embodiments of the subject matter described herein divide or place these scheduling tasks on many, or all, of the node devices that participate in the TSN.

Figure 4:
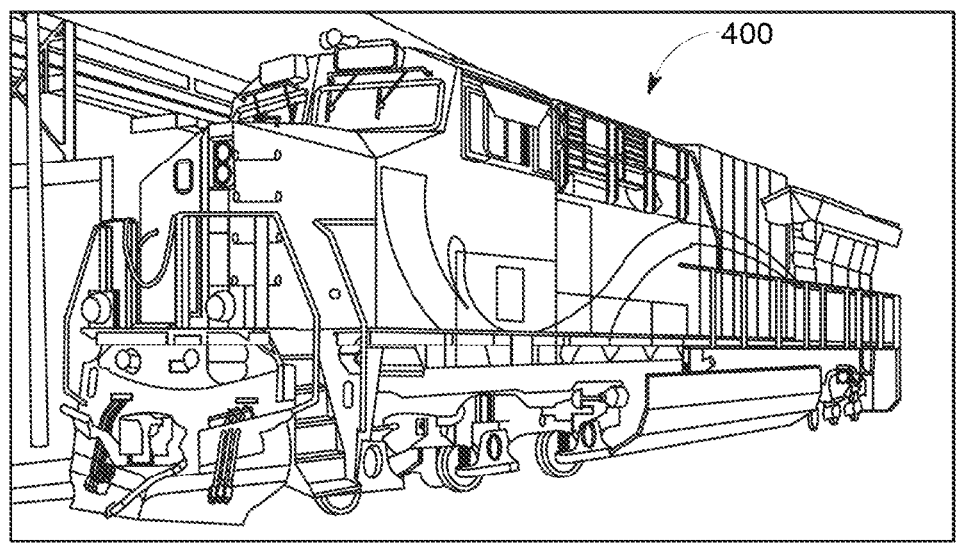
FIG. 4 illustrates one example of a powered system having a control system that uses one or more embodiments of subject matter described herein.
Figure 5:
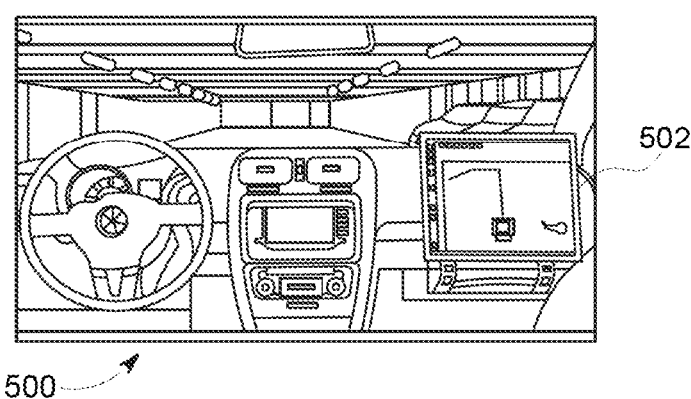
FIG. 5 illustrates another example of a powered system having a control system that uses one or more embodiments of subject matter described herein.
Figure 6:
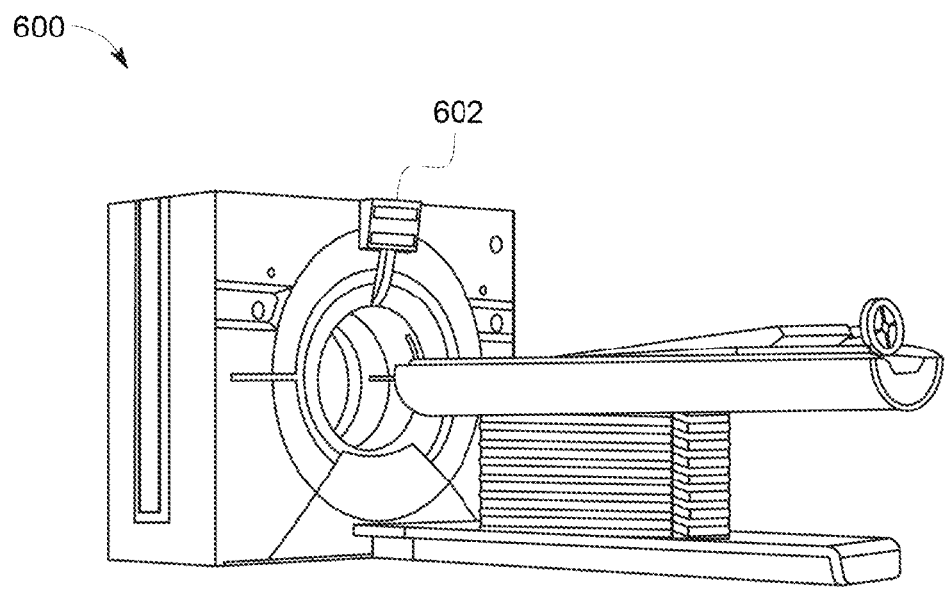
FIG. 6 illustrates another example of a powered system having a control system that uses one or more embodiments of subject matter described herein.
Figure 7:
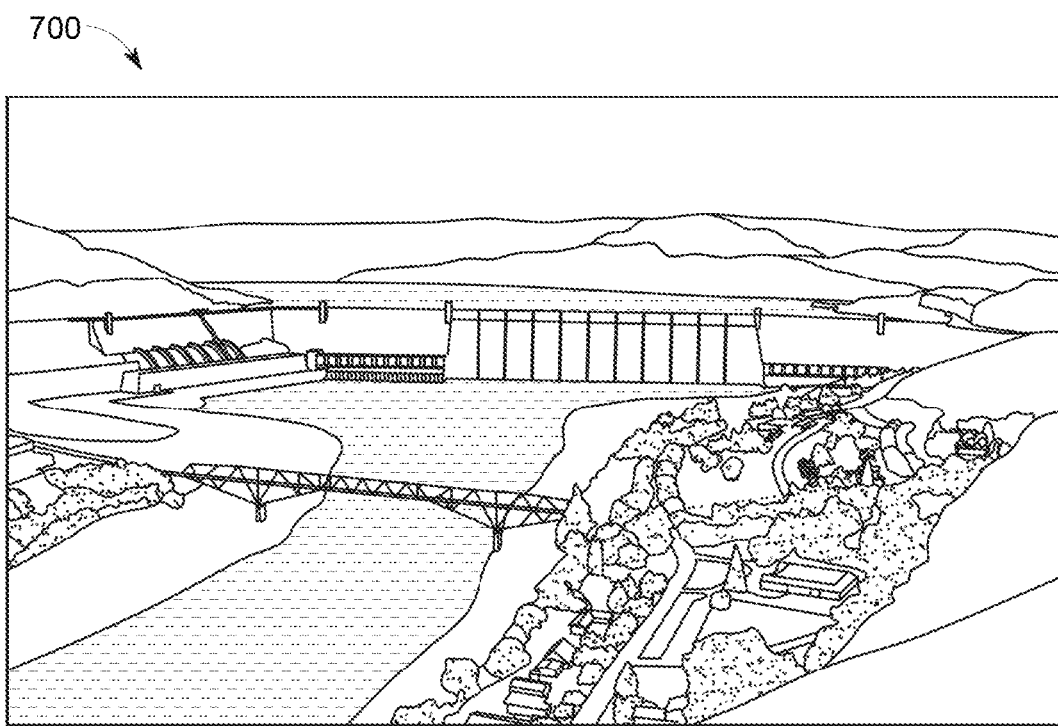
FIG. 7 illustrates another example of a powered system having a control system that uses one or more embodiments of subject matter described herein.

FIGS. 4 through 7 illustrate several examples of powered systems 400, 500, 600, 700 having control systems that use one or more embodiments of subject matter described herein. The powered system 400 shown in FIG. 4 is a locomotive, which has a control system that controls operations (e.g., movement and other actions) of the locomotive based on data obtained by, generated by, and/or communicated among devices of the locomotive and/or off-board the locomotive. The powered system 500 shown in FIG. 5 is an automobile, which has a control system 502 that controls operations (e.g., driver warnings, automated movement, or other actions) of the automobile based on data obtained by, generated by, and/or communicated among devices of the automobile and/or off-board the automobile. The powered system 600 shown in FIG. 6 is a medical device, such as a magnetic resonance imaging (MRI) device. Alternatively, the powered system 600 may represent several medical devices, such as medical equipment within a surgical suite, emergency room, hospital, or the like. The powered system 600 may include a control system 602 that controls operations of the medical equipment or devices, communicates information between or among the medical equipment or devices, etc., to allow for automated control of the equipment or devices, to provide information to operators of the equipment or devices, etc. The powered system 700 shown in FIG. 7 is a hydraulic power plant, which has a control system that controls operations of the plant based on data obtained by, generated by, and/or communicated among devices of the plant.

Figure 8:
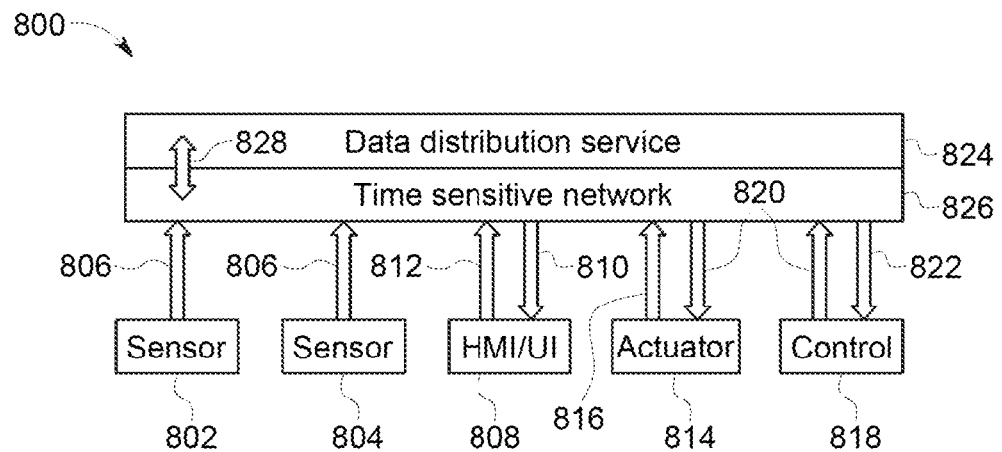
FIG. 8 illustrates one embodiment of a communication system.

FIG. 8 illustrates one embodiment of a communication system 800. The communication system 800 may be used by a control system 818 ("Control" in FIG. 8) to communicate data between or among devices of the control system 818 and/or the powered system that is controlled by the control system 818. The control system 818 may represent one or more of the control systems 100, 300, 502, 602 shown in FIGS. 4 through 7, and/or may otherwise control operations of the powered systems shown in FIGS. 4 through 7. The control system 818 shown in FIG. 8 represents hardware circuitry that includes and/or is connected with one or more processors (e.g., microprocessors, integrated circuits, field programmable gate arrays, etc.) that perform operations to control the powered system(s).

The communication system 800 communicates data between several devices, such as sensors 802, 804 that monitor, measure, record, etc. information and communicate this information as sensor data 806. Another device that can communicate via the communication system 800 can include a human machine interface (HMI) or user interface (UI) (shown as "HMI/UI" in FIG. 8) 808 that receives output or status data 810 that is to be presented to a user or operator of the communication system 800 or control system 818 and that can communicate input data 812 received from the user or operator to one or more other devices of the control system. The HMI/UI 808 can represent a display device, touchscreen, laptop, tablet computer, mobile phone, speaker, haptic device, or other device that communicates or conveys information to a user or operator.

In one embodiment, at least one of the sensors 802, 804 may be a camera that generates video or image data, an x-ray detector, an acoustic pick-up device, a tachometer, a global positioning system receiver, a wireless device that transmits a wireless signal and detects reflections of the wireless signal to generate image data representative of bodies or objects behind walls, sides of cars, or other opaque bodies, or another device.

Another device that can communicate using the communication system 800 includes one or more actuators 814, which represent devices, equipment, or machinery that move to perform one or more operations of the powered system that is controlled by the control system 818. Examples of actuators 814 include brakes, throttles, robotic devices, medical imaging devices, lights, turbines, etc. The actuators 814 can communicate status data 816 of the actuators 814 to one or more other devices in the powered system via the communication system 800. The status data 816 represent a position, state, health, or the like, of the actuator 814 sending the status data 816. The actuators 814 can receive command data 820 from one or more other devices of the powered system or control system via the communication system 800. The command data 820 represents instructions that direct the actuators 814 how and/or when to move, operate, etc.

The control system 818 can communicate (e.g., receive, transmit, and/or broadcast) a variety of data between or among the devices via the communication system 800. For example, the control system 818 can communicate the command data 820 to one or more of the devices and/or receive data 822, such as status data 816 and/or sensor data 806, from one or more of the devices. While devices are shown in FIG. 8 as sending certain data or receiving certain data, optionally, the devices may send and/or receive other types of data. For example, the sensors 802, 804 may receive data and/or send other types of data.

The communication system 800 communicates data between or among the devices and/or control system 818 using a communication network 826 that communicates data using a data distribution service (DDS) 824. The network 826 is shown in FIG. 8 as a time sensitive network, but alternatively may be another type of network. The data distribution service 824 represents an object management group (OMG) device-to-device middleware communication standard between the devices and the network. The data distribution service 824 allows for communication between publishers and subscribers. The term publisher refers to devices 802, 804, 808, 814, 818 that send data to other devices 802, 804, 808, 814, 818 and the term subscriber refers to devices 802, 804, 808, 814, 818 that receive data from other devices 802, 804, 808, 814, 818. The data distribution service 824 is network agnostic in that the data distribution service 824 can operate on a variety of networks, such as Ethernet networks as one example. The data distribution service 824 operates between the network through which data is communicated and the applications communicating the data (e.g., the devices 802, 804, 808, 814, 818). The devices 802, 804, 808, 814, 818 can publish and subscribe to data over a distributed area to permit a wide variety of information to be shared among the devices 802, 804, 808, 814, 818.

In one embodiment, the data distribution service 824 is used by the devices 802, 804, 808, 814, 818 to communicate data 806, 810, 812, 816, 820, 822 through the network 826, which may operate on an Ethernet network of the powered system. The network 826 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. With respect to some control systems, the late arrival of data can have significant consequences, as described above. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The communication system 800 may use the network 826 to communicate data between or among the devices 802, 804, 808, 814, 818 using the data distribution service 824 to maintain QoS parameters 828 of communications to and/or from certain devices 802, 804, 808, 814, 818. The QoS parameters 828 represent how quickly and/or efficiently data communication between or among the devices 802, 804, 808, 814, 818 are occurring. The QoS parameters 828 may represent data throughput, or a rate at which data of the communications moves through the network 826, a percentage or fraction of communications that occur no later than a designated time or within a designated time period, etc. The QoS parameters 828 are determined for the data distribution service 824 and mapped (e.g., applied, or used to dictate how and/or when data is communicated, as described herein) to the network 826 in one embodiment. A QoS parameter 828 can be used to ensure that data communicated with one or more devices 802, 804, 808, 814, 818, to one or more devices 802, 804, 808, 814, 818, and/or between two or more devices 802, 804, 808, 814, 818 is received in a timely manner (e.g., at designated times or within designated time periods).

The devices 802, 804, 808, 814, 818 can communicate the data (e.g., publish and/or subscribe to the data) according to the schedules dictated by the control system 818 to achieve or maintain the QoS parameters 828 of the devices 802, 804, 808, 814, 818 at or above designated threshold limits. Other data and/or other devices may communicate with or among each other using the same network, but without a designated schedule and/or without being subject to QoS parameters 828. For example, the sensor 802, actuator 814, and control system 818 may have QoS parameters 828 and the control system 818 can dictate schedules for when the sensor 802, actuator 814, and control system 818 publish and/or receive data via the network 826. A schedule for the network 826 may designate or dictate when certain communications (e.g., communications between designated devices) are to begin, a deadline or time when these certain communications are to be completed for a communication cycle, a time period within which these certain communications are to be completed for the communication cycle, the node devices within the network 826 through which these certain communications are to be routed through, the amount of bandwidth that can be used for these certain communications, or the like.

The network 826 can be an Ethernet based network that communicates different categories or groups or types of data according to different priorities. For example, the network 826 can communicate time sensitive data according to the schedule or schedules determined by a scheduler (described herein) to achieve or maintain the QoS parameters 828 of certain devices 802, 804, 808, 814, 818. The network 826 can communicate other data between or among the same or other devices 802, 804, 808, 814, 818 as "best effort" traffic or rate constrained traffic. Best effort traffic includes the communication of data between or among at least some of the devices 802, 804, 808, 814, 818 that is not subject to or required to meet the QoS parameters 828 of the devices 802, 804, 808, 814, 818. This data may be communicated at a higher priority than the data communicated in rate constrained traffic, but at a lower priority than the data communicated according to the schedules dictated by the control system 818 to meet or achieve the QoS parameters 828 (also referred to herein as time sensitive traffic). The rate constrained traffic can include data that is communicated between or among the devices 802, 804, 808, 814, 818, but that is communicated at a lower priority than the time sensitive data and the best effort traffic. The time sensitive data, the best effort traffic, and the rate constrained traffic are communicated within or through the same network 826, but with different priorities. The time sensitive data is communicated at designated times or within designated time periods, while the best effort traffic and rate constrained traffic is attempted to be communicated in a timely manner, but that may be delayed to ensure that the time sensitive data is communicated to achieve or maintain the QoS parameters 828.

Figure 9:
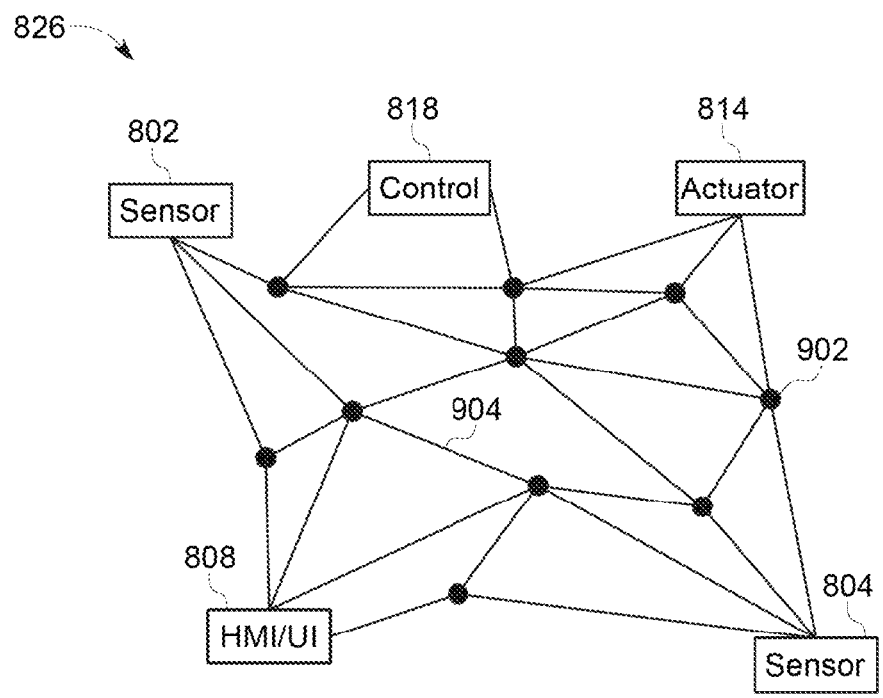
FIG. 9 schematically illustrates a communication network through which devices of the communication system may communicate data using a data distribution service shown in FIG. 8.

FIG. 9 schematically illustrates one embodiment of the communication network 826 shown in FIG. 8 through which the devices 802, 804, 808, 814, 818 may communicate the data 806, 810, 812, 816, 820, 822 using the data distribution service 824. The network 826 may be configured to operate as a TSN. The network 826 includes the devices 802, 804, 808, 814, 818 communicatively coupled with each other by communication links 904 and node devices 902. The communication links 904 may be referred to as virtual links, and may represent wired and/or wireless connections over or through which data packets, frames, and/or datagrams may be communicated between the connected node devices 902.

The node devices 902 can include routers, switches, repeaters, or other devices capable of receiving data frames or packets and sending the data frames or packets to another node device 902. In one embodiment, the devices 802, 804, 808, 814, 818 also can be node devices 902 in the network 826. The communication links 904 represent wired connections between the node devices 902, such as wires, buses, cables, or other conductive pathways between the node devices 902. Optionally, one or more of the communication links 904 includes a wireless connection or network between node devices 902.

The data 806, 810, 812, 816, 820, 822 (shown in FIG. 8) can be communicated in the network 826 as data frames or data packets. The data frames or packets can be published by a device 802, 804, 808, 814, 818 and received by another device 802, 804, 808, 814, 818 by the frames or packets hopping, or moving from node device 902 to node device 902 along the links 904 within the network 826 according to a network or communication schedule. For example, one or more of the data frames or packets of the data 806 published by the sensor 804 can be sent to the network 826 and subscribed to by the control system 818. The data frames or packets may hop from the sensor 804 to the control system 818 by being communicated from the sensor 804 to the one node device 902, then to another node device 902, then to another node device 902, and then the control system 818. Different frames or packets may be communicated along different node devices 902 and paths 904 from the publishing device to the subscribing device.

Figure 10:
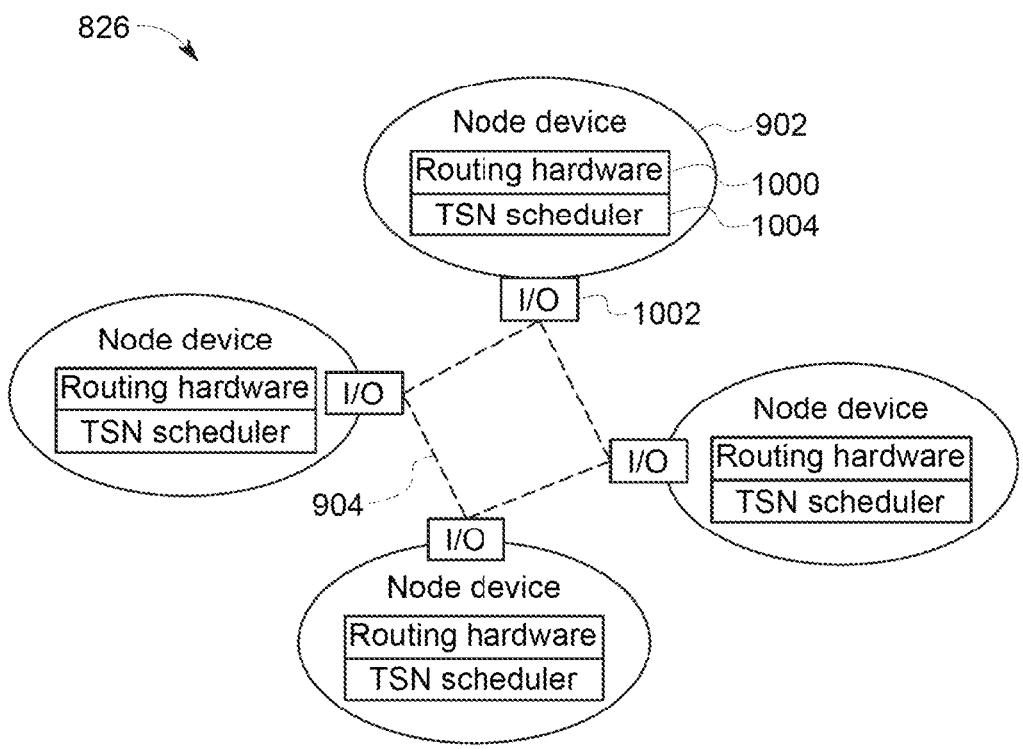
FIG. 10 illustrates several node devices communicatively coupled with each other in the network shown in FIG. 8 according to one embodiment.

FIG. 10 illustrates several node devices 902 communicatively coupled with each other in the network 826 according to one embodiment. The node devices 902 are communicatively coupled with each other by the communication links 904, as described above. The node devices 902 include routing hardware 1000 that are the forwarding planes of the node devices 902. The hardware 1000 includes circuitry connected with network interfaces 1002 ("I/O" in FIG. 10) to allow for the communication of data packets through the routing hardware 1000. The network interfaces 1002 can represent ports, connectors, antennas, or other circuitry that allow for the node devices 902 to be communicatively coupled with the communication links 904. The routing hardware 1000 includes circuitry that receives incoming data packets, frames, or datagrams, via the network interfaces 1002, determines where to send the incoming data packets, frames, or datagrams (e.g., based on a routing table stored in an internal memory of the hardware 1000), determines when to send the incoming data packets, frames, or datagrams (e.g., based on a routing schedule stored in the internal memory of the hardware 1000), and sends the data packets, frames, or datagrams to another node device 902 or a final destination of the data packets, frames, or datagrams via the network interface 1002 and a corresponding communication link 904.

Some or all of the node devices 902 participating in the communication of data within the network 826 may include a scheduling controller 1004 ("TSN Scheduler" in FIG. 10). The scheduling controller 1004 represents hardware circuitry that includes and/or is connected with one or more processors (e.g., microprocessors, integrated circuits, and/or field programmable gate arrays) that determine communication schedules for when (and, optionally, where) communications through the respective node device 902 are to occur. For example, the scheduling controller 1004 of a node device 902 can determine when data packets, frames, or datagrams of various different communications are to be forwarded from the node device 902 to another node device 902 or a final destination of the data packet, frame, or datagram. The different communications can represent communications between different devices 802, 804, 808, 814, 818 (shown in FIG. 8) of the DDS 824 or other system.

For example, a first communication from the sensor 802 to the control system 818 may be scheduled to be completed before a first designated time within a communication cycle (e.g., with each communication cycle lasting a designated time period, such as 700 milliseconds), a second communication from the sensor 802 to the HMI/UI 808 may be scheduled to be completed before a subsequent, second designated time within the same communication cycle, and so on. The routing hardware 1000 can send the data packets, frames, or datagrams for the first communication through or over a communication link 904 to the appropriate next node device 902 along the network path at a time that allows the data packets, frames, or datagrams for the first communication to reach the final destination before the first designated time. The routing hardware 1000 can delay sending the data packets, frames, or datagrams for other communications (e.g., the second communication) through or over a communication link 904 to the appropriate next node device 902 along the network path at a subsequent time that allows the data packets, frames, or datagrams for the other communications to reach the final destination according to the communication schedules for the other communications.

The scheduling controllers 1004 of the node devices 902 can communicate with each other and optionally with the control system 818 to determine the communication schedules for the various node devices 902. The control system 818 can communicate with the scheduling controllers 1004 (e.g., via the communication links 904) to inform the scheduling controllers 1004 of when communications between various pairs or groups of devices 802, 804, 808, 814, 818 (and/or additional devices) are to occur for time sensitive communications. The control system 818 optionally may inform the scheduling controllers 1004 of which communications between various pairs or groups of devices 802, 804, 808, 814, 818 (and/or additional devices) are non-time sensitive communications, such as rate constrained communications and/or best effort communications.

The scheduling controllers 1004 may communicate with each other to determine when and where to communicate the data packets, frames, and/or datagrams of these communications to ensure that the time sensitive communications occur or are completed prior to the scheduled times. The scheduling controllers 1004 may communicate with each other to determine when and where to communicate the data packets, frames, and/or datagrams of the non-time sensitive communications to ensure that the non-time sensitive communications are completed, but do not prevent or interfere with the time sensitive communications.

For example, the scheduling controllers 1004 may determine communication loads representative of the amount of data being communicated through the corresponding node devices 902 at different times, which node devices 902 are directly linked with each other, which node devices 902 are directly linked with one or more of the devices 802, 804, 808, 814, 818, etc. This information can be shared between the scheduling controllers 1004 as each scheduling controller 1004 may be aware of the communication links 904 between the node device 902 of the scheduling controller 1004 and other node devices 902. This information may be programmed into the memory of the scheduling controllers 1004 and/or may be provided by the control system 818.

Based on the communication loads and the communication links 904 between the node devices 902, the scheduling controllers 1004 may communicate with each other to coordinate cooperative schedules among the node devices 902. The scheduling controllers 1004 may generate communication schedules to ensure that time sensitive communications occur through the communication links 904 and node devices 902 before the scheduled times dictated by the control system 818, while avoiding sending too many data packets, frames, and/or datagrams through the same node device 902 (and potentially slowing down communication to miss the scheduled communication time). For the remaining non-time sensitive communications, the scheduling controllers 1004 may generate communication schedules to ensure that the non-time sensitive communications occur through the communication links 904 and node devices 902 while avoiding sending too many data packets, frames, and/or datagrams through the same node device 902 (and potentially slowing down communication to prevent communication).

Each scheduling controller 1004 may generate a communication schedule for the node device 902 of that scheduling controller 1004. The scheduling controllers 1004 may share the schedule with other devices having an application with a competing link (e.g., an overlapping route through the network). The scheduling controllers 1004 may modify the schedules to ensure that the node devices 902 do not become too congested to prevent time sensitive communications from being completed within scheduled times and/or to prevent unnecessary delays in the non-time sensitive communications. The scheduling controllers 1004 can modify the schedules responsive to more than a designated communication load (e.g., data rate) of data being sent through the same node device 902. The scheduling controllers 1004 can modify the schedules by changing the path for one or more communications (e.g., which node devices 902 communicate the data of the communications) and/or the times at which the communications occur through the various node devices 902. The scheduling controllers 1004 can periodically or irregularly modify the communication schedules of one or more of the node devices 902. If there are no overlapping routes or competing links, however, the scheduling controllers 1004 can independently create the schedules for the node devices 902. Optionally, one or more of the scheduling controllers 1004 can create schedules with holes in the schedules, such as node devices 902 that are not used in the schedules or are not used during designated time periods. This can allow for other scheduling controllers 1004 to create or modify other schedules that use these node devices 902.

Distributing the generation of the communication schedules among the node devices 902 can eliminate a shutdown of the network 826 caused by failure of a single scheduling device or controller that generates the communication schedules for the node devices 902. This scheduling distribution also eliminates the time-consuming process of sending relatively large amounts of information to a single, off-line scheduling device or controller, waiting for the single, off-line scheduling device or controller to generate many schedules for the many node devices 902, and then sending the schedules to the various node devices.

Alternatively, the communication system 826 may have a scheduling controller that is outside of the node devices 902. This scheduling controller may generate the schedules for the node devices 902 based on the communication loads and the communication links 904 between the node devices 902, the identification of time sensitive or non-time sensitive communications by the control system 818, and the designated times or time periods in which the time sensitive communications are required to be completed as designated by the control system 818. The scheduling controller may then communicate the schedules to the node devices 902 for use in controlling when and where data packets, frames, and/or datagrams are communicated. This type of scheduling controller may be referred to as a centralized or non-distributed scheduling controller.

In one embodiment, one or more of the scheduling controllers may use network calculus as an aid to determine the communication schedules for one or more, or all, of the node devices 902 participating in communication of data packets, frames, and/or datagrams in the DDS 824 using the TSN 826. Use of network calculus can provide a faster analytical approximation to generating communication schedules relative to other scheduling approaches. This can assist in steering the scheduling controller(s) toward the communication schedules and/or provide a relatively quick, first-order result for the communication schedules in time-critical situations (relative to using another approach).

The scheduling controller(s) may determine the communication schedules of the node devices by making a first order approximation of the bandwidth of the network 826 that is consumed by the communications identified by the control system 818 (and/or other devices using the DDS 824). This first order approximation may include estimated or designated amounts of data (e.g., in terms of bits or other units) and/or bandwidth (e.g., data rate) that are expected to be used by communicating various communications between and/or among the devices 802, 804, 808, 814, 818. The estimated amounts of data and/or bandwidth may be based on a source of the data. For example, the sensor 802 may be associated with larger amounts of data for each communication from the sensor 802 than the sensor 804, while communications from the HMI/UI 808 may be associated with larger amounts of data for each communication from the sensor 802.

Additionally or alternatively, the estimated amounts of data and/or bandwidth for a communication may be based on a temporal or priority category of the communication. Time sensitive communications may be associated with larger estimated amounts of data than rate constrained communications, which may be associated with larger estimated amounts of data than best effort communications. In one embodiment, the estimated amounts of data and/or bandwidth are based on previous communications of the same or similar data by the same or similar devices 802, 804, 808, 814, 818.

The first order approximation may be a conservative estimation of the amounts of data and/or bandwidth used in the communications. For example, the estimate may be a 10%, 20%, or other increase over the size of data communicated in a previous communication of data.

The scheduling controller(s) may eliminate some communications (e.g., times and/or paths of the communications) from consideration as being included in a communications schedule based on the estimated amounts of data and/or bandwidth. For example, the estimated data amounts and/or bandwidths may result in too much data or bandwidth (e.g., an amount of data and/or a bandwidth that exceeds a designated threshold) traveling through one or more of the node devices 902. The scheduling controller(s) may eliminate these communications from consideration in being used to generate a communication schedule. The scheduling controller(s) may use the other communications that were not eliminated from consideration to form the communication schedule of the network 826. For example, the remaining communications resulting from elimination of the communications having too large of an amount of data passing through one or more nodes 902 and/or consuming too large of an amount of bandwidth through the one or more nodes 902 may be eliminated from consideration for including in a schedule. The scheduling controller(s) may then generate the communication schedule for the network 826 using some or all of the remaining communications.

Optionally, the scheduling controller(s) may use changeable paths through the network 826 to generate the communication schedule. For example, the scheduling controller(s) may use tensors to represent the amount of data traveling through various node devices 902 using different communication paths between the devices 802, 804, 808, 814, 818 and through different combinations of the node devices 902. The tensors may be matrices representative of the data traffic (e.g., the amount of data traveling through each node device 902) with different pathways for the data being used.

Figure 11:
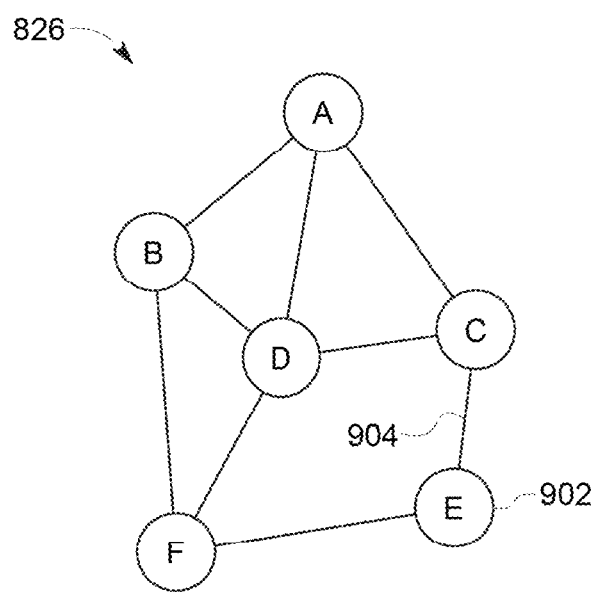
FIG. 11 illustrates one portion of the network shown in FIG. 8 and several node devices shown in FIG. 9 within the network according to one example.

FIG. 11 illustrates one portion of the network 826 and several node devices 902 within the network 826 according to one example. The node devices 902 in FIG. 11 are marked A-F to indicate different node devices 902. Several communication paths extend from the A node device 902 to the F node device 902. These communication paths include the following paths, listed by letter representing the node devices 902 in the order of hops of data packets, frames, or datagrams along the paths: ABF, ABDF, ABDCEF, ADF, ADBF, ADCEF, ACEF, ACDF, and ACDBF. Tensors may be determined for the data traffic (e.g., the amount of data) flowing through each of the node device 902 for each of these paths. The tensors for a node device 902 may be matrices having columns and rows representative of different paths through that node device 902. For example, because there are six node devices 902 shown in FIG. 11, there may be six rows and six columns for the tensors representative of different data traffic through at least some of the node devices 902. The values at each intersection of the columns and rows may represent the traffic flow through the node device 902 represented by that intersection. Based on these values, it can be determined, from the matrices, which paths may have lower data traffic than other paths.

For example, the tensor for various paths through the node devices 902 shown in FIG. 11 may be represented as:

$$\begin{array}{c} \\ \text{Device } A \\ \text{Device } B \\ \text{Device } C \\ \text{Device } D \\ \text{Device } E \\ \text{Device } F \end{array} \begin{bmatrix} Dev\,A & Dev\,B & Dev\,C & Dev\,D & Dev\,E & Dev\,F \\ 0 & A \to B & A \to C & A \to D & 0 & 0 \\ B \to A & 0 & B \to C & B \to D & 0 & B \to F \\ C \to A & 0 & 0 & C \to D & C \to E & 0 \\ D \to A & D \to B & D \to C & 0 & 0 & D \to F \\ 0 & 0 & E \to C & 0 & 0 & E \to F \\ 0 & F \to B & 0 & F \to D & F \to E & 0 \end{bmatrix}$$

with the values of each entry in the matrix indicative of the data traffic flowing through the node devices 902 along the direction indicated. For example, the value of the second row and third column in the matrix (e.g., the value of B→C) can indicate the data traffic flowing through the C node device 902 from the B node device 902. Additional tensors may be determined based on other directions of data traffic flow.

Many tensors may be determined for different groups of node devices 902 in the network 826. The values of the tensors may be examined to determine which communication paths are least congested (e.g., relative to one or more, or all, other paths) and/or which communication paths avoid too much data being communicated through the same node device 902 (e.g., more than a designated threshold amount of data).

The scheduling controller(s) can determine the tensors for the various groups of node devices 902 based on the communications that are scheduled to occur between different devices 802, 804, 808, 814, 818 and the groups of node devices 902 that connect the different pairs or groups of devices 802, 804, 808, 814, 818 that are communicating with each other. For example, if the sensor 804 is scheduled to publish sensor data and the HMI/UI 808 and the actuator 814 are to read the published sensor data, then tensors may be created for some or all potential paths extending through the node devices 902 from the sensor 804 to the HMI/UI 808 and from the sensor 804 to the actuator 814. The values in the tensors may be examined to determine which paths avoid data traffic congestion at one or more node devices 902. For example, the scheduling controller(s) can select one or more communication paths for the sensor 804 to publish sensor data to the HMI/UI 808 and the actuator 814 that has no more than a threshold amount of data communicated through one or more of the node devices 902. The communication path that is used for publication of data from one device 802, 804, 808, 814, 818 and the reading of the data by another device 802, 804, 808, 814, 818 can be dynamically altered without shutting down or restarting the network 826 to avoid sending too much data through the same node devices 902.

In one embodiment, one or more of the scheduling controller(s) can change or establish the communication schedules for one or more of the nodes to establish non-overlapping communication timings within a communication cycle. This can reduce the data traffic congestion or the amount of data traffic handled by one or more node devices 902 and thereby increase the QoS parameter 828 communications between two or more of the devices 802, 804, 808, 814, 818.

Figure 12:
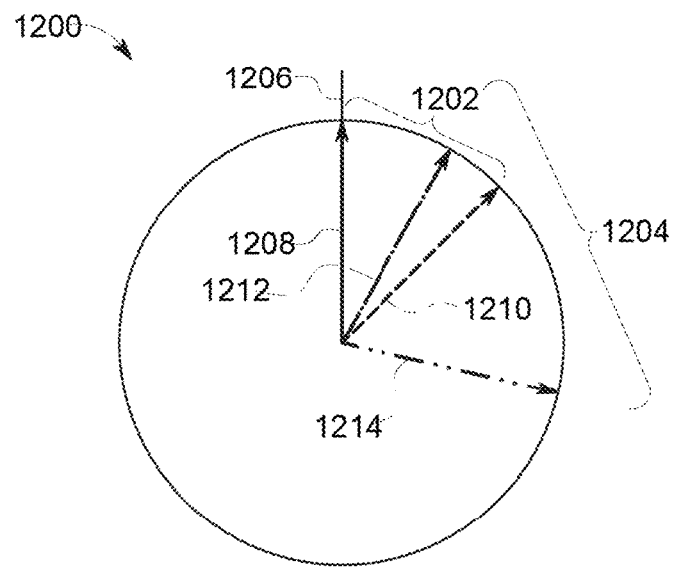
FIG. 12 illustrates a timing diagram for overlapping data communications during a single communication cycle of a node device shown in FIG. 9 according to one example.

FIG. 12 illustrates a timing diagram 1200 for overlapping data communications 1202, 1204 during a single communication cycle of a node device 902 shown in FIG. 9 according to one example. The timing diagram 1200 includes a circle representative of a single communication cycle for the node device 902. For example, a marker 1206 indicates the start of a communication cycle for the node device 902, with time progressing during the communication cycle in a clock-wise manner to return to the marker 1206. The data communication 1202 extends from a first time marker 1208 to a subsequent, second time marker 1210 and occurs over a time period extending from the first time marker 1208 to the second time marker 1210. This indicates that the data packets, frames, and/or datagrams for a communication between two or more of the devices 802, 804, 808, 814, 818 are received into and communicated out of the node device 902 starting at the time in the communication cycle indicated by the first time marker 1208 and ending at the second time marker 1210.

The data communication 1204 extends from a third time marker 1212 to a subsequent, fourth time marker 1214 and occurs over a time period extending from the third time marker 1212 to the fourth time marker 1214. This indicates that the data packets, frames, and/or datagrams for the same or different communication between two or more of the devices 802, 804, 808, 814, 818 (e.g., the same or different communication as the time markers 1208, 1210) are received into and communicated out of the node device 902 starting at the time in the communication cycle indicated by the third time marker 1212 and ending at the fourth time marker 1214.

The data communications 1202, 1204 through the node device 902 overlap in time. For example, during a time period extending from the third time marker 1212 to the second time marker 1210, the data of the first communication and the data of the second communication are being concurrently communicated through the same node device 902. This can indicate congestion in the node device 902 that can increase the latency of the first and second communications and thereby reduce the QoS parameters 828 of both the first and second data communications.

Figure 13:
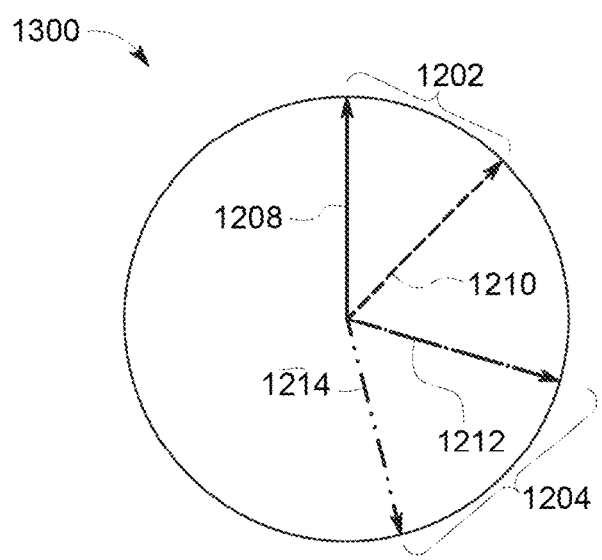
FIG. 13 illustrates another timing diagram for non-overlapping data communications during the single communication cycle of a node device shown in FIG. 9 according to one example.

To reduce the congestion within the node device 902 and increase the QoS parameters 828 of the first and second data communications, the scheduling controller(s) can change the schedule of the first or second communications. FIG. 13 illustrates another timing diagram 1300 for non-overlapping data communications 1202, 1204 during the single communication cycle of a node device 902 shown in FIG. 9 according to one example. Similar to the timing diagram 1200 shown in FIG. 12, the first data communication 1202 extends from the first time marker 1208 to the second time marker 1210 and the second data communication 1204 extends from the third time marker 1212 to the fourth time marker 1214.

For example, the scheduling controller(s) can delay the start (e.g., the third time marker 1212) of the second communication 1204 until after the end (e.g., the second time marker 1210) of the first communication 1202. This prevents the first and second communications 1202, 1204 from overlapping, as shown in FIG. 13. This can reduce congestion in the node device 902 (relative to overlapping communications) that can decrease the latency of the first and second communications 1202, 1204 and thereby increase the QoS parameters 828 of the first and/or second data communications 1202, 1204 (e.g., relative to overlapping communications). Additionally, the time period between the communications 1202, 1204 can allow for one or more additional communications through the node device 902 to occur.

Delaying some data communications through one or more node devices 902 can increase the QoS parameter 828 of some communications, but can decrease the QoS parameter 828 of other data communications. For example, delaying the start of the second communication 1204 in the timing diagram 1300 shown in FIG. 13 may increase the QoS parameter 828 of the first data communication 1202, but may decrease the QoS parameter 828 of the second data communication 1204. The scheduling controller(s) can determine which communications to delay or change the timing of to reduce latency and increase (or not decrease) the QoS parameters 828 of one or more communications based on tolerances associated with the QoS parameters 828.

A tolerance associated with a QoS parameter 828 is an allowance for a communication to not meet the requirement of limit or threshold for a QoS parameter 828. For example, some QoS parameters 828, such as a rate or amount of data in a communication, may have lower thresholds or limits to ensure timely delivery of the data to a device 802, 804, 808, 814, 818. A tolerance allows for the QoS parameter 828 to not meet the limit or threshold, but still be acceptable (e.g., and not result in the scheduling controller(s) revising the schedule(s)). The tolerances for different QoS limits or thresholds may be varied by an operator of the communication system.

The scheduling controller(s) may select which communications to vary and/or which device nodes 902 to change (e.g., delay) the communications based on the QoS tolerances. With respect to the examples of FIGS. 12 and 13, the first data communication 1202 may have a smaller or no QoS tolerance, while the second data communication 1204 may have a larger QoS tolerance. As a result, the scheduling controller(s) delay the second communication 1204 in the communication cycle, and not the first communication 1202. The delay in the second communication 1204 can result in the second communication 1204 not meeting the QoS limit or threshold, but still fall within the tolerance associated with the QoS parameter, while the QoS parameter of the first communication meets or exceeds the associated limit or threshold.

Figure 14:
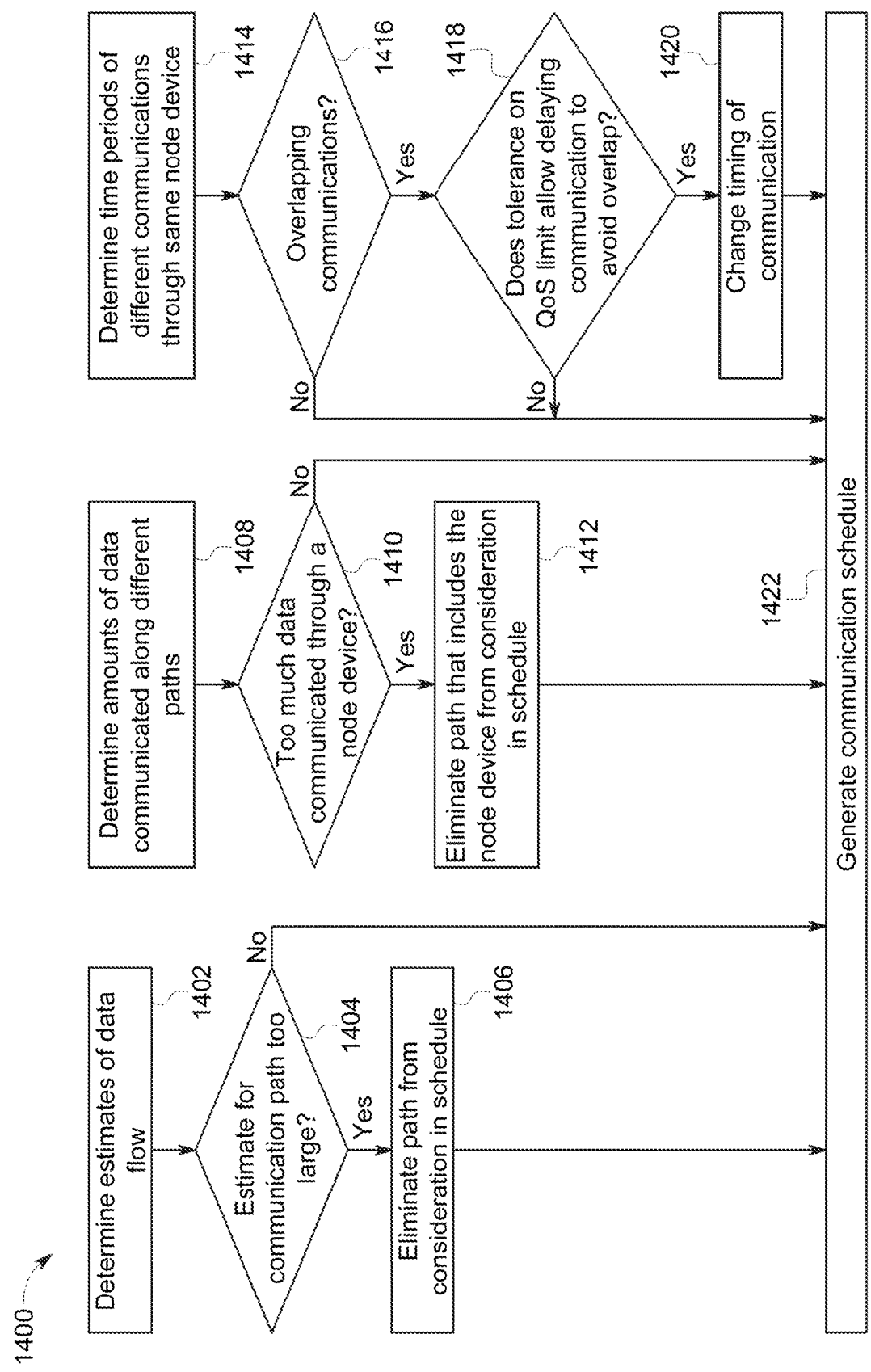
FIG. 14 illustrates a flowchart of one embodiment of a method for scheduling communications within a time sensitive network.

FIG. 14 illustrates a flowchart of one embodiment of a method 1400 for scheduling communications within a time sensitive network. The method 1400 may be performed by one or more embodiments of the scheduling controllers described herein. The method 1400 can represent the operations performed by software running on the scheduling controllers, or can be used to create such software. While the method 1400 relates to scheduling communications in a time sensitive network, in one embodiment, the method 1400 can be used to schedule communications in another type of network.

At 1402, estimates of data moving through the node devices in the network are determined. For example, one or more of the scheduling controllers may use network calculus to make a first order approximation of the bandwidth of the network that is consumed by the communications to occur within the network. The first order approximation may include estimated or designated amounts of data and/or bandwidth that are expected to be used by communicating various communications between and/or among the devices 802, 804, 808, 814, 818. The estimated amounts of data and/or bandwidth may be based on a source of the data and/or previous communications by the devices 802, 804, 808, 814, 818.

At 1404, a determination is made as to whether the estimated amount of data and/or bandwidth is too large. For example, some node devices may have upper limits or thresholds on the amount of data or bandwidth that can be communicated through the node devices. If the estimated amount of data and/or bandwidth is too large for a node device along a communication path, then flow of the method 1400 may proceed toward 1406. Otherwise, flow of the method 1400 can proceed toward 1422.

At 1406, the communication paths having the node device(s) for which the estimated amount of data and/or bandwidth is too large are eliminated from consideration. These paths may be eliminated from being considered for inclusion in a communication schedule for the network.

Concurrently or simultaneously with the operations performed at 1402 through 1406, the method 1400 optionally can include (at 1408) determining the amounts of data communicated along different paths in the network. The amounts of data communicated (or planned for communication) along the different paths can be represented by tensors, as described above.

At 1410, the amounts of data communicated along the different paths are examined to determine if the amount of data communicated along one or more of the paths in the network is too large. For example, the tensors can be examined to determine if any values within the tensors exceed thresholds or limits for the amount of data that can be communicated through node devices along one or more of the paths. If the amount of data communicated, planned, or requested for communication through a path is too large (e.g., exceeds an upper threshold or limit), then flow of the method 1400 can proceed toward 1412. Otherwise, flow of the method 1400 can proceed toward 1422.

Concurrently or simultaneously with the operations performed at 1402 through 1410, the method 1400 optionally can include (at 1414) determining the time periods over which different communications occur (or are scheduled to occur) through the same node device in the network. As described above, this can involve determining the portions of a communication cycle over which different communications (e.g., different data packets, frames, datagrams, or groups thereof originating from different devices and/or addressed to different devices) occur.

At 1416, a determination is made as to whether two or more different communications overlap during the same communication cycle in the same node device. As described above, this can involve determining whether one communication begins prior to completion of another communication at the same node device. If different communications occur through the same node device during overlapping time periods, then flow of the method 1400 may proceed toward 1418. Otherwise, flow of the method 1400 may proceed toward 1422.

At 1418, a determination is made as to whether a limit on a QoS parameter of one or more of the overlapping communications through the same node device allows for one or more of the communications to be delayed during the communication cycle. As described above, the limit on the QoS parameter for one of the communications may have a tolerance that allows the QoS parameter to be decreased below the limit. This can permit the communication to be delayed within the communication cycle to avoid overlapping different communications through the same node device. If one or more of the communications can be delayed, then flow of the method 1400 can proceed toward 1420. Otherwise, flow of the method 1400 can proceed toward 1422.

At 1420, the timing of at least one of the communications through the same node device is changed to avoid or decrease the amount of overlapping communications. For example, at least one of the communications may be delayed so as not to overlap another communication in the same communication cycle.

At 1422, a communication schedule is created for the network. The schedule may be created using the communication paths that did not involve estimated data traffic that was too large (e.g., as determined at 1404 and eliminated at 1406), using paths that avoid overloading node devices with too much data traffic (e.g., as determined at 1410 and eliminated at 1412), and/or using non-overlapping communication times within the same node devices (e.g., as determined at 1416 and/or changed at 1420).

In one embodiment, a node device includes routing circuitry configured to receive data from one or more other node devices within a communication network and to send the data to at least one other node device or a final destination device and a scheduling controller configured to generate schedules for sending the data through the routing circuitry within the communication network. The scheduling controller communicates with one or more other scheduling controllers in the one or more other node devices to generate the schedules for sending the data through the communication network.

In one example, the scheduling controller is configured to communicate with the one or more other scheduling controllers in the one or more other node devices in order to coordinate the schedules of the node device and the one or more other node devices with each other.

In one example, the communication network is configured to operate as a time sensitive network. The scheduling controller can be configured to generate the schedules for communication of the data between one or more writer devices and one or more reader devices of a data distribution service through the time sensitive network.

In one example, the scheduling controller is configured to generate the schedules for communication of the data using tensors representative of data traffic through one or more of the routing circuitry or the one or more other node devices.

In one example, the scheduling controller is configured to generate the schedules for communication of the data by estimating one or more of an amount of data communicated through the routing circuitry or a bandwidth consumed by the amount of data communicated through the routing circuitry and avoiding communicating the data through the routing circuitry responsive to the one or more of the amount of data or the bandwidth consumed exceeding a designated upper limit.

In one example, the scheduling controller is configured to generate the schedules by determining whether different communications of data through the routing circuitry will overlap in time during a communication cycle and generating the schedules to avoid the overlap in time of the different communications of data through the routing circuitry.

In one example, the scheduling controller is configured to generate the schedules to avoid the overlap in time responsive to a quality of service parameter of at least one of the different communications of data decreasing below a lower limit but remaining above a tolerance associated with the lower limit.

In one embodiment, a method includes determining (at one or more scheduling controllers in a time sensitive network) one or more of estimates of data to be routed through different communication paths in the time sensitive network, amounts of the data to be communicated through different node devices of the time sensitive network, and/or time periods in which different communications of the data occur during a communication cycle of the same node device of the time sensitive network. The method also includes generating (at the one or more scheduling controllers in the time sensitive network) schedules for sending the data through the different node devices based on one or more of: the estimates of data to be routed through the different communication paths by avoiding scheduling data to be communicated through at least one of the communication paths having a larger estimate of data, the amounts of the data to be communicated through the different node devices by avoiding scheduling data to be communicated through at least one of the node devices having a larger amount of the data to be communicated through the at least one of the node devices, and/or the time periods in which different communications of the data occur during the communication cycle of the node device by scheduling the different communications to occur during non-overlapping time periods in the communication cycle.

In one example, determining the one or more of estimates of data, amounts of data, or time periods and generating the schedules occur at plural scheduling controllers disposed within the node devices of the time sensitive network.

In one example, the method also includes coordinating the schedules of the node devices with each other.

In one example, the schedules dictate times and data to be communicated at the times for communication of the data between one or more writer devices and one or more reader devices of a data distribution service through the time sensitive network.

In one example, determining the amounts of the data to be communicated through the different node devices uses tensors to represent the amounts of the data.

In one example, the schedules are generated by avoiding communicating the data through the routing circuitry responsive to the amount of data to be communicated along a communication path in the time sensitive network exceeding a designated upper limit.

In one example, the schedules are generated by determining whether the different communications of data through the same node device will overlap in time during the communication cycle and generating the schedules to avoid the overlap in time of the different communications of data.

In one example, the schedules are generated to avoid the overlap in time responsive to a quality of service parameter of at least one of the different communications of data decreasing below a lower limit but remaining above a tolerance associated with the lower limit.

In one embodiment, a communication system includes node devices configured to route data packets between one or more writer devices of a data distribution service and one or more reader devices of the data distribution service according to schedules of the node devices. Each of the node devices can include a scheduling controller that determines the schedule for the corresponding node device. Alternatively, two or more of the node devices can share the same scheduling controller.

In one example, the node devices are configured to route the data packets in a time sensitive network.

In one example, the scheduling controllers of the node devices are configured to communicate with each other to coordinate the schedules of the respective node devices with each other.

In one example, the scheduling controllers are configured to generate the schedules using tensors representative of data traffic through one or more of the node devices.

In one example, the scheduling controllers are configured to generate the schedules by determining whether different communications of data through the same node device will overlap in time during a communication cycle and generating the schedules to avoid the overlap in time of the different communications of data through the same node device.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have significant consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). In one more embodiments, the feedback control system may be a software-defined network control system. A software-defined network control system can include a control system operated over a digital communication network in which the data plane and control plane are distinct. The feedback control system may continuously receive feedback and make adjustments to maintain a desired state. In one or more embodiments, the performance of the system may depend upon the timely receipt of the state information. If state feedback information is delayed, the entire control system may become unstable and may go out of control.

Some systems may use a time sensitive network (TSN) to communicate data associated with a particular application used in the control system. The TSN may be at least partially defined by a set of standards developed by the Time-Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

Conventionally, many communications are non-time sensitive communications and are transmitted in a "best effort" scenario. However, the communications received by the TSN for transmission through the network may not include any indication of whether they are a time-sensitive communication or a non-time sensitive communication. If the TSN is not aware of which communication has an associated schedule and which communication does not, it may make it difficult to configure all TSN traffic flows in a network and how they should be scheduled. For example, it is desirable for the TSN to distinguish between scheduled and unscheduled communications so that the unscheduled communications can be fit into the flow of the scheduled communications through the network.

While application developers may go back into the application code and designate particular communications as scheduled, and provide a schedule for that newly-designated communication, it may be undesirable. For example, the application code may have been validated to some degree, and it may be undesirable to have to re-verify control loops executed per the application; in some instances, the application developer may no longer be available to alter the application code.

In one or more embodiments, a TSN module is provided to label the communications (e.g., data frames) as scheduled or unscheduled, so that the TSN can appropriately schedule the data frame into the flow of communication traffic. The TSN module may, in one or more embodiments, analyze the data in each communication and compare the analyzed data to stored data to determine the appropriate label. In one or more embodiments, the data in each communication may include one or more patterns. In one or more embodiments, the stored data may include the one or more patterns, and one or more rules associated with each pattern. In one or more embodiments, the one or more rules may provide instructions to the TSN on how to direct the communication through the network.

An installed product can include any sort of mechanically operational asset including, but not limited to, jet engines, locomotives, gas turbines, and wind farms and their auxiliary systems as incorporated. The term is most usefully applied to large complex powered systems with many moving parts, numerous sensors and controls installed in the system. The product may be installed when the product is integrated into physical operations such as the use of engines in an aircraft fleet whose operations are dynamically controlled, a locomotive in connection with railroad operations, or apparatus construction in, or as part of, an operating plant building, machines in a factory or supply chain, etc. An installed product, asset, and powered system may refer to each other herein and can be used interchangeably.

As used herein, the term "automatically" may refer to, for example, actions that may be performed with little or no human interaction.

At least one technical effect of some embodiments is an improved and/or computerized technique and system for dynamically controlling a path of time-sensitive data and non-time-sensitive data through a network and a quality of service associated with the time-sensitive data, based upon the content of the data. Embodiments provide for traffic/data streams and quality of service that do not have to be tediously pre-configured, which may save time, labor and may reduce error. Embodiments provide for systems that do not have to be over-provisioned. Embodiments provide for a network that may adapt precisely to match the requirements of the data requirements, making a more efficient networked communication system. For example, real world benefits include a much less brittle system and a system with much less pre-configuration. Otherwise, each control system feedback path may have to be carefully and tediously specified by its location and route through a potentially complex communication network. Any changes to the control system or the communication network would likely break the timely feedback of information, the system would be "brittle." Embodiments provide for a system with much less pre-configuration, and a system that is less brittle because the content of the data is examined to determine whether it is time-critical. Embodiments allow for the control system and the communication to change, yet the time-critical data may continue to arrive within a required time bound.

Figure 15:
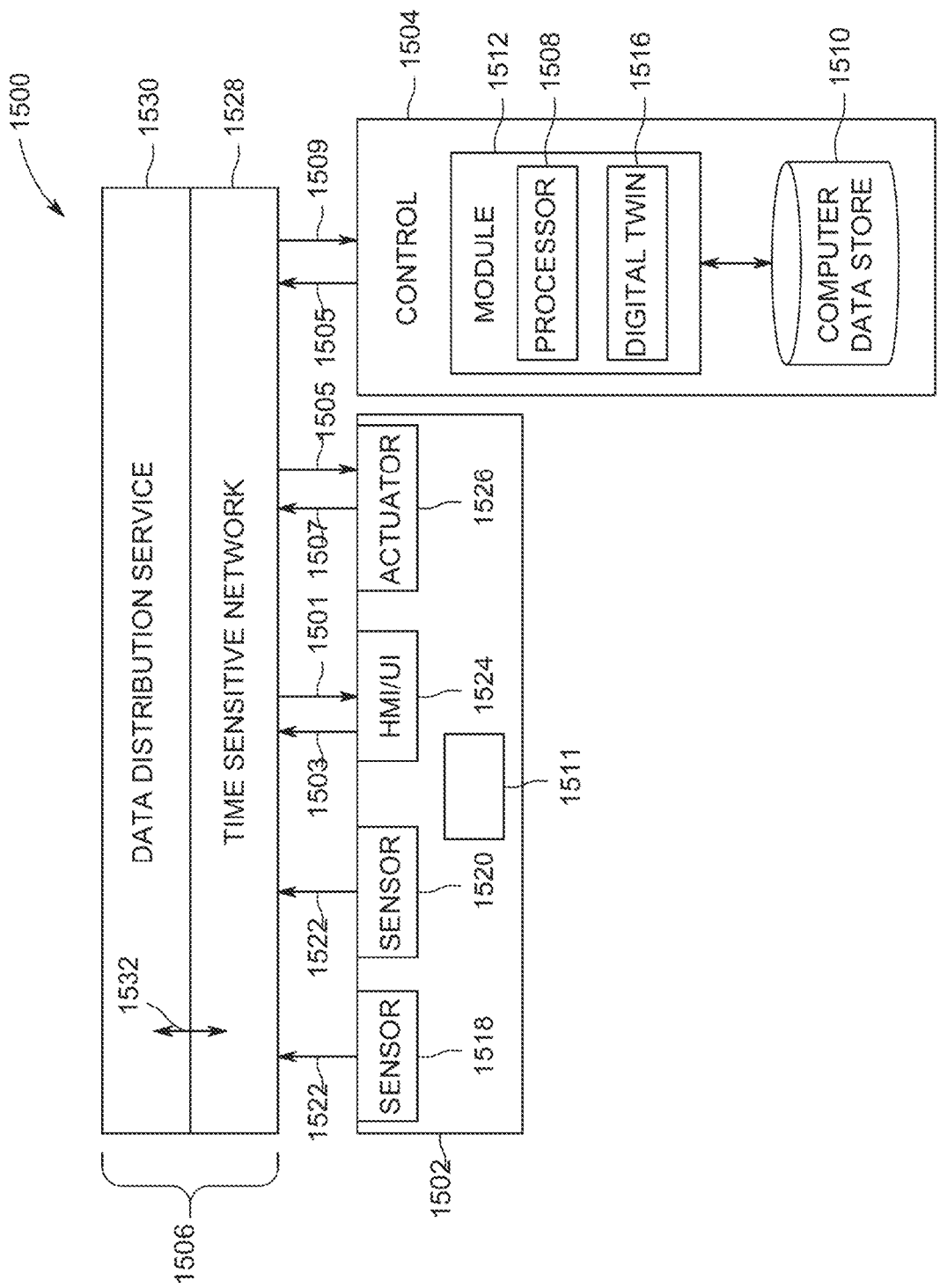
FIG. 15 illustrates a system according to some embodiments.

Turning to FIG. 15, a block diagram of a system 1500 architecture is provided according to some embodiments. The system 1500 may represent one or more of the powered systems described herein. The system 1500 may include at least one installed product 1502. As noted above, the installed product 1502 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 1502 may include a control system 1504 that controls operations of the installed product based on data obtained by, or generated by, and/or communicated among devices of the installed product, and communicates information between or among installed products, etc. to allow for automated control of the installed product, to provide information to operators of the installed product.

In one or more embodiments, the system 1500 may include a communication system 1506. The communication system 1506 may be used by the control system 1504 ("Control") to communicate data between or among devices of the control system 1504 and/or the installed product 1502 that is controlled by the control system 1504. The control system 1504 may represent hardware circuitry that includes and/or is connected with one or more processors 1508 (e.g., microprocessors, integrated circuits, field programmable gate arrays, etc.) that perform operations to control the installed product 1502.

In one or more embodiments, the control system 1504 may include a computer data store 1510 that may provide information to a Time Sensitive Network (TSN) module 1512 and may store results from the TSN module 1512. The communication system 1506 may supply data from at least one of the installed product 1502 and the data store 1510 to the TSN module 1512. The TSN module 1512 may include a digital twin 1516, and one or more processing elements 1508. The processor 1508 may, for example, be a conventional microprocessor, and may operate to control the overall functioning of the TSN module 1512. In one or more embodiments, the processor 1508 may be programmed with a continuous or logistical model of industrial processes that use the one or more installed products 1502.

In one or more embodiments, the TSN module 1512 may receive one or more data frames and then determine a classification for each received data frame. Based on the classification, the TSN module 1512, in one or more embodiments, may first generate a schedule to transmit each data frame through the communication system 1506, and then may transmit the data frames based on that schedule. In one or more embodiments, the control system 1504 may control one or more operations of the installed product 1502 based on the transmitted data frame(s).

In one or more embodiments, the data store 1510 may comprise any combination of one or more of a hard disk drive, RAM (random access memory), ROM (read only memory), flash memory, etc. The data store 1510 may store software that programs the processor 1508 and the TSN module 1512 to perform functionality as described herein.

The TSN module 1512, according to some embodiments, may access the data store 1510 and utilize the digital twin 1516 to create a prediction and/or result (e.g., a predicted schedule) that may be transmitted back to the installed product 1502 or to other systems (not shown), as appropriate (e.g., for display to a user, operation of the installed product, operation of another system, or input to another system).

In some embodiments, the communication system 1506 may supply output from the TSN module 1512 (and the elements included in the TSN module) to at least one of user platforms 1524, back to the installed product 1502, or to other systems. In some embodiments, signals received by the user platform 1524, installed product 1502 and other systems may cause modification in the state or condition or another attribute of one or more physical elements of the installed product 1502.

The communication system 1506 may communicate data between several devices of the installed product 1502, such as sensors 1518, 1520 that monitor, measure, record, etc. information and communicate this information as sensor data 1522. Another device that may communicate via the communications system 1506 may include a human machine interface (HMI) or user interface (UI) 1524 that receives output or status data 1501 that is to be presented to a user or operator of the communication system 1506 or control system 1504 and that may communicate input data 1503 received from the user or operator to one or more other devices of the control system 1504. The HMI/UI 1524 may represent a display device, a touchscreen, laptop, tablet computer, mobile phone, speaker, haptic device, or other device that communicates or conveys information to a user or operator. In accordance with any of the embodiments described herein, a user may access the system 1500 via one of the HMI/UI 1524 to view information about and/or manage the installed product 1502.

In one embodiment, at least one of the sensors 1518, 1520 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that may communicate using the communication system 1506 includes one or more actuators 1526, which may represent devices, equipment, or machinery that move to perform one or more operations of the installed product 1502 that is controlled by the control system 1504. Examples of actuators 1526 include brakes, throttles, robotic devices, medical imaging devices, lights, turbines, etc. The actuators 1526 may communicate status data 1507 of the actuators 1526 to one or more other devices of the installed product 1502 via the communication system 1506. The status data 1507 may represent a position, state, health, or the like, of the actuator 1526 sending the status data 1507. The actuators 1526 may receive command data 1505 from one or more other devices of the installed product or control system via the communication system 1506. The command data 1505 may represent instructions that direct the actuators 1526 how and/or when to move, operate, etc.

The control system 1504 may communicate (e.g., receive, transmit, and/or broadcast) a variety of data between or among the devices via the communication system 1506 at the behest of or as directed by one or more software applications 1511. For example, the control system 1504 may communicate the command data 1505 to one or more of the devices and/or receive data 1509, such as status data 1507 and/or sensor data 1522, from one or more of the devices. While devices are shown in FIG. 15 as sending certain data or receiving certain data, optionally, the devices may send and/or receive other types of data. For example, the sensors 1518, 1520 may receive data and/or send other types of data.

The communication system 1506 communicates data between or among the devices and/or control system 1504 using a communication network 1528 that may communicate data using a data distribution service 1530. The data distribution service 1530 can be a network middleware application that may make it easier to configure publishers and subscribers on a network. Other middleware applications may be used. In other embodiments, the data distribution service 1530 is not included, and the application(s) 1511 may manage the installed product 1502 (and its devices) on its own. The network 1528 is shown in FIG. 15 as a time sensitive network, but alternatively may be another type of network. For example, devices, including those associated with the system 1500 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data distribution service 1530 may represent an object management group (OMG) device-to-device middleware communication standard between the devices and the network. The data distribution service 1530 may allow for communication between publishers and subscribers. The term publisher may refer to devices 1504, 1518, 1520, 1524, and 1526 that send data to other devices 1504, 1518, 1520, 1524, 1526 and the term subscriber refers to devices 1504, 1518, 1520, 1524, and 1526 that receive data from other devices 1504, 1518, 1520, 1524, and 1526. The data distribution service 1530 is network agnostic in that the data distribution service 1530 may operate on a variety of networks, such as Ethernet networks as one example. The data distribution service 1530 may operate between the network through which data is communicated and the applications communicating the data (e.g., the devices 1504, 1518, 1520, 1524, and 1526). The devices 1504, 1518, 1520, 1524, and 1526 may publish and subscribe to data over a distributed area to permit a wide variety of information to be shared among the devices 1504, 1518, 1520, 1524, and 1526.

In one embodiment, the data distribution service 1530 is used by the devices 1504, 1518, 1520, 1524, and 1526 to communicate data 1501, 1503, 1505, 1507, 1509, 1522 through the network 1528, which may operate on an Ethernet network of the installed product. The network 1528 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." As a result, some data may not reach devices connected via the non-TSN Ethernet network in sufficient time for the devices to operate using the data. With respect to some control systems, the late arrival of data may have significant consequences, as described above. A TSN-based deterministic Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 1506 may use the network 1528 to communicate data between or among the devices 1504, 1518, 1520, 1524, and 1526 using the data distribution service 1530 to maintain Quality of Service (QoS) parameters 1532 of certain devices 1504, 1518, 1520, 1524, and 1526. As used herein, QoS may refer to a time-sensitive networking quality of service. In one or more embodiments, the QoS parameters 1532 of the devices 1504, 1518, 1520, 1524, and 1526 may represent requirements for data communication between or among the devices 1504, 1518, 1520, 1524, and 1526, such as upper limits on the amount of time or delay for communicating data between or among the devices 1504, 1518, 1520, 1524, and 1526. The QoS parameters 1532 may, for example, indicate whether transmission of a data frame will be scheduled or "best effort;" and if the data frame is scheduled, the QoS may also indicate a maximum acceptable latency in transmission.

In one or more embodiments, the QoS parameter 1532 may dictate a lower limit or minimum on data throughput in communication between or among two or more devices 1504, 1518, 1520, 1524, and 1526. In one or more embodiments, the QoS parameter 1532 may be used to ensure that data communicated with one or more devices 1504, 1518, 1520, 1524, and 1526, to one or more devices 1504, 1518, 1520, 1524, and 1526, and/or between two or more devices 1504, 1518, 1520, 1524, and 1526 is received in a timely manner (e.g., at designated times or within designated time periods). In one or more embodiments, the QoS parameter 1532 may be defined by one or more other parameters. Examples of these other parameters may include a deadline parameter, a latency parameter, and/or a transport priority parameter.

The deadline parameter may dictate an upper limit or maximum on the amount of time available to send and/or receive data associated with a particular topic, in one or more embodiments. In one or more embodiments, the deadline parameter may relate to the total time the data spends in an application, operating system and network. In one or more embodiments, the deadline parameter may be used to check the network latency (e.g., the network latency is required to be less than the deadline as an initial requirement for being valid). Data may be associated with a particular topic when the data is published by one or more designated devices (e.g., sensors measuring a particular characteristic of the installed product, such as speed, power output, etc.), then the data represents the particular characteristic (even if the data comes from different devices at different times), and/or is directed to the same device (e.g., the same actuator 1526).

In one or more embodiments, the latency parameter may dictate an upper limit or maximum on a temporal delay in delivering data to a subscribing device 1504, 1518, 1520, 1524, and 1526 of the data. For example, the sensors 1518, 1520 may publish data 1522 representative of operations of the installed product, and the HMI/UI 1524, actuator 1526, and/or control system 1504 may require receipt of the sensor data 1522 within a designated period of time after the data 1522 is published by the sensors 1518, 1520. For example, for a sensor 1518 that communicates a temperature of a motor or engine reaching or exceeding a designated threshold indicative of a dangerous condition, the control system 1504 and/or actuator 1526 may need to receive this temperature within a designated period of time to allow the control system 1504 and/or actuator 1526 to implement a responsive action, such as decreasing a speed of the engine or motor, shutting down the engine or motor, etc. In one or more embodiments, the latency period may refer to the time the data spends in the network only. In one or more embodiments, the TSN 1528 may only relate to a network portion of the delay (as opposed to delays in the application, and operating system portions)

In one or more embodiments, the transport priority parameter may indicate relative priorities between two or more of the devices 1504, 1518, 1520, 1524, and 1526 to the network. Some devices 1504, 1518, 1520, 1524, and 1526 may have higher priority than other devices 1504, 1518, 1520, 1524, and 1526 to receive (or subscribe to) certain identified types or sources of data. Similarly, some devices 1504, 1518, 1520, 1524, and 1526 may have higher priority than other devices 1504, 1518, 1520, 1524, and 1526 to send (or publish) certain identified types or sources of data. Subscribing devices 1504, 1518, 1520, 1524, and 1526 having higher priorities than other devices 1504, 1518, 1520, 1524, and 1526 may receive the same data via the network from a source of the data prior to the lower-priority devices 1504, 1518, 1520, 1524, and 1526. Publishing devices 1504, 1518, 1520, 1524, and 1526 having higher priorities than other devices 1504, 1518, 1520, 1524, and 1526 may send the data that is obtained or generated by the higher-priority devices 1504, 1518, 1520, 1524, and 1526 into the network than lower-priority devices 1504, 1518, 1520, 1524, and 1526.

In one or more embodiments, the QoS parameters 1532 of the devices 1504, 1518, 1520, 1524, and 1526 may be defined by one or more, or a combination, of the deadline parameter, latency parameter, and/or transport priority parameter. In one or more embodiments, the QoS parameters 1532 may then be used to determine data transmission schedules within the TSN using the data distribution service 1530. Data transmission schedules may dictate times at which data is communicated within the network at nodes along the path. By providing times for the "nodes along the path," the schedule may also suggest the path itself. However, the suggested path may not be clear if there are many TSN flows taking common paths.

Figure 16:
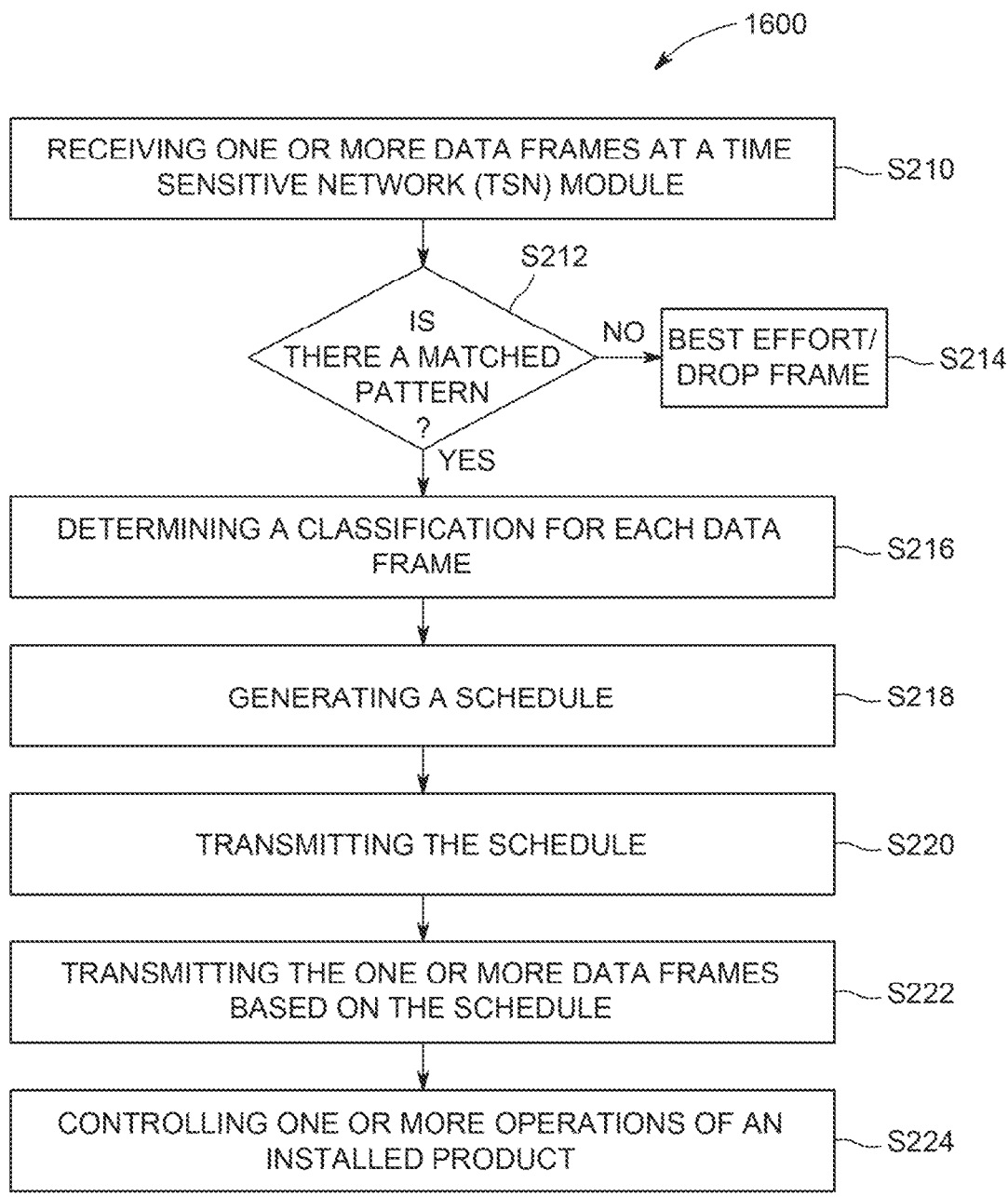
FIG. 16 illustrates a flow diagram according to some embodiments.
Figure 17:
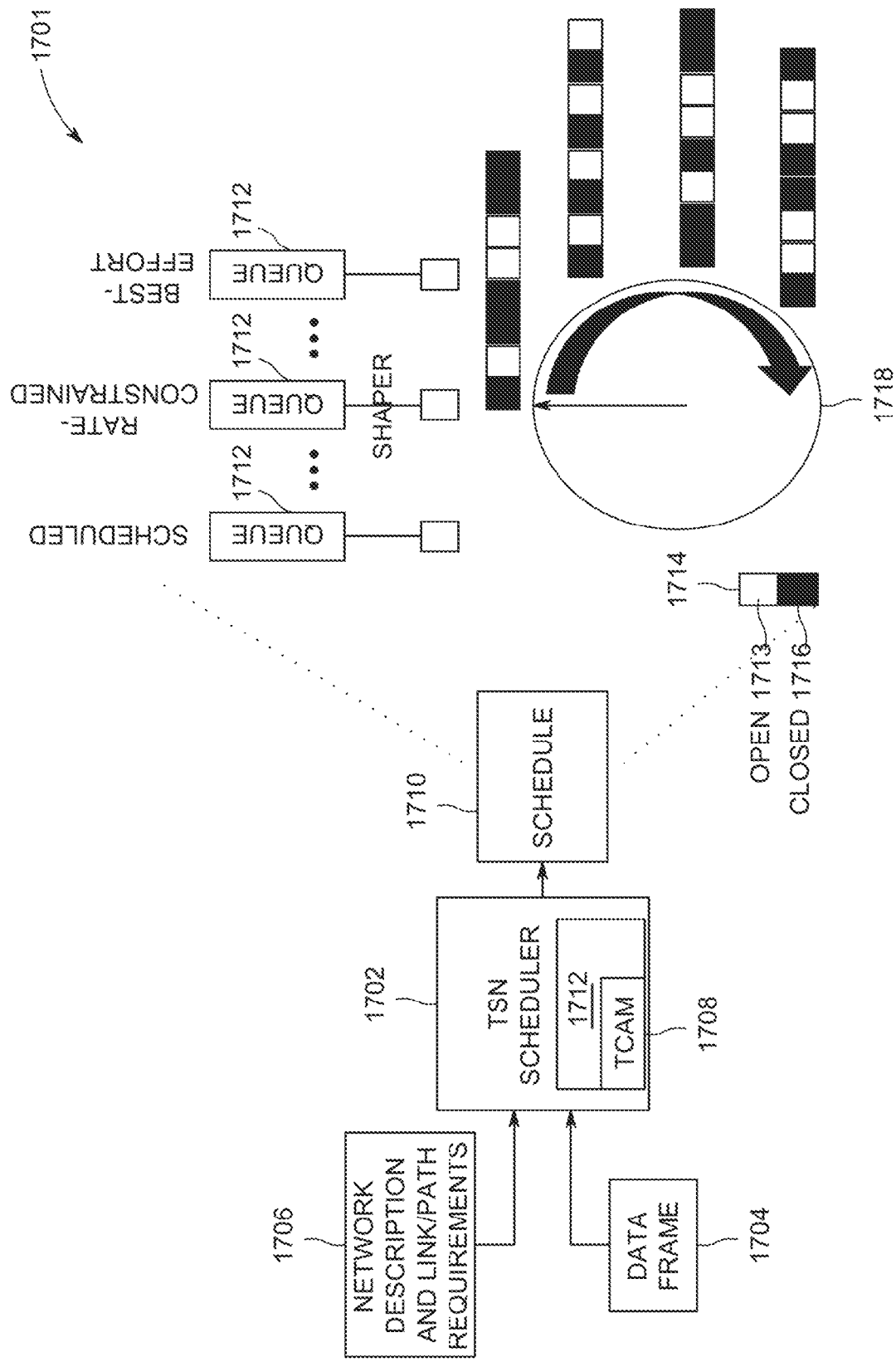
FIG. 17 illustrates a block diagram according to some embodiments.

Turning to FIGS. 16 and 17, a flow diagram and block diagram, of an example of operation according to some embodiments is provided. In particular, FIG. 16 provides a flow diagram of a process 1600, according to some embodiments. Process 1600, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 1500 is conditioned to perform the process 1600 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments may be practiced in any order that is practicable.

Figure 18:
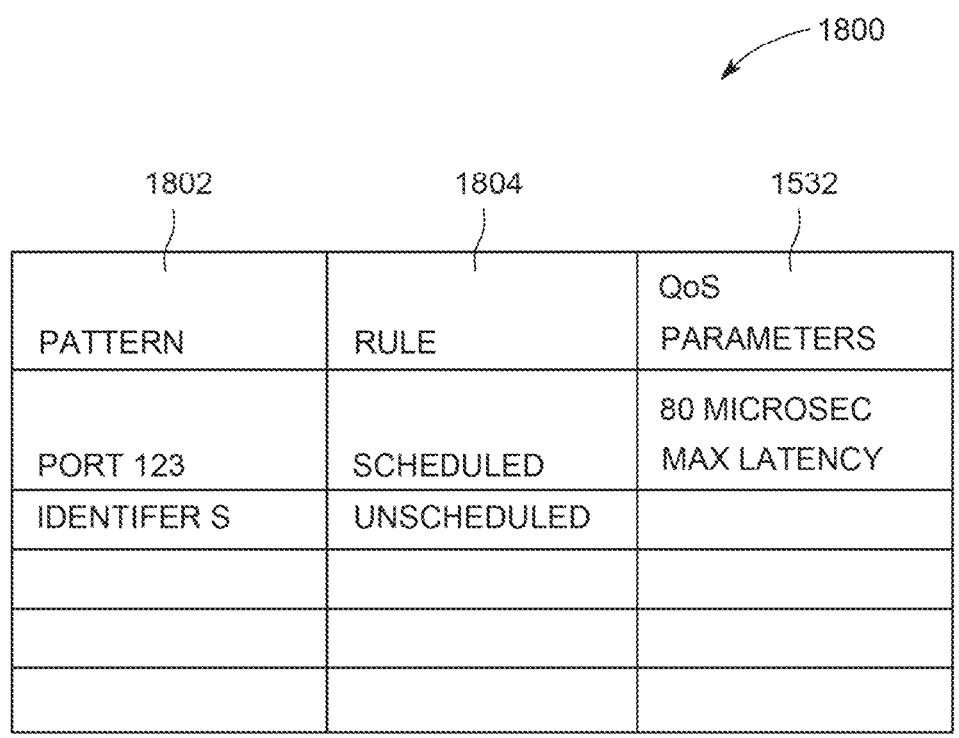
FIG. 18 illustrates a map according to some embodiments.

In one or more embodiments, prior to beginning process 1600, a pattern data map 1800 (FIG. 18) may be created to identify at least one pattern 1802 that may occur in a data frame of a communication data packet, and where in the frame the pattern occurs. In one or more embodiments, the pattern data map 1800 may also provide rules 1804 for how the data frame should be transmitted through the network. In one or more embodiments, the pattern data map 1800 may be used to dictate how and/or when data frames are communicated. In one or more embodiments, the patterns 1802 and rules 1804 populating the pattern data map 1800 may be provided by one or more software application developers who create the applications executed by the control system 1504. For example, the pattern may be an ETP port number (e.g., if the port number is 123, then this data frame is an unscheduled data frame and should be transmitted in an appropriately prescribed action). As another example, with respect to the publisher/subscriber process, when data is published by one or more designated devices (e.g., sensors measuring a particular characteristic of the installed product such as speed, power output, etc.) The data may be associated with a particular topic. The pre-defined "topic" may have a specific identifier tagged deep in the data frame, and this identifier may be the pattern in the pattern data map 1800.

In one or more embodiments, the application developer may define distinct patterns in the existing code for a data frame and the QoS parameters 1532 for that data frame. Of note, by having the application developer define distinct patterns in the code for existing applications in one or more embodiments, no changes need to be made to the application itself to categorize a data frame as scheduled or unscheduled. An advantage of mapping the patterns as described by one or more embodiments may be that communication streams and quality of service do not have to be tediously pre-configured at the application development level, which may save time, labor and reduces error. Another advantage of pattern mapping is that the network may adapt precisely to match the requirements of communication traffic requirements by changing rules and patterns, in the pattern data map, instead of changing the application code. Other advantages include the system may not have to be over-provisioned. As used herein, over-provisioning means reserving more routes/paths than necessary in case the network needs to use them due to some unanticipated change in the system. For example, setting up TSN flows between everyone for every possible latency requirement. This uses up network resources that may never really be utilized and requires a larger more expensive network that may not be needed except for rare cases. In some examples, it may be preferable to only configure what is required at each instant in time, that is, dynamically change the configuration as needed to match what is required by the control system, as provided by one or more embodiments.

As described above, the TSN network 1528 may allow for the transmission of both classes of communication (e.g., scheduled and best effort/random) in the same network. Conventionally, when a data frame is received in a TSN network, there may be no indication of whether the frame is a scheduled frame or an unscheduled frame. In some instances, the application may mark the data frame as a scheduled frame, and may provide schedule information, but this may not always be the case. Further, there may be several different methods to mark the data frame, but it is not always evident which method is being used.

In one or more embodiments, a scheduler 1702 may schedule both classes of communication traffic through the network 1528. In one or more embodiments, the network 1528 may include a plurality of destinations or nodes. The nodes may be connected to the communication system via one or more communication paths or links. The communication links may be connected to each other via ports and/or switches. In one or more embodiments, two or more data frame transmission paths or flows may overlap. Data frames may collide where these transmission paths overlap, and collisions may result in the frames being dropped and not delivered to their respective destinations. As such, the scheduler 1702 may fit the unscheduled/best effort frames into a schedule with the scheduled frames, so that the data frames do not collide and instead reach the appropriate destination at an appropriate time.

Initially, at S210, one or more data packets, made of one or more data frames 1704, are received at a TSN module 1512 within the scheduler 1702 at a switch 1701. While FIG. 17 shows the scheduler 1702 located at the switch 1701, the scheduler 1702 may reside anywhere within the network 1528. In one or more embodiments, the scheduler 1702 may communicate with all switches and end systems (e.g., devices of the installed product) to configure them. In one or more embodiments, the TSN module 1512 may include a Ternary Content Addressable Memory (TCAM) 1708. The TCAM 1708 may be defined to operate on a specific physical port, a set of ports, or all the ports in a network. In one or more embodiments, the TCAM 1708 may receive the data packet from one or more devices 1504, 1518, 1520, 1524, and 1526 and may divide the packet into the one or more data frames 1704. In one or more embodiments, each data frame may be temporarily placed in the TCAM 1708, where one or more rules are applied to the frame, before the frame is moved out of the TCAM 1708 to an appropriate transmission queue 1712, as described further below. In one or more embodiments, the TCAM 1708 may compare an arrival time of the data frame at the TCAM 1708 to an expected arrival time window for the data frame. In one or more embodiments, when the data frame arrives outside the expected arrival time window, the data frame may be flagged as having an error or as having been subject to a potentially malicious action. In one or more embodiments, when the data frame arrives outside the expected arrival time window, the data frame may be dropped. In one or more embodiments, when the data frame arrives outside the expected arrival time window, the data frame may be subject to other suitable user-defined actions.

In one or more embodiments, the scheduler 1702 may also receive a network topology description and path or link requirements 1706 (e.g., an indication of time sensitive paths, maximum latencies, physical link bandwidths, size of frames ("payload"), and frame destination) from an application 1511 (FIG. 15) and/or toolchain, or any other suitable source. As described below, in one or more embodiments if a feasible schedule cannot be created, then an error may be sent back to the application/toolchain. As provided by one or more embodiments, reducing frame size or allowing a longer latency may increase the likelihood of finding a feasible schedule. The relationship between maximum latencies, links/path and frame size may also be dependent upon the network topology, and may be referred to as an "NP-complete" problem.

Then at S212 a determination is made whether each received data frame 1704 includes a pattern that matches, or substantially matches, a pattern 1802 in the pattern data map 1800. In one or more embodiments, the TCAM 1708 may analyze each data frame 1704 to determine whether any patterns from the pattern data map 1800 exist in the data frame 1704. Conventionally, the Ethernet data frame is standardized and includes a header with reserved fields that may not include any TSN information. The header may include a destination address, a source address and an Ether type. In one or more embodiments, the data frame may also include data (e.g., payload (e.g., IP, ARP) and a CRC Checksum.

In one or more embodiments, the TCAM 1708 may search deeper within the frame than the Ethernet header for a pattern. For example, the TCAM 1708 may search the Internet Protocol (IP) header or payload itself for a pattern. In one or more embodiments, the TSN scheduler 1702 may configure the TCAM 1708 as part of the scheduling process so that frame identifiers may be set as time-sensitive or best effort. In one or more embodiments, the application may indicate where to look in the frame for the pattern. In one or more embodiments, a packet analyzer (e.g., Wireshark®) may analyze the frame to determine a pattern location. In one or more embodiments, the TSN scheduler 1702 may include an "active network" feature, whereby the TSN scheduler 1702 may learn to determine a pattern location without a specific instruction.

In one or more embodiments the pattern in the data frame 1704 may exactly match the pattern in the pattern data map 1800 for the TCAM 1708 to determine a "pattern match" (e.g., the pattern in the data frame matches the pattern in the pattern data map). In one or more embodiments, the pattern in the data frame 1704 may substantially but not exactly match the pattern in the pattern data map 1800 for the TCAM to determine a "pattern match." In one or more embodiments, a threshold may be applied to determine whether a data frame that does not exactly match the pattern in the pattern data map 1800 may still be considered a pattern match. For example, the threshold may be 20% such that if a pattern in a data frame matches 80% or more of the pattern in the pattern data map 1800, the pattern in the data frame is a pattern match. Other suitable thresholds may be used. In one or more embodiments, the threshold may be set by an administrator or an application developer or other suitable party.

If the received data frame 1704 does not include any pattern matches, the process proceeds to S214 and the frame may be treated as "best effort" traffic in one or more embodiments. In one or more embodiments, if the received data frame 1704 does not include any pattern matches, the data frame may be dropped in S214. In one or more embodiments, when a data frame 1704 has an inappropriate pattern (e.g., a pattern that does "hit" i.e. match any filters in the TCAM), the data frame 1704 may be flagged as having an error or as having been subject to a potentially malicious action. In one or more embodiments, the data frame may be dropped and not put through the system and/or an administrator may be alerted. Other suitable user-defined actions may be taken.

If the received data frame 1704 does include a pattern match, the process proceeds to S216 and a classification is determined for each received data frame 1704 with a pattern match, in one or more embodiments. In one or more embodiments, each received data frame 1704 may be classified as scheduled or unscheduled. In one or more embodiments, the TSN module 1512 inserts classification data into the reserved fields of the Ethernet header to indicate whether the data frame is unscheduled or scheduled, and if it is scheduled, the field includes an indication of which flow or queue to send the data frame to. In one or more embodiments, the queues may be assigned a priority; higher priority queues receive service before lower-priority queues. If a frame is unscheduled, it may go into the lowest priority queue.

Then in S218 a schedule 1710 is generated. In one or more embodiments, the schedule may include a transmission time for the unscheduled data frames in relation to a transmission time for the scheduled data frames. As used herein, the transmission time may be an offset from a period, where the period may be defined as part of the schedule. In one or more embodiments, the period may continuously repeat, and the transmission time may be a precise offset within the period. In one or more embodiments, the schedule 1710 may be based on the rules associated with the particular pattern in the pattern data map 1800 as well as the network topology description and path or link requirements 1706. In one or more embodiments, the transmission time for the scheduled data frames is based on an upper limit on a delay in transmitting the data (maximum transmission latency). In one or more embodiments, the schedule 1710 may include the frame transmission times (e.g., the time a gate will open to release the data frame, as described below, for transmission to a given destination node). In one or more embodiments, the determined communication pathway for each data frame avoids contention with each other. The schedule 1710 may include other suitable information. In one or more embodiments, the pattern data map 1800 may include a hierarchy of rules whereby if multiple patterns are detected, the rules having a higher priority may be applied to the data frame. For example, if a pattern is a UDP Source or Destination Port Number, a rule may be to place the frame in a particular TSN flow identified by the sender mac-address and a unique TSN flow number, e.g. XX:XX:XX: XX.1, where X is an Ethernet address (as in 08:56:27:6f: 2b:9c).

In one or more embodiments, different sets of rules may be applied based on a determined level of analysis of the content of the data frame. Similar to the hierarchy of rules described above, the TCAM 1708 may search different levels of the data frame 1704 based on anything in the frame but may be with respect to a hardware dependent depth limit into the frame. Examples include, Internet Protocol addresses, header values, DSCP (IP level priority code point), and application data such as the topic of conversation in the frame. The TCAM may also look at the entropy of the frame (e.g., the degree of randomness of the data) to classify the type of frame. In particular, entropy may relate to a degree of compression of the frame. For example, with executable data, the binary output of a processor may be complex and may then be hard to compress; it may have a lower degree of compression. A text document, on the other hand, may be comparatively simpler and then easy to compress; it may have a higher degree of compression. In one or more embodiments a threshold may be used to determine whether the degree of compression correlates to a best-effort classification or a time-sensitive classification.

In one or more embodiments, the TSN network 1528 may include a plurality of queues 1712 (e.g., Queue 0, 1, 2, 3, 4 . . . 7, etc.) for transmitting the data frames 1704 to their respective destinations. In one or more embodiments the queues 1712 may be prioritized, with Queue 0 being the lowest priority and Queue 7 being the highest priority, for example. In one or more embodiments, scheduled data frames may be given a highest priority, while unscheduled/best effort data frames may be given a lower priority. In one or more embodiments, rate-constrained data frames may be assigned a priority between the scheduled data frames and the unscheduled/best effort data frames. As used herein, rate-constrained traffic is somewhere between scheduled and best effort. Rate-constrained traffic is not scheduled, but its throughput may still be controlled such that bursts of traffic are spread over a wider interval and congestion is reduced. In other words, the traffic may be "shaped" so that its rate follows a pre-configured distribution. In one or more embodiments, each queue 1712 may include a gate 1713 that may be open 1714 or closed 1716, and may only allow transmission of a data frame at the scheduled time by opening and closing per the schedule. In one or more embodiments, the scheduler 1702 may assign each data frame 1704 to a particular queue 1712 based on a priority associated therewith. In one or more embodiments, the scheduler 1702 may assign each data frame 1704 to a particular queue 1712 based on other criteria. Then the gate 1713 for each queue 1712 may be opened and closed to allow the flow of data frames 1704 based on the schedule 1710, such that more than one frame is not output from the collection of queues 1712 at a time. For example, the gate on Queue 1 may be closed while the gate for Queue 3 is open and the data frame 1704 is transmitted from Queue 3. As described above, when a data frame 1704 is output from more than one queue 1712 at the same or substantially the same time, the data frames may collide and destroy themselves. In one or more embodiments, the operation of the queue gates may be synchronized to a same clock 1718. Of note, the synchronization is important, especially for high priority traffic, to make sure the gates are closed at precisely the right time to avoid collision and to get the data frame through the network in the required latency period (within the maximum latency as set as an input to the scheduler 1702).

Turning back to the process, in S220 the schedule 1710 is transmitted. In one or more embodiments, the schedule 1710 may be downloaded onto all the devices 1504, 1518, 1520, 1524, and 1526 and switches in the network 1528.

Then in S222, the schedule 1710 is executed and the one or more data frames 304 are transmitted through the network 1528 based on the schedule 1710. And then in S224, one or more operations of the installed product may be controlled based on the transmitted data frames. For example, as described above, the locomotive or rail vehicle system now may apply its brakes early enough to avoid a collision based on the transmitted data frames.

In one or more embodiments, the schedule 1710 may dynamically change while the schedule 1710 is being executed. For example, with respect to a feedback control system, the system may be tasked with maintaining a stability of the system, and may make changes to the maximum latency input, for example. These changes may be fed back to the scheduler 1702 to dynamically change the maximum acceptable latency for at least one particular data frame(s) in an application, which in turn may change the schedule 1710 as the schedule 1710 is being executed.

Figure 19:
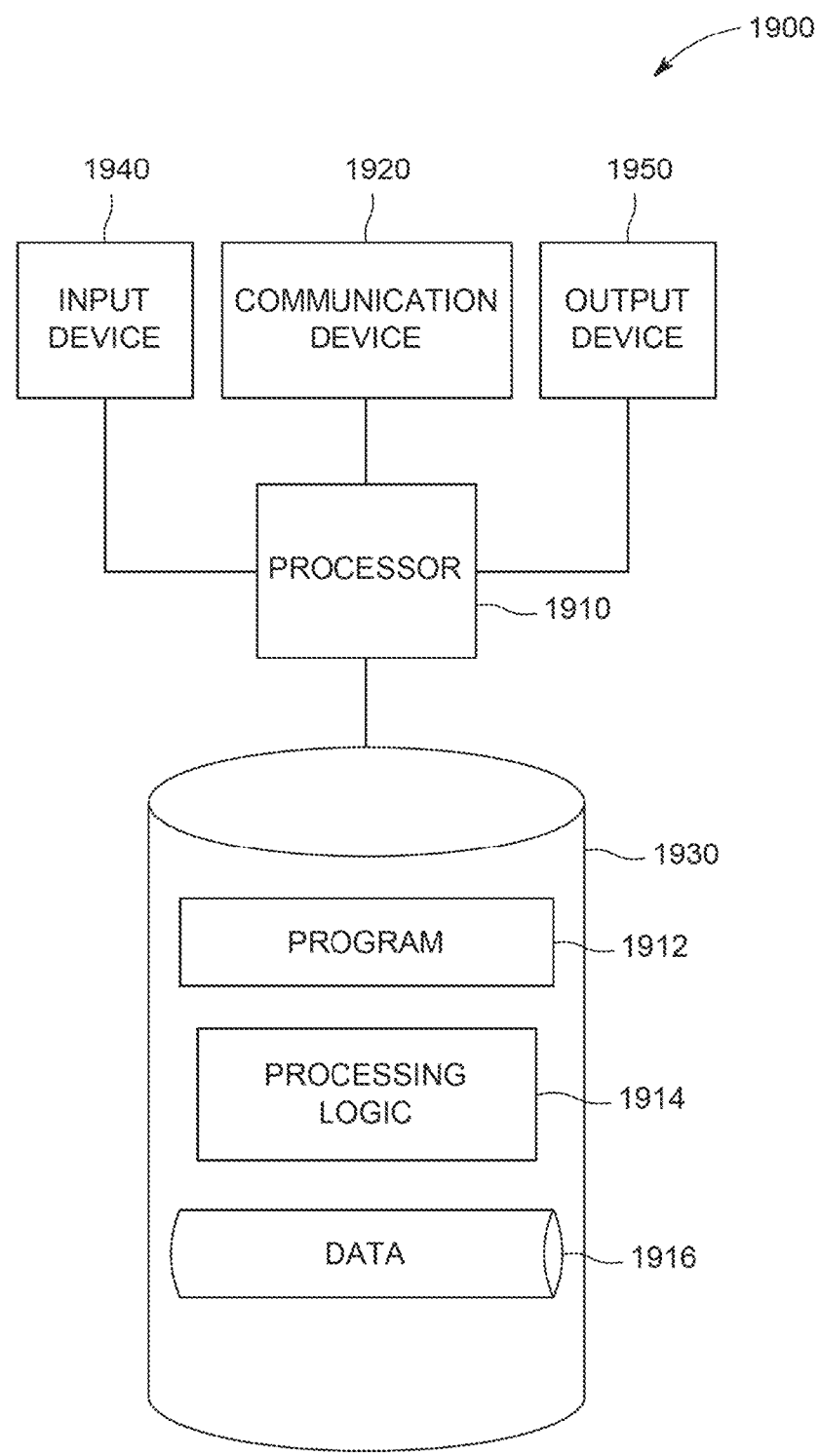
FIG. 19 illustrates a block diagram of a system according to some embodiments.

Note the embodiments described herein may be implemented using any number of different hardware configurations. For example, FIG. 19 illustrates a TSN communication traffic content platform 1900 that may be, for example, associated with the system 1500 of FIG. 15. The TSN communication traffic content platform 1900 comprises a TSN communication traffic content processor 1910 ("processor"), such as one or more commercially available Central Processing Units (CPUs) in the form of one-chip microprocessors, coupled to a communication device 1920 configured to communicate via a communication network (not shown in FIG. 19). The communication device 1920 may be used to communicate, for example, with one or more users. The TSN communication traffic content platform 1900 further includes an input device 1940 (e.g., a mouse and/or keyboard to enter information) and an output device 1950 (e.g., to output and display the assessment and recommendation).

The processor 1910 also communicates with a memory/storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 may store a program 1912 and/or TSN communication traffic content processing logic 1914 for controlling the processor 1910. The processor 1910 performs instructions of the programs 1912, 1914, and thereby operates in accordance with any of the embodiments described herein. For example, the processor 1910 may receive data and then may apply the instructions of the programs 1912, 1914 to determine a schedule for the transmission of the data frames.

The programs 1912, 1914 may be stored in a compressed, uncompiled and/or encrypted format. The programs 1912, 1914 may furthermore include other program elements, such as an operating system, a database management system, and/or device drivers used by the processor 1910 to interface with peripheral devices.

As used herein, information may be "received" by or "transmitted" to, for example: (i) the platform 1900 from another device; or (ii) a software application or module within the platform 1900 from another software application, module, or any other source.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have significant consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). In one or more embodiments, the feedback control system may be a networked control system. As used herein, a "networked control system" is a control system operated over a digital communication network). The feedback control system may continuously receive feedback and make adjustments to maintain a desired state. In one or more embodiments, the performance of the system may depend upon the timely receipt of the state information. If state feedback information is delayed, the entire control system may become unstable and may go out of control.

Some systems may use a time sensitive network (TSN) to communicate data associated with a particular application used in the control system. The TSN may be at least partially defined by a set of standards developed by the Time-Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

In one or more embodiments, a TSN scheduler creates a set of constraints and solves for the solution that meets the constraints. In particular, the TSN scheduler may generate a schedule that fits the unscheduled communications into the flow of the scheduled communications through the network. In one or more embodiments, the TSN scheduler may receive as input a destination for the communication and an expected arrival time of that communication at the destination. The expected arrival time may be in the form of a maximum tolerable latency. Then, based on this information, the TSN scheduler may generate a schedule. In one or more embodiments, the schedule may include instructions about when to open and close one or more gates of one or more network queues to allow the transmission of the communication. In one or more embodiments, the TSN scheduler may solve the problem of enabling multiple flows of traffic to exist on a same Ethernet network such that Ethernet frames reach their destination at predetermined times, regardless of the topology of the network or the rates of flows of traffic running in the network.

However, scheduling is a complex process, and the generated schedule may not be correct. For example, the generated schedule may not have a correct latency (e.g., the latest time the data frame may arrive at the destination.) Further, even if the schedule is correct, the schedule may not be implemented correctly in the system.

One or more embodiments provide for the verification of the generated schedule. In one or more embodiments, a verification module may receive a generated schedule from the scheduler. The verification module may also receive an expected destination and an expected arrival time for the communication to arrive at the destination (e.g., in the form of a maximum tolerable latency). The verification module may then access a system (e.g., a live feedback control system or a digital twin) as the communications are being sent to determine if each communication is arriving at its intended destination.

The term "installed product" should be understood to include any sort of mechanically operational entity or asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain, etc. As used herein, the terms "installed product," "asset," and "powered system" may be used interchangeably.

As used herein, the term "automatically" may refer to, for example, actions that may be performed with little or no human interaction.

A technical effect of some embodiments is an improved and/or computerized technique and system for dynamically verifying and controlling a path of time-sensitive data and non-time-sensitive data through a network. Embodiments provide for the automated testing and verification of results of a scheduler on a real system. Embodiments provide for a schedule that avoids errors and provides scheduling guidance and feedback to a user. Embodiments provide for a network that may verify and adapt a schedule to precisely to match the requirements of the data requirements, making a more efficient networked communication system. For example, real world benefits include testing of TSN networks, validating pre-computed TSN schedules on a network, understanding to what degree a given TSN schedule can be supported on a different or faulty network, incrementally adjusting a TSN schedule to adapt to changes in both the network and the application frame delivery latency requirements.

Figure 20:
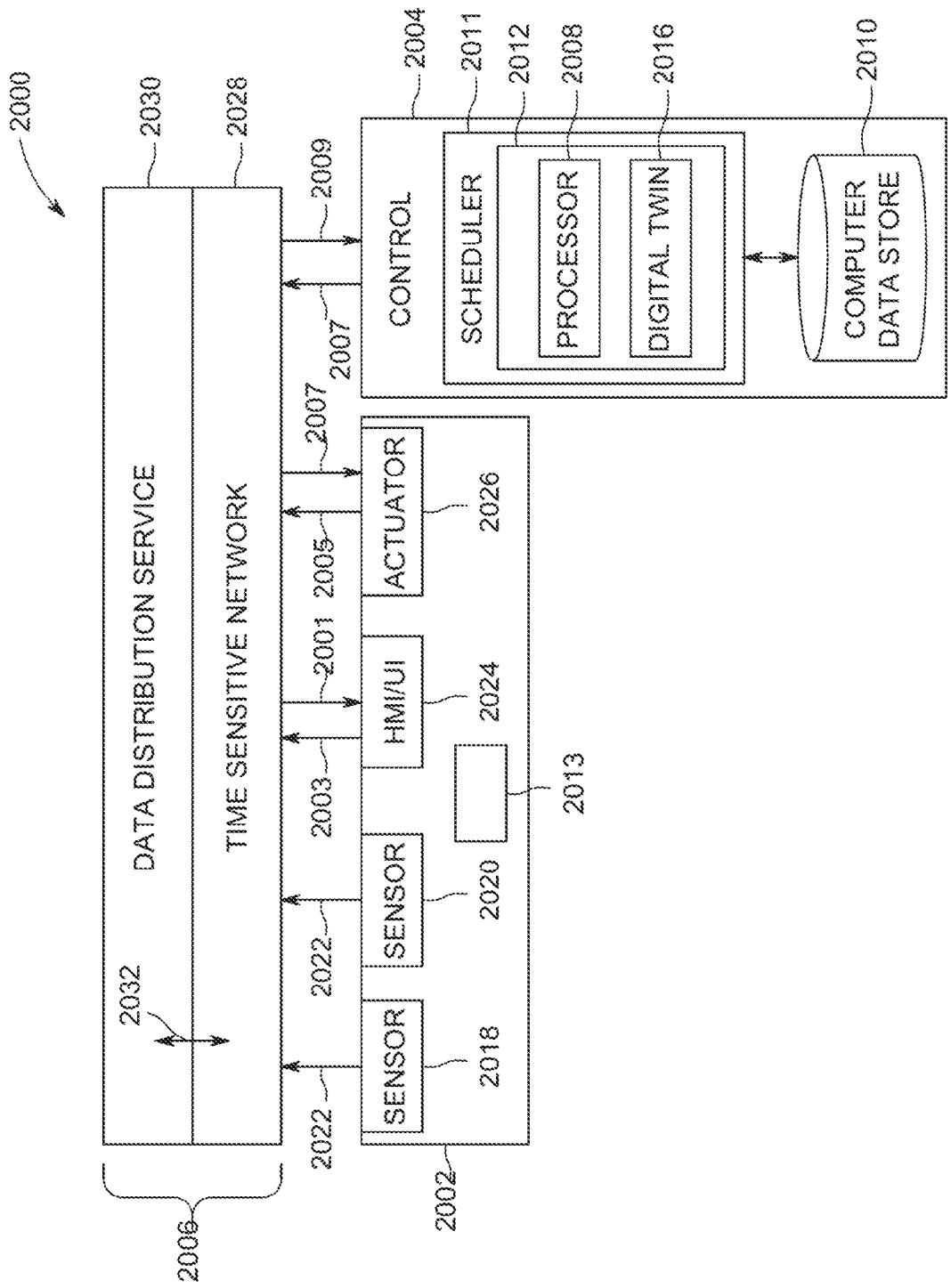
FIG. 20 illustrates a system according to some embodiments.

Turning to FIG. 20, a block diagram of a system 2000 architecture is provided according to some embodiments. The system 2000 may represent one or more of the powered systems described herein. The system 2000 may include at least one installed product 2002. As noted above, the installed product 2002 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 2002 may include a control system 2004 that controls operations of the installed product based on data obtained by, or generated by, and/or communicated among, devices of the installed product, and communicates information between or among installed products, etc. to allow for automated control of the installed product, to provide information to operators of the installed product.

In one or more embodiments, the system 2000 may include a communication system 2006. The communications system 2006 may be used by the control system 2004 ("Control") to communicate data between or among devices of the control system 2004 and/or the installed product 2002 that is controlled by the control system 2004. The control system 2004 may represent hardware circuitry that includes and/or is connected with one or more processors 2008 (e.g., microprocessors, integrated circuits, field programmable gate arrays, etc.) that perform operations to control the installed product 2002.

In one or more embodiments, the control system 2004 may include a computer data store 2010 that may provide information to a scheduler 2011 and to a verification module 2012, and may store results from the scheduler 2011 and the verification module 2012. The communication system 2006 may supply data from at least one of the installed product 2002 and the data store 2010 to the scheduler 2011 and the verification module 2012. The verification module 2012 may be a component of the scheduler 2011 and may include one or more processing elements 2008 and a digital twin 2016. The processor 2008 may, for example, be a conventional microprocessor, and may operate to control the overall functioning of the verification module 2012. In one or more embodiments, the processor 2008 may be programmed with a continuous or logistical model of industrial processes that use the one or more installed products 2002.

The digital twin 2016 may, for example, be a computer model that virtually represents the state of the installed product 2002. The digital twin 2016 may model an operating performance of a twinned physical system using sensors, communications, modeling, history and computation. It may provide an answer in a time frame that is useful, that is, meaningfully priori to a projected occurrence of a failure event or suboptimal operation. The digital twin 2016 may include a code object with parameters and dimensions of its physical twin's parameters and dimensions that provide measured values, and keeps the values of those parameters and dimensions current by receiving and updating values via outputs from sensors embedded in the physical twin. The digital twin 2016 may have respective virtual components that correspond to essentially all physical and operational components of the installed product 2002 and combinations of products or assets that comprise an operation.

As used herein, references to a "digital twin" should be understood to represent one example of a number of different types of modeling that may be performed in accordance with teachings of this disclosure.

In one or more embodiments, the verification module 2012 may receive a generated schedule 2210 (FIG. 22) from the scheduler 2011 to transmit each data frame through the communication system per the schedule. The verification module 2012 may also receive a destination information 2221 about a destination 2220 for each data frame and a maximum tolerable latency 2224 for the data frame to arrive at the destination. In one or more embodiments, the destination information 2221 and the maximum tolerable latency 2224 may be provided by an application being executed by the control system 2004. As used herein, "maximum tolerable latency" may refer to the latest time the data frame may arrive at the destination.

The verification module 2012 may then, in one or more embodiments, analyze the schedule 2210 with respect to the received destination information 2221 and maximum tolerable latency 2224 to determine if the schedule 2210 is correct. In one or more embodiments, the verification module 2012 may receive the schedule 2210 at the same time, or at substantially the same time, as one or more queues 2212 (FIG. 22) in the communication system 2006, such that the verification module 2012 is verifying the schedule while the data frames 2204 (FIG. 22) are being transmitted through the communication system 2006 via the queues. In one or more embodiments, the verification module 2012 may receive the schedule 2210 prior to the schedule's transmission to the queues, such that the verification module 2012 may verify the schedule 2210 prior to the data frames 2204 being transmitted through the communication network 2006. After the verification module 2012 verifies the schedule, the verification module 2012 may verify the schedule 2210 is being implemented in the system 2000 correctly. In one or more embodiments, the control system 2004 may control one or more operations of the installed product 2002 based on the transmitted data frame(s) 2204.

In one or more embodiments, the data store 2010 may comprise any combination of one or more of a hard disk drive, RAM (random access memory), ROM (read only memory), flash memory, etc. The data store 2010 may store software that programs the processor 2008, the scheduler 2011 and the verification module 2012 to perform functionality as described herein.

The verification module 2012, according to some embodiments, may access the data store 2010 and then utilize the digital twin 2016 to create a prediction and/or result (e.g., a predicted schedule) that may be transmitted back to the installed product 2002 or to other systems (not shown), as appropriate (e.g., for display to a user, operation of the installed product, operation of another system, or input to another system).

In some embodiments, the communication system 2006 may supply output from the scheduler 2011 and the verification module 2012 (and the elements included in therein) to at least one of user platforms 2024, back to the installed product 2002, or to other systems. In some embodiments, signals received by the user platform 2024, installed product 2002 and other systems may cause modification in the state or condition or another attribute of one or more physical elements of the installed product 2002.

The communication system 2006 may communicate data between several devices of the installed product 2002, such as sensors 2018, 2020 that monitor, measure, record, etc. information and communicate this information as sensor data 2022. Another device that may communicate via the communications system 2006 may include a human machine interface (HMI) or user interface (UI) 2024 that receives output or status data 2001 that is to be presented to a user or operator of the communication system 2006 or control system 2004 and that may communicate input data 2003 received from the user or operator to one or more other devices of the control system 2004. The HMI/UI 2024 may represent a display device, a touchscreen, laptop, tablet computer, mobile phone, speaker, haptic device, or other device that communicates or conveys information to a user or operator. In accordance with any of the embodiments described herein, a user may access the system 2000 via one of the HMI/UI 2024 to view information about and/or manage the installed product 2002.

In one embodiment, at least one of the sensors 2018, 2020 may be a camera that generates video or image data, an x-ray detector, an acoustic pick-up device, a tachometer, a global positioning system receiver, a wireless device that transmits a wireless signal and detects reflections of the wireless signal to generate image data representative of bodies or objects behind walls, sides of cars, or other opaque bodies, or another device.

Another device that may communicate using the communication system 2006 may include one or more actuators 2026, which may represent devices, equipment, or machinery that move to perform one or more operations of the installed product 2002 that is controlled by the control system 2004. Examples of actuators 2026 include brakes, throttles, robotic devices, medical imaging devices, lights, turbines, etc. The actuators 2026 may communicate status data 2005 of the actuators 2026 to one or more other devices of the installed product 2002 via the communication system 2006. The status data 2005 may represent a position, state, health, or the like, of the actuator 2026 sending the status data 2005. The actuators 2026 may receive command data 2007 from one or more other devices of the installed product or control system via the communication system 2006. The command data 2007 may represent instructions that direct the actuators 2026 how and/or when to move, operate, etc.

The control system 2004 may communicate (e.g., receive, transmit, and/or broadcast) a variety of data between or among the devices via the communication system 2006 at the behest of or under the direction of one or more software applications 2013. For example, the control system 2004 may communicate the command data 2007 to one or more of the devices and/or receive data 2009, such as status data 2005 and/or sensor data 2022, from one or more of the devices. While devices are shown in FIG. 20 as sending certain data or receiving certain data, optionally, the devices may send and/or receive other types of data. For example, the sensors 2018, 2020 may receive data and/or send other types of data.

The communication system 2006 communicates data between or among the devices and/or control system 2004 using a communication network 2028 that may communicate data using a data distribution service 2030. The data distribution service 2030 can be a network "middleware" application that may make it easier to configure publishers and subscribers on a network. Other middleware applications may be used. In other embodiments, the data distribution service 2030 is not included, and the application(s) 2013 may manage the installed product 2002 (and its devices) on its own. The network 2028 (from FIG. 20) is a time sensitive network, but alternatively may be another type of network. For example, devices, including those associated with the system 2000 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data distribution service 2030 may represent an object management group (OMG) device-to-device middleware communication standard between the devices and the network. The data distribution service 2030 may allow for communication between publishers and subscribers. The term "publisher" may refer to devices 2004, 2018, 2020, 2024, and 2026 that send data to other devices 2004, 2018, 2020, 2024, 2026 and the term "subscriber" may refer to devices 2004, 2018, 2020, 2024, and 2026 that receive data from other devices 2004, 2018, 2020, 2024, and 2026. The data distribution service 2030 is network agnostic in that the data distribution service 2030 may operate on a variety of networks, such as Ethernet networks as one example. The data distribution service 2030 may operate between the network through which data is communicated and the applications communicating the data (e.g., the devices 2004, 2018, 2020, 2024, and 2026). The devices 2004, 2018, 2020, 2024, and 2026 may publish and subscribe to data over a distributed area to permit a wide variety of information to be shared among the devices 2004, 2018, 2020, 2024, and 2026.

In one embodiment, the data distribution service 2030 may be used by the devices 2004, 2018, 2020, 2024, and 2026 to communicate data 2001, 2003, 2005, 2007, 2009, 2022 through the network 2028, which may operate on an Ethernet network of the installed product 2002. The network 2028 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." As a result, some data may not reach devices connected via the non-TSN Ethernet network in sufficient time for the devices to operate using the data. With respect to some control systems, the late arrival of data may have significant consequences, as described above. A TSN-based deterministic Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 2006 may use the network 2028 to communicate data between or among the devices 2004, 2018, 2020, 2024, and 2026 using the data distribution service 2030 to maintain Quality of Service (QoS) parameters 2032 of certain devices 2004, 2018, 2020, 2024, and 2026. As used herein, "QoS" may refer to a time-sensitive networking quality of service. In one or more embodiments, the QoS parameters 2032 of the devices 2004, 2018, 2020, 2024, and 2026 may represent requirements for data communication between or among the devices 2004, 2018, 2020, 2024, and 2026, such as upper limits on the amount of time or delay for communicating data between or among the devices 2004, 2018, 2020, 2024, and 2026.

In one or more embodiments, the QoS parameter 2032 may dictate a lower limit or minimum on data throughput in communication between or among two or more devices 2004, 2018, 2020, 2024, and 2026. In one or more embodiments, the QoS parameter 2032 may be used to ensure that data communicated with one or more devices 2004, 2018, 2020, 2024, and 2026, to one or more devices 2004, 2018, 2020, 2024, and 2026, and/or between two or more devices 2004, 2018, 2020, 2024, and 2026 is received in a timely manner (e.g., at designated times or within designated time periods). In one or more embodiments, the QoS parameter 2032 may be defined by one or more other parameters. Examples of these other parameters may include a deadline parameter, a latency parameter, and/or a transport priority parameter.

The deadline parameter may dictate an upper limit or maximum on the amount of time available to send and/or receive data associated with a particular topic, in one or more embodiments. In one more embodiments, the deadline parameter may relate to the total time the data spends in an application, operating system and network. In one or more embodiments, the deadline parameter may act as a check on the network latency (e.g., the network latency is required to be less than the deadline as an initial requirement for being valid). Data may be associated with a particular topic when the data is published by one or more designated devices (e.g., sensors measuring a particular characteristic of the installed product, such as speed, power output, etc.), then the data represents the particular characteristic (even if the data comes from different devices at different times), and/or is directed to the same device (e.g., the same actuator 2026). In one or more embodiments, the latency parameter may dictate an upper limit or maximum on a temporal delay in delivering data to a subscribing device 2004, 2018, 2020, 2024, and 2026. For example, the sensors 2018, 2020 may publish data 2022 representative of operations of the installed product, and the HMI/UI 2024, actuator 2026, and/or control system 2004 may require receipt of the sensor data 2022 within a designated period of time after the data 2022 is published by the sensors 2018, 2020. For example, for a sensor 2018 that communicates a temperature of a motor or engine reaching or exceeding a designated threshold indicative of a dangerous condition, the control system 2004 and/or actuator 2026 may need to receive this temperature within a designated period of time to allow the control system 2004 and/or actuator 2026 to implement a responsive action, such as decreasing a speed of the engine or motor, shutting down the engine or motor, etc. In one or more embodiments, the latency period may refer to the time the data spends in the network only. In one or more embodiments, the TSN 2028 may only relate to a network portion of the delay (as opposed to delays in the application, and operation system portions).

In one or more embodiments, the transport priority parameter may indicate relative priorities between two or more of the devices 2004, 2018, 2020, 2024, and 2026 to the network. Some devices 2004, 2018, 2020, 2024, and 2026 may have higher priority than other devices 2004, 2018, 2020, 2024, and 2026 to receive (or subscribe to) certain identified types or sources of data. Similarly, some devices 2004, 2018, 2020, 2024, and 2026 may have higher priority than other devices 2004, 2018, 2020, 2024, and 2026 to send (or publish) certain identified types or sources of data. Subscribing devices 2004, 2018, 2020, 2024, and 2026 having higher priorities than other devices 2004, 2018, 2020, 2024, and 2026 may receive the same data via the network from a source of the data prior to the lower-priority devices 2004, 2018, 2020, 2024, and 2026. Publishing devices 2004, 2018, 2020, 2024, and 2026 having higher priorities than other devices 2004, 2018, 2020, 2024, and 2026 may send the data that is obtained or generated by the higher-priority devices 2004, 2018, 2020, 2024, and 2026 into the network than lower-priority devices 2004, 2018, 2020, 2024, and 2026.

In one or more embodiments, the QoS parameters 2032 of the devices 2004, 2018, 2020, 2024, and 2026 may be defined by one or more, or a combination, of the deadline parameter, latency parameter, and/or transport priority parameter. In one or more embodiments, the QoS parameters 2032 may then be used by the scheduler 2011 to determine data transmission schedules 2210 within the TSN using the data distribution service 2030. Data transmission schedules 2210 may dictate times at which data is communicated within the network at nodes along the path. However, by providing times for the "nodes along the path," the schedule also suggests the path itself. The suggested path may not be clear if there are many TSN flows taking common paths.

Figure 21:
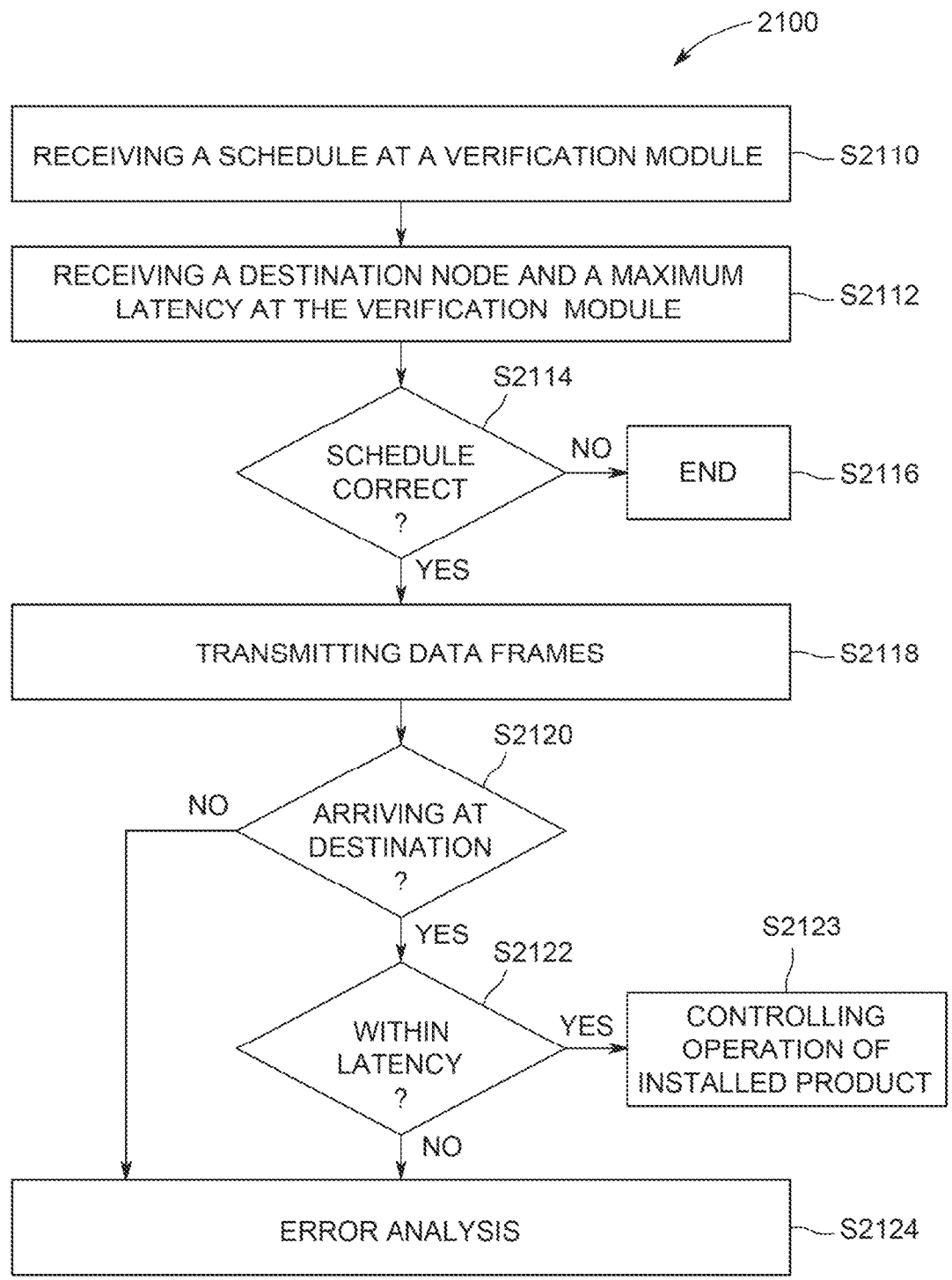
FIG. 21 illustrates a flow diagram according to some embodiments.
Figure 22:
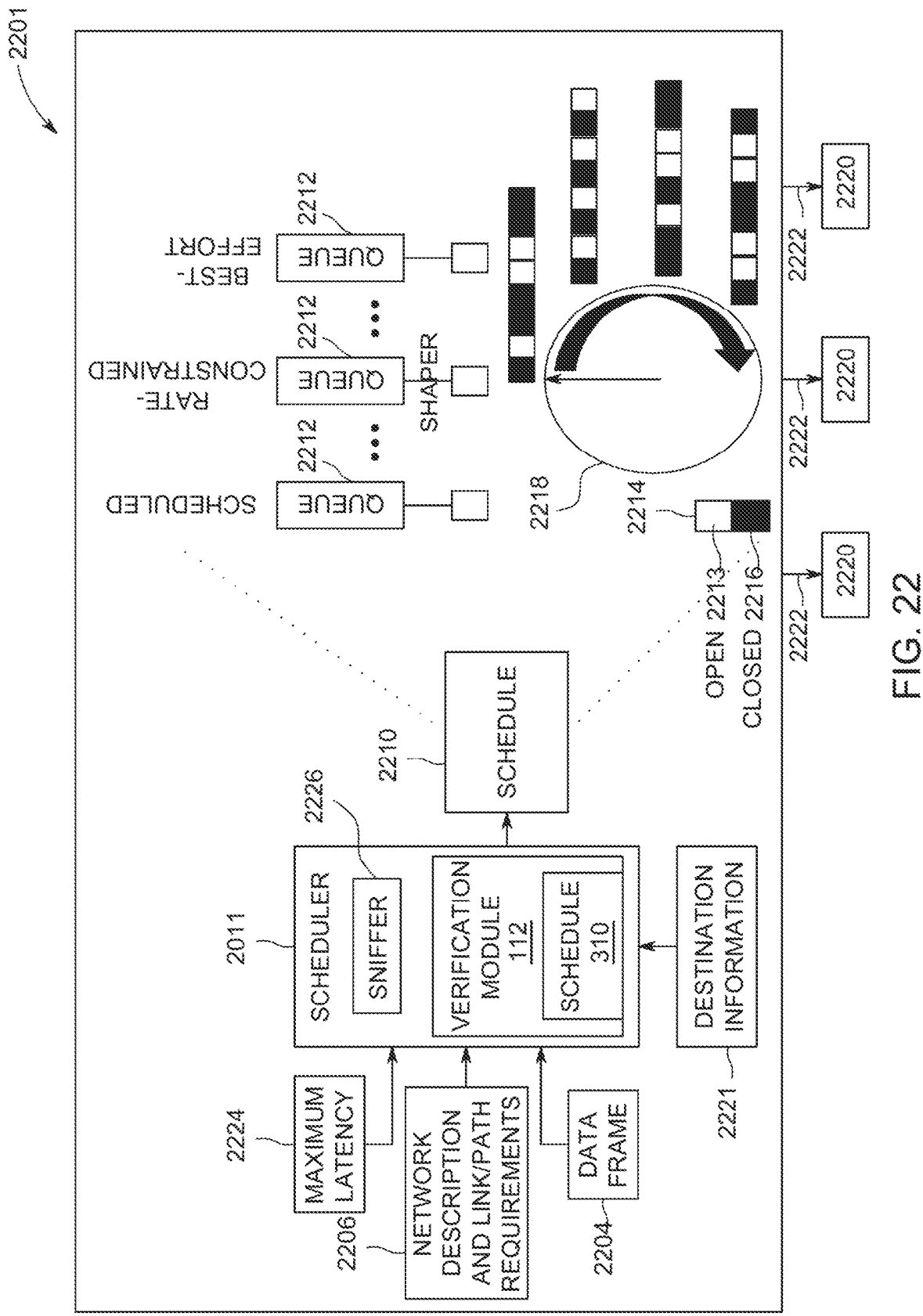
FIG. 22 illustrates a block diagram according to some embodiments.
Figure 23:
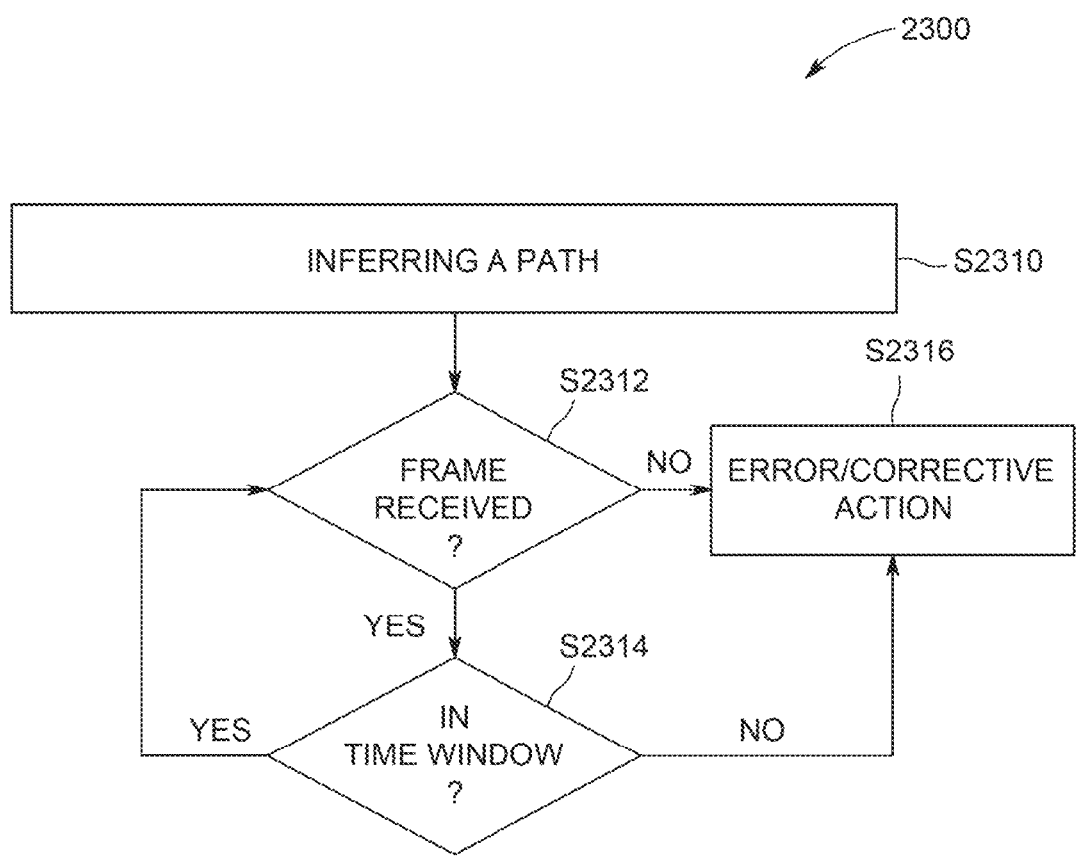
FIG. 23 illustrates a flow diagram according to some embodiments.

Turning to FIGS. 21 through 23, these figures provide flow diagrams and a block diagram of an example of operation according to some embodiments. In particular, FIGS. 21 and 23 provide a flow diagram of a process 2100, 2300, according to some embodiments. Processes 2100 and 2300, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 2000 is conditioned to perform the processes 2100 and 2300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments may be practiced in any order that is practicable.

In one or more embodiments, the network 2028 may include a plurality of destinations 2220 or nodes. The nodes may be connected to the communication system via one or more communication paths 2222 or links. The communication links 2222 may be connected to each other via ports and/or switches 2201. In one or more embodiments, two or more data frame transmission paths or flows may overlap. Data frames 2204 may collide where these transmission paths overlap, and collisions may result in the frames being dropped and not delivered to their respective destinations 2220. As such, the scheduler 2011 may fit unscheduled/best effort frames into a schedule 2210 with scheduled frames, so that the data frames 2204 do not collide and instead reach the appropriate destination at an appropriate time.

In one or more embodiments, the TSN network 2028 may include a plurality of queues 2212 (e.g., Queue 0, 1, 2, 3, 4 . . . 7, etc.) for transmitting the data frames 2204 to their respective destinations 2220. In one or more embodiments, the queues may exist in all interfaces—both on the end-system (e.g., device) and in each port (connection) of the switch 2201. In one or more embodiments, each queue 2212 may include a gate 2213 that may be in an open position 2214 or a closed position 2216, and may only allow transmission of the data frame 2204 when in the open position 2214. In one or more embodiments, the operation of the queue gates may be synchronized to a same clock 2218. Of note, the synchronization is important, especially for high priority traffic, to make sure the gates are closed at precisely the right time to avoid collision and to get the data frame through the network per the schedule 2210. In one or more embodiments, the scheduler 2011 executes calculations, based on the received input, to determine the openings/closing gate times along the path of the flow to meet the destination 2220 and arrival times (e.g., within the maximum latency), as specified by the application. In one or more embodiments, the content of the schedule 2210 specifies gate openings/closings along the path of a flow, as described in the TSN standard.

In one or more embodiments, prior to beginning process 2100, the scheduler 2011, located at the switch 2201 receives input from at least one application to create the schedule 2210. While FIG. 22 shows the scheduler 2011 located the switch 2201, the scheduler 2011 may reside anywhere within the network 2028. In one or more embodiments, the scheduler 2011 may communicate with all switches and end systems to configure them. The input may include at least one of one or more data packets made of one or more data frames, the destination 2220 of the data frames, and the maximum latencies 2224. The scheduler 2011 may receive other suitable input. For example, the scheduler 2011 may also receive a network topology description and path or link requirements 2206 (e.g., an indication of time sensitive paths, physical link bandwidths, size of frames ("payload")) from an application 2013 and/or toolchain, or any other suitable source. The scheduler 2011 may then generate a schedule 2210 for communication traffic through the network 2028.

Initially, at S2110, the verification module 2012 receives a schedule 2210 for the transmission of one or more data frames 2204 to one or more destinations 2220 via the TSN 2028.

Then, at S2112, the verification module 2012 receives destination information 2221 for each data frame 2204 and a maximum tolerable latency 2224 for the respective data frame 2204 to arrive at the destination 2220. In one or more embodiments, the order of S2110 and S2112 may be reversed, whereby the verification module 2012 receives the destination information 2221 and maximum tolerable latency 2224 first and then receives the schedule 2210. In one or more embodiments, S2110 and S2112 may occur at the same, or substantially the same, time.

Then, at S2114, the verification module 2012 determines whether the schedule 2210 is correct. In one or more embodiments, one or more elements of the schedule may be incorrect (e.g., destination nodes, ports, interfaces, period, gate open/close offsets, gate-open/close time-intervals, etc.). As another example, the schedule 2210 may not include the correct maximum tolerable latency for one or more data frames. For example, the schedule 2210 may have the gate 2214 in the open position 2213 to allow a data frame 2204 to arrive at the destination in less than ninety microseconds, while the application requires the data frame 2204 to arrive at the destination 2220 in less than eighty microseconds. In one or more embodiments, the verification module 2012 may create a different, but still valid other schedule given different stochastic algorithms that it may utilize, and this schedule may be executed in the digital twin 2016. In one or more embodiments, if this other schedule, then that is strong evidence that the original schedule was valid and the original schedule may be confirmed as valid. In one or more embodiments, a request may be made for a series of distinct schedules that are valid and then the verification module 2012 may look for a match with the original schedule. In one or more embodiments a quantum computation may be used to speed up the generation of the series of distinct schedules and look for a match. For example, in one or more embodiments, the verification module 2012 may simulate (e.g., via the digital twin 2016) a worst-case scenario with maximum-sized frames flowing through the network from all flow sources to all flow destinations with the original schedule to ensure that it is a valid schedule. In one or more embodiments, this validation may also be done analytically using mathematical matrix operations. In one or more embodiments, the verification module 2012 may analyze the schedule 2210 in relation to the destinations 2220 and intermediate systems (switches along the path) to determine if the schedule 2210 provides the desired flow of data frames (e.g., with the correct maximum tolerable latencies, and other QoS parameters 2032 specified by the application).

If the schedule 2210 is not correct, the process 2100 proceeds to S2116 and the process ends. In one or more embodiments, if the schedule 2210 is not correct, the process may return the schedule to the scheduler 2011 for recalculation. In one or more embodiments, if the incorrect schedule is being executed (e.g., has already been sent to the queues 2212, and data frames 2204 are being transmitted), execution of the schedule may be stopped, and a notification may be generated. In one or more embodiments, the notification may be generated and transmitted to the HMI/UI 2024. In one or more embodiments, the errors in the schedule may be ranked to determine an appropriate action. For example, a particular error may not impact the functions of the control system to the extent that execution of the schedule may be stopped and therefore the ranking may indicate to the system to allow the communication to continue. In one or more embodiments, the schedule may be incorrect, but still allow the system to operate successfully; or, only a portion of the schedule may need to be recomputed.

If the schedule 2210 is correct, the process 2100 proceeds to S2118 and one or more data frames 2204 are transmitted (or broadcast or otherwise communicated) according to the schedule 2210. In one or more embodiments, the data frames 2204 may be transmitted in the digital twin 2016, or may be transmitted via the TSN 2028 to the real installed product 2002. In one or more embodiments, the verification module 2012 may receive the schedule 2210 at the same time, or at substantially the same time, as the queues 2212, such that the verification module 2012 determines whether the schedule 2210 is correct while the data frames 2204 are being transmitted through the TSN 2028. In one or more embodiments, the verification module 2012 may determine whether the schedule 2210 is correct prior to the data frames 2204 being transmitted through the TSN 2028.

Then the verification module 2012 automatically determines whether the schedule is being implemented correctly by the system, in one or more embodiments. Embodiments provide for the automated testing and verification of the results of the scheduler on a real system or the digital twin. A benefit of the verification process provided by one or more embodiments is that it may avoid errors and may provide guidance and feedback to the user to provide a more efficient and effective control system. In S2120 the verification module 2012 determines whether the data frame 2204 arrived at the destination 2220. In one or more embodiments, the verification module 2012 may determine whether the data frame 2204 arrived at the destination 2220 by accessing the one or more destination nodes 2220.

In one or more embodiments, the verification module 2012 may determine whether the data frame 2204 arrived at the destination 2220 by executing at least one of a network sniffer 2226 (e.g. Wireshark®) and a network manager. In one or more embodiments, the network manager may poll network devices for simple statistics, such as number of frames passing through a device and its specific interfaces. Network management information polled in real time from devices throughout the network may be used to infer traffic flow throughout the network and thus help to determine whether frames are flowing from source to destination as expected by a given TSN schedule. In one or more embodiments, the network sniffer 2226 may observe frames flowing through an operational ("live") network and may record their times of arrival at various nodes throughout the network. If frames are arriving at nodes at times predicted by the schedule, then operation may be assumed to be correct. In one or more embodiments, the sniffer 2226 may be integrated into the scheduler 2011 to test the schedules 2210 for debugging purposes. In one or more embodiments, the sniffer 2226 may be programmed with the expected times a data frame is to enter/exit a device (e.g., a switch or other node in the path.) The sniffer 2226 may analyze each data frame 2204 going into/out of a device to determine whether the data frame 2204 is arriving at the right point (destination) at the right time (within the maximum tolerable latency), and therefore is moving through the network 2028 per the schedule.

If the data frame 2204 arrived at the destination 2220, the verification module 2012 determines whether the arrival was within the maximum tolerable latency 2224 in S2122. If the arrival was within the maximum tolerable latency 2224, the process 2100 proceeds to S2123, and one or more operations of an installed product are controlled based on the transmitted one or more data frames.

If the data frame 2204 did not arrive at the destination 2220 or if the data frame 2204 did arrive, but not within the maximum tolerable latency, the process proceeds to S2124, and the verification module 2012 performs an error analysis to determine a most likely point in the flow where the data frame 2204 is being delayed or dropped. In one or more embodiments, the data frame 2204 may arrive too soon, or two or more frames may collide (and then destroy one another by corrupting each other's signals). In one or more embodiments, the delay/drop/early arrival/collision may be the result of at least one of a broken gate (e.g., not synched to the correct time), or a topology malfunction (e.g., the data frame follows a different path than expected), for example. The delay/drop/early arrival/collision may be the result of other suitable factors, for example, electromagnetic interference, frame error correction mistakes, electrical grounding errors, PCB or wire corrosion, temperature or vibration damage, etc.

In one or more embodiments, the error analysis of S2124 may be executed when a pre-set threshold number of data frames 2204 do not arrive at the destination 2220, or do not arrive within the maximum tolerable latency 2224. For example, when 90% of the data frames 2204 for a given time period arrive at the destination 2220 within the maximum tolerable latency 2224, such that 10% of the data frames either did not arrive within the maximum tolerable latency or were dropped (e.g., did not arrive), the verification module 2012 may determine the error analysis is not necessary. In one or more embodiments, the pre-set threshold number may be set by an administrator or other user.

In one or more embodiments, as part of the error analysis, the verification module 2012 may determine whether the data frame departed from the sender at the scheduled departure time. In one or more embodiments, this determination may be via use of a sniffer, or built-in frame counter (e.g., Simple Management Network Protocol (SNMP) or NETCONF/YANG).

In one or more embodiments, as part of the error analysis 2300 (FIG. 23), the verification module 2012 may infer an expected travel path for the data frame in S2310. In a conventional communication network, the network determines how to route the data frame through the network (e.g., the network may assign the data frame a route that is less congested or that may have clocks that are better synchronized). As such, in one or more embodiments, based on assumptions and knowledge of the network topology, an expected travel path may be inferred. In one or more embodiments, the expected travel path may have one or more hops or nodes en-route to the destination 2220.

After the expected travel path is inferred, the verification module 2012 may, in one or more embodiments, analyze each hop on the path to determine if the data frame 2204 was received at this hop in S2312. In one or more embodiments, the analysis may begin with the first hop in the path (e.g., hop immediately following queue) or the last hop in the path (e.g., hop immediately preceding the destination). In one or more embodiments, instead of beginning the analysis with a first or last hop in the inferred path, the analysis may divide the path into two or more sections and analyze each section. For example, the analysis may divide the path into two sections and begin the analysis, as described below, with the hop that is the half-way point in the path. Then, if the error point is not found, the analysis may move to the next consecutive hop in the segment, or may analyze another point in the segment (e.g., a halfway point in that segment).

In one or more embodiments, the first hop for analysis may be selected based on a "most likely" determination. For example, the verification module 2012 may analyze network information to infer the "most likely" hop where the error occurred (e.g., the verification module 2012 may infer that a particular clock or link is weaker), and analyze this node first.

Any other suitable method for selecting hops for analysis may be used.

If the data frame 2204 was received at the hop, the verification module 2012 may determine in S2314 if the data frame was received at an expected time per the schedule 2210. If the verification module 2012 determines the data frame 2204 was received at the hop at the expected time, the verification module 2012 may determine this hop is not the point of the error, and the process 2300 may return to S2312 to then analyze the next hop in the path. If the data frame was received at the hop in S2312, but not at the expected time per S2314, the verification module 2012 may determine this hop is the point of the error. In one or more embodiments, when the verification module 2012 determines a point of the error, the verification module 2012 may take corrective action in S2316 in one or more embodiments. For example, the verification module 2012 may provide the error point to the scheduler 2011 and the scheduler 2011 may change the schedule (e.g., if a clock is not working), or the verification module 2012 may provide the error point to the network 2028, and then the network may avoid this route or avoid a clock on the route, etc. In one or more embodiments, corrective action may be taken when a pre-set threshold number of errors are determined and/or when an error having a particular ranking is determined. In one or more embodiments, the error-types may be ranked to indicate whether corrective action may be needed or not.

Figure 24:
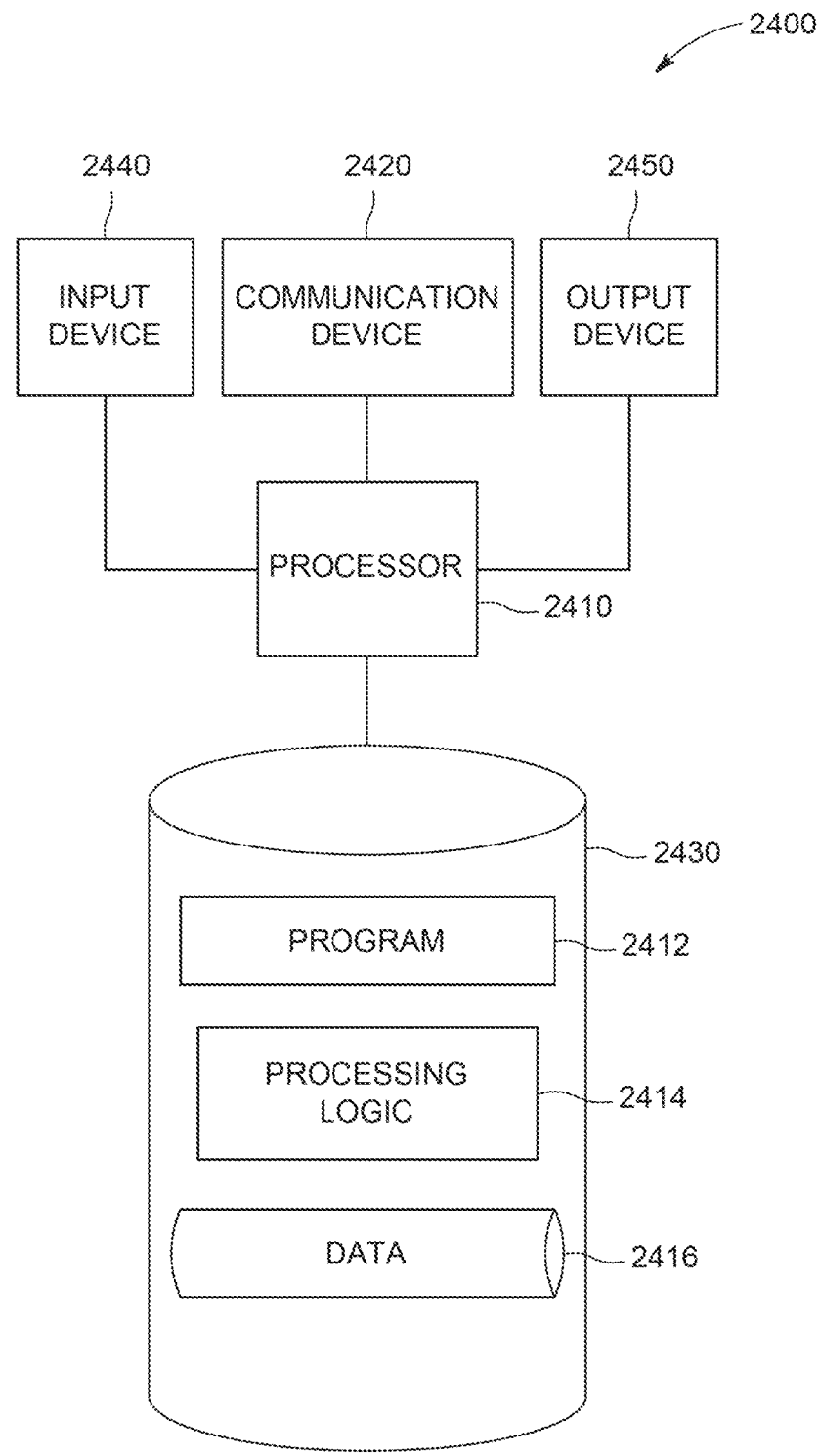
FIG. 24 illustrates a block diagram of a system according to some embodiments.

Note the embodiments described herein may be implemented using any number of different hardware configurations. For example, FIG. 24 illustrates a TSN schedule verification platform 2400 that may be, for example, associated with the system 2000 of FIG. 20. The TSN schedule verification platform 2400 comprises a TSN schedule verification processor 2410 ("processor"), such as one or more commercially available Central Processing Units (CPUs) in the form of one-chip microprocessors, coupled to a communication device 2420 configured to communicate via a communication network (not shown in FIG. 24). The communication device 2420 may be used to communicate, for example, with one or more users. The TSN schedule verification platform 2400 further includes an input device 2440 (e.g., a mouse and/or keyboard to enter information) and an output device 2450 (e.g., to output and display the assessment).

The processor 2410 also communicates with a memory/storage device 2430. The storage device 2430 may comprise any appropriate information storage device, including combinations of magnetic storage devices (e.g., a hard disk drive), optical storage devices, mobile telephones, and/or semiconductor memory devices. The storage device 2430 may store a program 2412 and/or TSN schedule verification processing logic 2414 for controlling the processor 2410. The processor 2410 performs instructions of the programs 2412, 2414, and thereby operates in accordance with any of the embodiments described herein. For example, the processor 2410 may receive data and then may apply the instructions of the programs 2412, 2414 to verify a schedule for the transmission of the data frames.

The programs 2412, 2414 may be stored in a compressed, uncompiled and/or encrypted format. The programs 2412, 2414 may furthermore include other program elements, such as an operating system, a database management system, and/or device drivers used by the processor 2410 to interface with peripheral devices.

As used herein, information may be "received" by or "transmitted" to, for example: (i) the platform 2400 from another device; or (ii) a software application or module within the platform 2400 from another software application, module, or any other source.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all the elements depicted in the block diagrams and/or described herein. The method steps can then be carried out using the distinct software modules and/or sub-modules of the system, as described above, executing on one or more hardware processors 2410 (FIG. 24). Further, a computer program product can include a computer-readable storage medium with code adapted to be implemented to carry out one or more method steps described herein, including the provision of the system with the distinct software modules.

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network.

But, clocks in the networks have not achieved the level of accuracy and stability to perfectly schedule time-sensitive network flows. Clock synchronization errors may lead the frames to arrive ahead or behind their schedule. In this case, time-sensitive network frames can be delayed in an unpredictable manner, thus defeating the purpose of a deterministic Ethernet.

One or more embodiments of the subject matter described herein provide systems and methods that use efficient determinism of time-sensitive networking to increase cybersecurity by examining positive feedback between non-classical physics and time-sensitive networking. The difference of elapsed time that occurs due to relativity is treated by the timing and synchronization standard as a contribution to clock drift of network nodes (e.g., switches) and a time-aware scheduler device of a time-sensitive network is configured relative to a time reference of a grandmaster clock device of the network, but then loses simultaneity with a local relative time reference of the scheduler device.

Figure 25:
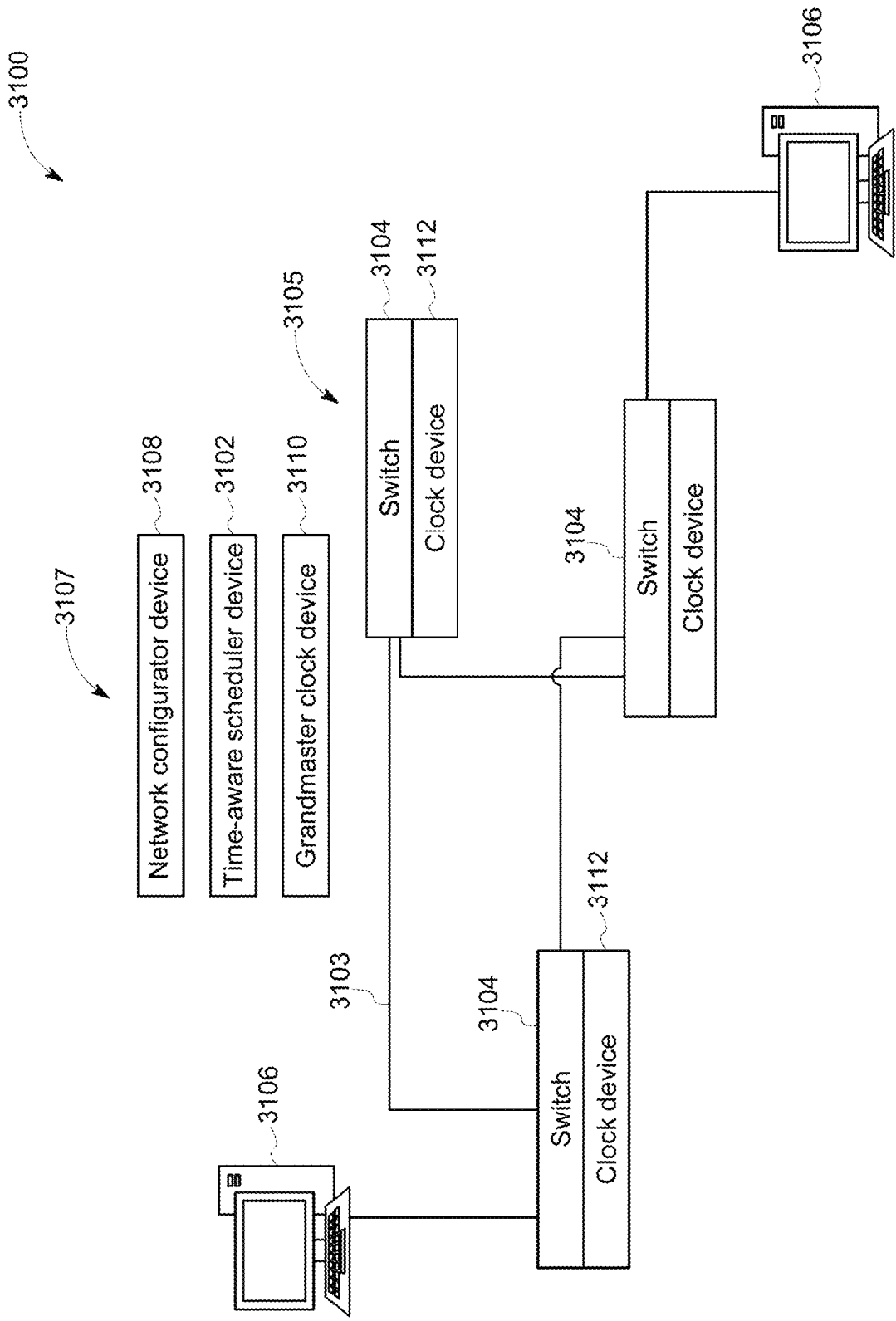
FIG. 25 schematically illustrates one embodiment of a time-sensitive network system.

FIG. 25 schematically illustrates one embodiment of a network control system 3107 of a time-sensitive network system 3100. The components shown in FIG. 25 represent hardware circuitry that includes and/or is connected with one or more processors (e.g., one or more microprocessors, field programmable gate arrays, and/or integrated circuits) that operate to perform the functions described herein. The components of the network system 3100 can be communicatively coupled with each other by one or more wired and/or wireless connections. Not all connections between the components of the network system 3100 are shown herein.

The network system 3100 includes several nodes 3105 formed of network switches 3104 and associated clocks 3112 ("clock devices" in FIG. 25). While only a few nodes 3105 are shown in FIG. 25, the network system 3100 can be formed of many more nodes 3105 distributed over a large geographic area. The network system 3100 can be an Ethernet network that communicates data signals along, through, or via Ethernet links 3103 between devices 3106 (e.g., computers, control systems, etc.) through or via the nodes 3105. The data signals are communicated as data packets sent between the nodes 3105 on a schedule of the network system 3100, with the schedule restricted what data signals can be communicated by each of the nodes 3105 at different times. For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system, such as a rail vehicle (e.g., a locomotive), a mining vehicle (or other off-highway vehicle), a marine vessel, or the like. The best effort traffic includes data signals that are not required to ensure the safe operation of the powered system, but that are communicated for other purposes (e.g., monitoring operation of components of the powered system).

The control system 3107 includes a time-aware scheduler device 3102 that enables each interface of a node 3105 to transmit an Ethernet frame (e.g., between nodes 3105 from one computer device 3106 to another device 3106) at a prescheduled time, creating deterministic traffic flows while sharing the same media with legacy, best-effort Ethernet traffic. The time-sensitive network 3100 has been developed to support hard, real-time applications where delivery of frames of time-critical traffic must meet tight schedules without causing failure, particularly in life-critical industrial control systems. The scheduler device 3102 computes a schedule that is installed at each node 3105 in the network system 3100. This schedule dictates when different types or classification of signals are communicated by the switches 3104.

The scheduler device 3102 remains synchronized with a grandmaster clock device 3110 as clock instability results in unpredictable latency when frames are transmitted. The grandmaster clock device 3110 is a clock to which clock devices 3112 of the nodes 3105 are synchronized. A consequence of accumulated clock drift is that a frame misses a time window for the frame, and must wait for the next window. This can conflict with the next frame requiring the same window.

A centralized network configurator device 3108 of the control system 3107 is comprised of software and/or hardware that has knowledge of the physical topology of the network 3100 as well as desired time-sensitive network traffic flows. The configurator device 3108 can be formed from hardware circuitry that is connected with and/or includes one or more processors that determine or otherwise obtain the topology information from the nodes 3105 and/or user input. The hardware circuitry and/or processors of the configurator device 3108 can be at least partially shared with the hardware circuitry and/or processors of the scheduler device 3102.

The topology knowledge of the network system 3100 can include locations of nodes 3105 (e.g., absolute and/or relative locations), which nodes 3105 are directly coupled with other nodes 3105, etc. The configurator device 3108 can provide this information to the scheduler device 3102, which uses the topology information to determine the schedules. The configurator device 3108 and/or scheduler device 3102 can communicate the schedule to the different nodes 3105.

A link layer discovery protocol can be used to exchange the data between the configurator device 3108 and the scheduler device 3102. The scheduler device 3102 communicates with the time-aware systems (e.g., the switches 3104 with respective clocks 3112) through a network management protocol. The time-aware systems implement a control plane element that forwards the commands from the centralized scheduler device 3102 to their respective hardware.

The Timing and Synchronization standard is an enabler for the scheduler device 3102. The IEEE 802.1AS (gPTP) standard can be used by the scheduler device 3102 to achieve clock synchronization by choosing the grandmaster clock device 3110 (e.g., which may be a clock device 3112 of one of the switch devices 3104), estimating path delays, and compensating for differences in clock rates, thereby periodically pulling clock devices 3112 back into alignment with the time that is kept by the grandmaster clock device 3110. By pulling the clock devices 3112 back into alignment with the grandmaster clock device 3112, the use of phase locked loops (PLL) are not used in one embodiment of the network system 3100 due to the slow convergence of the loops and because the loops are prone to gain peaking effect.

The clock devices 3112 can be measured by the configurator device 3108 or the grandmaster clock device 3110 periodically or otherwise repeatedly sending generalized time-precision protocol messages (gPTP). The operation consists mainly of comparing the timestamps of the time-precision protocol messages the transmits or receives of local switch device 3104 with the timestamps advertised by neighbor switch devices 3104. This way, any factors affecting clock drift are correctly detected by the protocol.

A clock device 3112 that is suddenly pulled into the past or moved to the future relative to the time kept by the grandmaster clock device 3110 can impact the local execution of a time-aware schedule. For example, time-critical traffic may not be communicated by the node 3105 that includes the non-synchronized clock device 3112 within the scheduled time period for time-critical traffic. The gPTP standard provides a continuous and monotonically increasing clock device 3112. Consequently, the scheduler device 3102 relies on a clock device 3112 that cannot be adjusted and alignment of the clock device 3112 is based on logical synchronization, offset from the grand master clock device 3110, the link propagation delays with the neighbors, and the clock drifts between the local clock devices 3112.

The IEEE 802.1AS standard can be used to detect intrinsic instability and drift of a clock device 3112. This drift can occur for a variety of reasons, such as aging of the clock device 3112, changes in temperature or extreme temperatures, etc. Relativistic effects from the theory of special and general relativity can be viewed as an extrinsic clock drift and can encompass gravitational and motion time dilation. For example, two clock devices 3112 with the same intrinsic parameters would detect no drift, but relativity would cause drift of the time kept by these clock devices 3112 from the grandmaster clock device 3110.

While general relativity can be rather complicated, gravitational time dilation is straight-forward to apply. In the equation that follows, G is the gravitational constant, M is the mass of the gravitational body in kilograms, R is the radius, or the distance from the center of the mass, in meters, and c is the speed of light in meters per second. Two clock devices 3112, one located at a height of one hundred meters within the Earth's gravitational field and another at an infinite distance from a gravitational field, that is, experiencing no gravitation. Time passes slower within a gravitational field, so the hypothetical clock device 3112 located at infinity would be the fastest known clock device 3112. When one second has passed for the clock device 3112 located at infinity, consider how much time has passed as measured by the clock near Earth. The time at infinity is denoted as T and the time on Earth as $T_0$. To determine how much time has passed on a clock device 3112 at altitude h as compared to the passage of time measured on a clock at the surface of the earth, calculate the time dilation ratio at altitude h and divide this by the time dilation calculated at the surface of the earth, take the square root of the result and then multiply this calculated ratio by the time interval at the surface of the earth and the result of the calculation is the amount of time that has passed on the faster clock by eleven femtoseconds compared to the clock device 3112 located higher in the field at altitude h.

$$T = \sqrt{\frac{1 - \frac{2GM}{(R+h)c^2}}{1 - \frac{2GM}{Rc^2}}} \, T_0 \qquad (1)$$

Clock drift induced by gravitational time dilation seems negligible at first glance. Particularly when the speed of transmission is of one Gbps. It means that, to make an Ethernet frame of sixty-four bytes miss its Time-Aware schedule, 672 nanoseconds of drift must have elapsed if it is considered that for the twenty bytes of preamble, start frame delimiter, frame check sequence and interframe gap, for a port speed of one Gbps. With a difference of height clock of one hundred meters within the network, such a drift can be obtained within two years of uninterrupted service.

In one embodiment, the schedules provided by the configurator device 3108 are relative to grandmaster time and may ignore time dilation. As a result, the schedules lose simultaneity. While neglecting time dilation can be done within an acceptable error margin, the subject matter described herein addresses cases where error on the scheduler devices 3102 due to relativity are important. That is, where error caused by clock drift at the nodes 3105 can cause time-critical traffic to not be communicated within the scheduled time window for time-critical traffic at one or more of the nodes 3105.

Several use cases involving pico-satellites or high-speed networks (for example, plane-to-ground transmissions, high speed train communications, smart cities interacting with cars in highways, etc.) subject to significant gravitational gradient are examples where relativity can cause significant drift in the scheduler device 3102.

One or more embodiments of the systems and methods described herein examine the impact of time synchronization error upon time-sensitive network scheduling by the scheduler device 3102 of the control system 3107, the impact of time synchronization error on the location, placement, or selection of the grandmaster clock device 3110 in the network system 3100, and the impact of time synchronization error on bandwidth. The systems and methods define specific local guard bands that dynamically change size based on changes in the time dilation. The guard bands are determined as time periods and/or network bandwidths in which non-time-critical Ethernet frame traffic cannot be communicated through the node or nodes that are allocated or assigned the guard bands.

Figure 26:
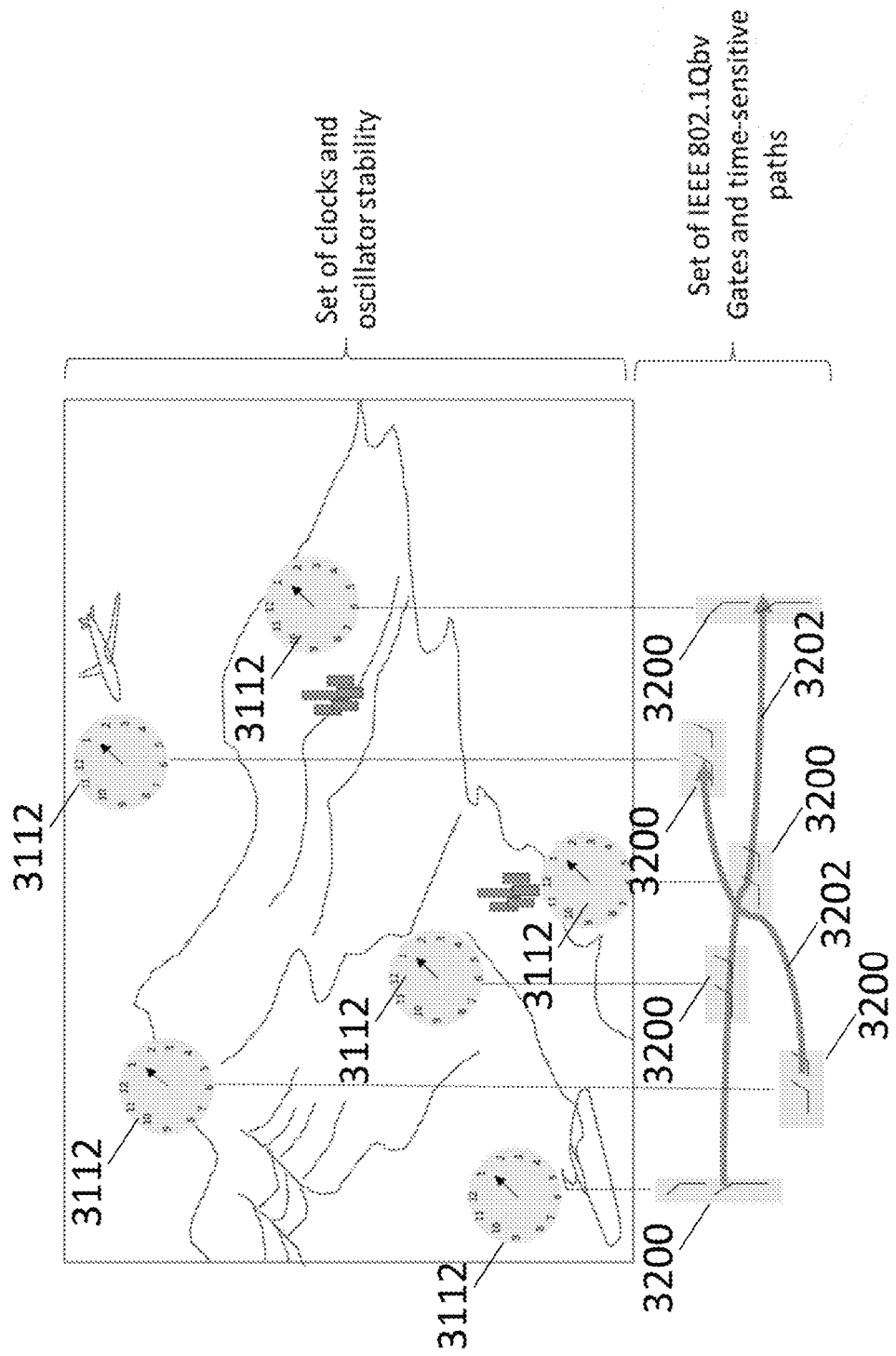
FIG. 26 illustrates a high-level concept behind the analysis described herein.

FIG. 26 schematically illustrates a high-level concept behind the analysis described herein. A network of clock devices 3112 represented at the top of FIG. 26 are assumed to synchronize imperfectly with one another due to time dilation. The clock devices 3112 provide timing for corresponding systems of IEEE 802.1Qbv gates 3200 represented at the bottom of FIG. 26. These gates 3200 can represent the nodes 3105 of the network system 3100 shown in FIG. 25. Time-sensitive data flows 3202 of data frames between the gates 3200 also are shown in FIG. 26. Clock devices 3112 may never perfectly synchronize and synchronization error has an impact on the ability of time sensitive network flows 3202 to operate correctly.

Time-sensitive data flows 3202 cross diverse local time references and are subject to time dilation that cannot be measured by the gPTP standard. For example, FIG. 26 shows clock devices 3112 located in different altitudes, and subject to different relativities. The clock devices 3112 located in the mountains, for example, are synchronized to the grand master relative time (e.g., of the grandmaster clock device 3110 shown in FIG. 25), but time-sensitive network data flows 3202 reaching the clock devices 3112 are "accelerating" because of time dilation. The configurator device 3108 shown in FIG. 25 can prevent or correct for this acceleration by applying compensation on the configuration of the scheduler device 3102. This compensation can occur by determining a guard band to be applied for communication of data flows at one or more of the nodes 3105 or gates 3200. This guard band can dynamically change as the compensation needed to correct for clock drift changes over time.

To compute the impact of time-sensitive network timing error, the scheduler device 3102 computes schedules for network bridges (e.g., switches 3104). The scheduler device 3102 can use a heuristic approach that is non-deterministic polynomial-time hardness (NP-hard). The schedules can be computed by assuming that individual clock error is independent and normally distributed. The clock devices 3112 may drift with a mean p and have a variance a. Each gate system 3200 can receive or determine time from one of the distributed clocks 3112 that is synchronized by the IEEE 802.1AS standard.

Time-sensitive data flow paths are scheduled by the centralized scheduler device 3102 assuming perfect synchronization. If clock synchronization fails to achieve a sufficient degree of synchronization, this failure could cause multiple Ethernet frames from different time-sensitive network flows 3202 to be simultaneously transmitted on the same link. This would cause an alternate scheduling mechanism to mitigate potential collision and frame loss at the expense of an unnecessary and unpredictable delay in transmission. Thus, in the presence of synchronization error, Ethernet frames in time-sensitive network flows 3202 will have a probability of exceeding their maximum, deterministic latency requirement and suffer significant jitter. Under certain synchronization errors, it may even be possible for Ethernet frames to completely miss scheduled transmission window time and catch another open window, thus impacting other time-sensitive network flows 3202 that were initially scheduled on different time windows. A guard band can be dynamically calculated and added to the schedules to mitigate clock error and ensure that time-critical traffic is successfully communicated. This provides at least one technical effect of the subject matter described herein. Dynamically altering the guard band can ensure that packets (that are needed to be delivered at certain designated times to ensure the same operation of systems using the time-sensitive network) are delivered on time, even with drift of clocks away from the grandmaster clock and/or other differences between the times tracked by the clocks and the master time maintained by the grandmaster clock.

In one embodiment, the scheduler device 3102 is provided the details of an Ethernet network system 3100 (shown in FIG. 25) and requested time-sensitive network flows 3202 and computes schedules for each flow 3202. While the scheduler device 3102 is designed to operate with real Ethernet networks 3100 and manually crafted time-sensitive network flows 3202, one component for this analysis is the ability to randomly generate large numbers of time-sensitive network flows 3202 in a large, randomly generated Ethernet network 3100. Thus, the scheduler device 3102 can analyze large, complex time-sensitive network schedules in large, complex networks 3100.

Random jitter can be unpredictable and is assumed to be Gaussian (e.g. thermal noise). Deterministic jitter can be predictable and bounded (e.g., duty cycle, distortion, and inter-symbol interference). Clock jitter can have a Gaussian distribution. Jitter and parts-per-million (PPM) are related by $$df = \frac{f}{10^6} \, PPM,$$

where f is the center frequency of an oscillator and df is the maximum frequency variation. In one embodiment, the clock devices 3112 can be assumed by the scheduler device 3102 to have an accuracy of +/−100 PPM with 5 picoseconds of root mean square (RMS) jitter. The RMS error can be related to Gaussian variance by $\sigma_n/\sqrt{2N}$, where N is the number of samples (e.g., 10,000) and peak-to-peak period jitter equals +/−3.72 RMS jitter.

One part of the analysis performed by the scheduler device 3102 examines how jitter propagates from one clock device 3112 to another clock device 3112. Random noise can be added by the scheduler device 3102, while correlation in noise reduces the purely additive characteristic and creates additional uncertainty. The scheduler device 3102 can propagate clock drift and jitter from the grandmaster clock device 3110 through all other (e.g., slave) clock devices 3112. For example, the other clock devices 3112 can be repeatedly synchronized with the grandmaster clock device 3110. The model also considers the fact that path delay reduces the ability of the gPTP standard to keep slave clock devices 3112 synchronized with the grandmaster clock device 3110. The scheduler device 3102 implementation enables experimentation with clock accuracy and placement and determines the impact of clock accuracy experimentation on time-sensitive network scheduling.

Figure 27:
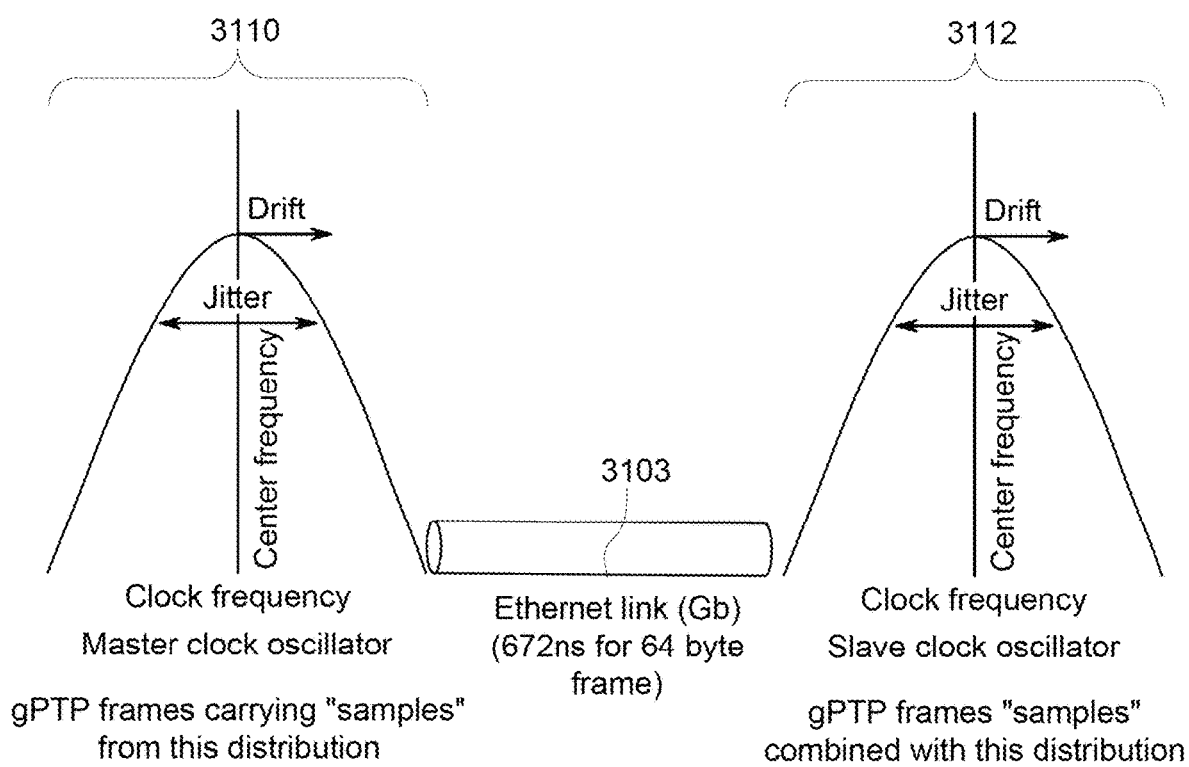
FIG. 27 illustrates a fundamental model showing a master clock and a slave clock separated by an Ethernet link.

FIG. 27 illustrates a fundamental model showing a master clock device 3110 and a slave clock device 3112 separated by an Ethernet link 3103. The slave clock device 3112 is sampling from a Gaussian distribution that represents the dynamics of oscillation in the master clock 3110. The probability density function will flatten due to jitter (e.g., variance). Sync messages carrying the latest statistical sample of the time and frequency of the master clock device 3110 can be periodically or otherwise repeatedly sent to the other clock devices 3112. The brings the times and frequencies of the clock devices 3110, 3112 back into alignment, subject to drift until the next sync message is sent from the master clock device 3110 to the other clock devices 3112. There is a delay between corrections limited ultimately by the time to transfer a message across the link 3103. As a result, the sync messages only correcting the drift (e.g., the mean), while the Gaussian probability density function for the clock devices 3112 will continue to flatten further from the master clock device 3110.

In one example, jitter and Allan variance can be disregarded, and only the drift for 100 PPM clock devices 3110, 3112 may be considered. Assuming 100 MHz clock devices 3110, 3112, the clock devices 3110, 3112 may deviate between the limits of −100,000 nanoseconds and 100,000 nanoseconds every second. If a sync message is transmitted from the master clock device 3110 to the clock devices 3112 every millisecond (or an even less frequent rate), a slave clock device 3112 can drift from −100 nanoseconds to 100 nanoseconds, not including additional drift due to delay of communication along the link 2103. Faster links and a faster sync message transmission rate can enable better synchronization between the clock devices 3110, 3112. Jitter, however, adds to the variance of the clock time distribution and accumulates along each hop along the links 3103 from the master clock device 3110.

Systemic clock inaccuracy, such as temperature change, also can have an impact. If multiple clock devices 3110, 3112 experience the same temperature change and drift at approximately the same rate, the clock devices 3110, 3112 can continue to remain correlated with one another and there is little impact on the timely communication of frames according to the schedule dictated by the scheduling device 3102. If variance were impacted, however, this could have an impact. Since clock drift and variance can be independently and normally distributed, mean and variance accumulate via simple summation when experienced through time-sensitive paths 3103.

Two statistical properties that impact frame scheduling are clock correlation and clock variance. One can look at the correlation of clock means and sum the clock variances of the clock devices 3112 in the nodes 3105 along a scheduled path 3103 for communication of frames between the computing devices 3106. Thus, for any set of scheduled paths 3103, the probability of Ethernet frame overlap in a schedule can be determined by computing the probability of overlap of normal distributions as follows:

$$\frac{(x-\mu_2)^2}{2\sigma_2^2} - \frac{(x-\mu_1)^2}{2\sigma_1^2} = \log\frac{\sigma_1}{\sigma_2} \quad (2)$$

This probability can reflect how likely it is that two or more frames collide on a link 3103, which can result in one or all of these frames not being delivered or otherwise communicated.

To eliminate or reduce the likelihood of frame collisions, the scheduler device 3102 can schedule the communication of frames to occur through or over routes that are along the paths 3103 that are most (or more) immune to clock synchronization inaccuracy, as well as by selecting smaller (e.g., the smallest possible) guard bands that reduce the impact of timing inaccuracies.

Figure 28:
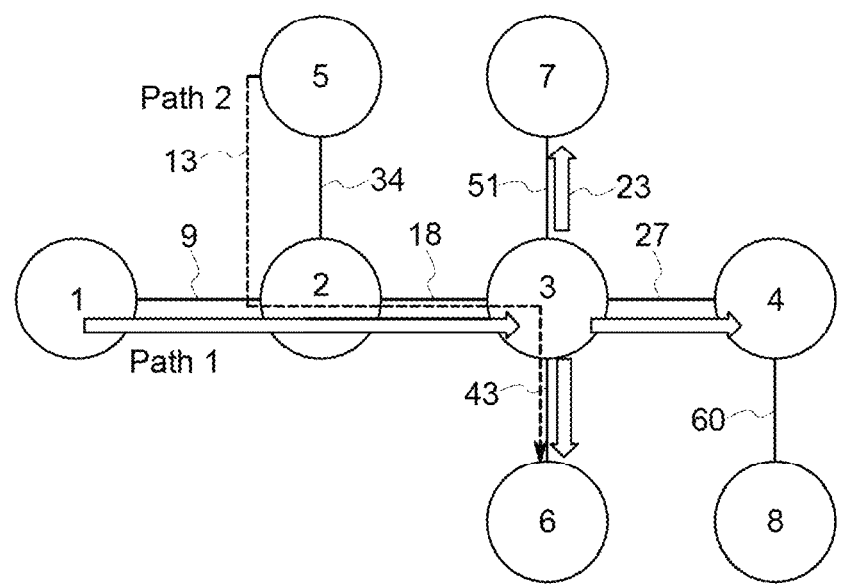
FIG. 28 illustrates one example of synchronization error analysis using multicast.

FIG. 28 illustrates one example of synchronization error analysis using multicast. Vertices are end-systems and switches 3104, and are labeled one through eight. Edges are Ethernet links 3103 and are also numbered in FIG. 28. Links 18 and 43 experience overlapping paths and thereby are exposed to the possibility of frame transmission overlap.

Path 1 connects vertex 1 to vertices 7, 4, and 6. Path 2 connects from vertex 5 to vertex 6. Possible contention (e.g., overlap) exists at links between vertices 2 and 3, as well as vertices 3 and 6. Each interface can be assumed to have a local clock device 3112. In the illustrated example, the clock error mean is one microsecond, the variance is two microseconds, and the required or scheduled end-to-end latency for communication along each path is 80 milliseconds.

Using the result of the scheduler device 3102 for this example and the accumulated clock error along each path, Path 1 can be computed to have a mean latency of 80 ms and a probability of only 0.5 of meeting that requirement given the variance due to clock error along Path 1. Path two has a mean of 71 milliseconds and a probability of success in meeting that latency of 0.93 (e.g., 93%).

Figure 29:
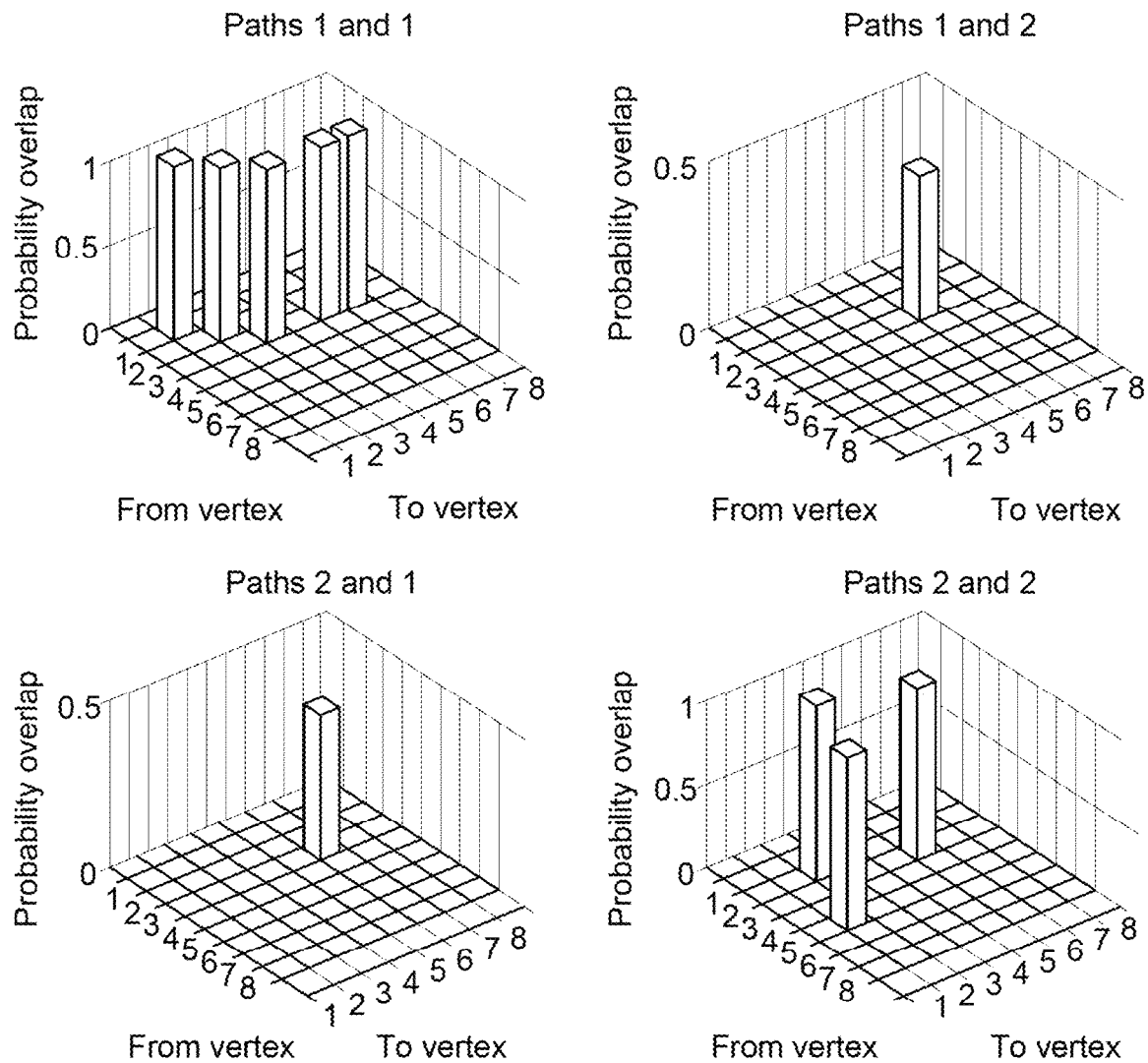
FIG. 29 illustrates probabilities of frame collision along several paths.

FIG. 29 illustrates probabilities of frame collision along several paths. FIG. 29 illustrates a matrix of bar plots showing the relationship between every pair of time-sensitive paths 3103. The matrix is square, symmetric, and will have all ones along the diagonal, that is, perfect along the same paths. The probability of overlap is results in the probability of congestion, increase in latency, and loss of determinism due to adjacent traffic sharing the same channel.

FIG. 29 also shows the probability of frame buffering along each path 3103 due to clock synchronization error as computed using (1). The same paths overlap perfectly with one another as shown along the diagonal. The more interesting plots are in the non-diagonal positions. Since bar graphs form a matrix, the graphs form a symmetric matrix and only examine the upper right diagonal may be examined. In the illustrated example, Paths one and two will suffer non-deterministic frame delay drops with 0.0027 milliseconds (imperceptibly in the bar graph) at the link from vertices two to three, but there is a 0.42 probability (e.g., 42%) of delay at the link from vertices three to six in this example.

The notion of time-sensitive network time dilation for guard bands leads to consideration of the prospects and implications of physical gravitational time dilation. The uncertainty in time increases with the distance from the grandmaster clock device 3110, and this uncertainty requires a proportionally-sized mechanism for compensation, typically a guard band in the network 3101. A guard band effectively increases the Ethernet frame size by increasing the duration that a gate 3200 is open, and thus stretching the effective length of the time-sensitive network frame.

A gate 3200 is open during a time period that is scheduled by the scheduler device 3102 for communication of data packets through the switch in that gate 3200. The scheduler device 3102 can determine a guard band as a time period or bandwidth that a gate 3200 remains open for communicating data packets. The scheduler device 3102 can repeatedly determine the clock drift and variance for multiple clock devices 3112 and, based on the drift and/or variance, determine a probability that Ethernet frames will collide along one or more paths 3103 in the network. If the probability is sufficiently large (e.g., greater than a non-zero, previously defined threshold, such as 15%, 20%, or the like), then the scheduler device 3102 determines and creates a dynamically adjustable guard band for one or more nodes 3105. The guard band defines time periods and/or network bandwidth that cannot be used by the node(s) 3105 for communication of frames along one or more links 3103.

The effective change in length of a data frame varies with distance of the slave clock device 3112 from the grandmaster clock device 3110. For example, clock devices 3112 that are farther from the grandmaster clock device 3110 (e.g., along links 3103 in the Ethernet network) may have larger guard bands determined by the scheduler device 3102. This effective change in length can be referred to as time dilation in analogy with gravitational time dilation from general relativity. The scheduler device 3102 can use a guard band to guarantee that the switch 3104 is idle when time-sensitive network frames are transmitted at the cost of dedicating bandwidth for protection. The scheduler device 3102 can change the size of the guard band for a node 3105 at different times based on clock drift and/or variance. Thus, the size of the guard band can be dynamically changed by the scheduler device 3102 to reduce or minimize the time during which a switch 3104 is idle, while maintaining determinism in the delivery of time-sensitive network frames.

Not all embodiments described herein are limited to wired networks. One or more embodiments can be used in connection with entirely or partially wireless time-sensitive networks. When time-sensitive network devices are subject to change in motion or altitude, the scheduler device 3102 is affected by time dilation. Guard band sizes can be controlled (e.g., by the scheduler device 3102) as functions not only of distance of a clock device 3112 from the grandmaster clock device 3110, but also of port speed and clock height and speed. For example, the scheduler device 3102 can create larger guard bands for longer distances along the links 3103 between a slave clock device 3112 and the master clock device 3110, and can create smaller guard bands for shorter distances along the links 3103 between a slave clock device 3112 and the master clock device 3110. The scheduler device 3102 can create larger guard bands for switches 3104 that are slower in communicating data frames and can create smaller guard bands for switches 3104 that are faster in communicating the data frames. The scheduler device 3102 can create larger guard bands for clock devices 3112 located at higher altitudes and can create smaller guard bands for clock devices 3112 located at lower altitudes. The scheduler device 3102 can create larger guard bands for clock devices 3112 that are faster or slower than the master clock device 3110 by larger time differences, and can create smaller guard bands for clock devices 3112 that are faster or slower than the master clock device 3110 by smaller time differences.

The guard band size can be set by the scheduler device 3102 considering a worst-case scenario, for instance, based on the distance of a grandmaster clock device 3110 and the height or speed of the clock device 3112. A control plane can be used to advertise height and speed of the different clocks device 3112 to enable switches 3104 to continuously or repeatedly adjust the size of the guard band based on the gPTP error correction and time dilation.

The scheduler device 3102 can rely on several metrics and values to allocate a guard band of a variable (e.g., dynamic, or changing with respect to time) size. The scheduler device 3102 can calculate an eigenvalue centrality measure for one or more of the nodes 3105, which can represent an overall shape of the network 3100. Longer, thin networks 3100 are subject to bigger guard bands than small compact networks 3100. For example, networks 3100 formed from fewer nodes 3105, fewer links 3103, and/or having fewer alternate paths of links 3103 and nodes 3105 between devices 3106 for data frame communication can be allocated larger guard bands by the scheduler device 3102 than networks 3100 formed from more nodes 3105, more links 3103, and/or having more alternate paths of links 3103 and nodes 3105 for communication of data frames between the devices 3106. Additionally, nodes 3105 that are farther from the master clock device 3110 and/or are farther from a center of the network 3100 may be assigned larger guard bands than nodes 3105 that are closer to the master clock device 3110 and/or the center of the network 3100.

The clock variance at different nodes 3105 impacts time-to-time clock measurement and is accumulated by all traversed nodes 3105. The variance is an additive parameter in that the total clock variance between the clock devices 3112 and the master clock device 3110 increases for more nodes 3105 along a path for a data frame and/or for larger differences between the clock devices 3112 and the master clock device 3110 along the path. The scheduler device 3102 can fetch all or many of the variances from the network 3100 and compute the total variance of one or more paths through the network 3100. The scheduler device 3102 can also apply an overall eigenvalue centrality metric that provides a global variance value of the network 3100. Each node 3105 can add up a local variance of that node 3105 and the clock reference variance to the global variance of the network 3100. When the network 3100 is made of different time domains with different reference clock devices 3112, the eigenvalue centrality metrics may differ from one domain to another. The accumulated drift may also differ because the clock references do not necessarily send synchronization messages at the same rate and the same speed. If a time-sensitive network stream needs to cross multiple time domains, the guard band determined by the scheduler device 3102 corresponding to the node 3105 egressing to a new domain is the maximum of this node 3105.

By applying an optimal or computed guard band, the network resource usage used by the guard band can be decreased, and the heuristic finds more solution to establish a new time-sensitive network stream (and the number of time-sensitive network streams on a network is statistically higher with optimal guard bands). This can lead to a reduced operational expenditure of network resources, and a reduced cost per bit of data sent over the network 3100.

The scheduler device 3102 can use eigenvector centrality to estimate the impact of time-sensitive network time dilation. Eigenvector centrality measures or represents the importance of a node 3105 in communicating data packets within the network 3100, such as how far the node 3105 is from a location another node 3105, the grandmaster clock device 3110, the spatial center of the network 3100, etc. This importance of the node 3105 can go beyond simply counting the number of computer devices 3106 that interface with the node 3105, but also can include the degree to which a computer device 3106 supports the interconnection of other highly-connected computer devices 3106.

The network edges can be weighted by link speed. Let x be the centrality measure, a be either zero or one as indicated in the adjacency matrix, λ a constant, and f and t indicate the "from" and "to" indices of a vertex in the adjacency matrix respectively as shown in:

$$x_f = \frac{1}{\lambda} \sum_t a_{ft} x_t \qquad (3)$$

This simplifies to Equation 4 below, where A is the eigenvalue of the adjacency matrix A. The eigenvector solutions play a wide range of roles in network partitioning, dimensionality reduction, and many other applications. For the centrality measure, the eigenvectors are non-negative. This means A can be the largest of the many possible eigenvalue solutions, or may be larger than most (but not all) possible eigenvalue solutions.

$$Ax = \lambda x \qquad (4)$$

Thus, the eigenvalue centrality of a vertex is simply the eigenvector element corresponding to the vertex derived from the adjacency matrix corresponding the largest eigenvalue. The eigenvector centrality for each node 3105 is viewed as a gravitational gradient through which time-sensitive network flows travel. Consider what the eigenvalue centrality value for a node 3105 means if the adjacency matrix is weighted by link speed. The centrality value is a scale factor that provides a time dilation correction based upon the topology of the network 3100.

A rate of synchronization messages reported to the local clock drift of the traversed nodes 3104 also can be determined by the scheduler device 3102. The scheduler device 3102 can allocate smaller guard bands for faster synchronization rates and can allocate larger guard bands for slower synchronization rates. The effect of sync locks, and needs for adjusting flows crossing different time domains, and then subject to time discrepancies also can be determined by the scheduler device 3102.

Figure 30:
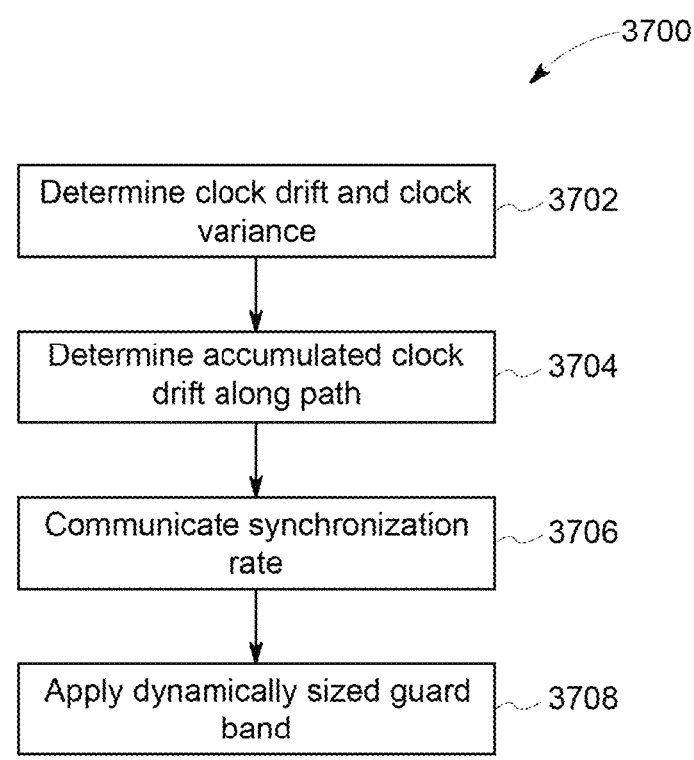
FIG. 30 illustrates a flowchart of one embodiment of a method for dynamically determining guard bands for a time-sensitive network.

FIG. 30 illustrates a flowchart of one embodiment of a method 3700 for dynamically determining guard bands for a time-sensitive network. At 3702, the clock drifts and the clock variances of nodes 3105 can be determined. At 3704, a maximum or upper accumulated clock offset along a time-sensitive network path of links 3103 and nodes 3105 is determined. This can be a sum of the clock offsets (e.g., drifts and/or variances) or a sum of the absolute values of the clock offsets) of the clocks 3112 of the nodes along a path between the devices 3106.

At 3706, a synchronization rate is communicated to the scheduler devices 3102. This rate can be adapted to the conditions of the network 3100 so that clock drifts can be diminished. This rate can indicate how frequently the clock devices 3112 of the nodes 3105 are synchronized with the master clock device 3110. At 3708, one or more guard bands of dynamic size is determined by and communicated from the scheduler device 3102 to the nodes 3105. A guard band can have a size that is based on the schedules of the nodes 3105, as well as based on other factors described herein. If multiple time domains are present in the network 3100, then the dynamic guard band can be applied on the border schedule.

For a node 3105, the guard band can be inserted before and after the scheduled window time of the node 3105 for forwarding a time-sensitive network frame. As a result, if the local clock device 3112 of the node 3105 is slightly in advance or late from the universal time of the grandmaster clock device 3110, the queue at the node 3105 that forwards this frame is maintained open for a duration that is proportional to or otherwise based on the size of the guard band. The size of a guard band can be adjusted to the maximum local time error of this node 3105 in one embodiment. A node 3105 can measure frequency error of the node 3105 on a real-time basis, which also can be used to dynamically adapt the guard band to environmental conditions such as the temperature and the aging of the clock device 3112 of that node 3105.

Table 1 below shows the delay before the scheduler device 3102 is effected by between two points within a gravitational time dilation at the point that may make a time-sensitive Ethernet frame of 64 bytes miss an associated schedule. Table 1 illustrates the difference in height of clock devices 3112 on the scheduler device 3102, for a time-sensitive Ethernet frame of 64 bytes, and as a function of the network transmission speed. The times expressed in the table show how long a service must be uninterrupted before seeing such a frame miss a scheduled time window.

TABLE 1

| Δ Height | 10 Gbps | 100 Gbps | 1 Tbps |
| --- | --- | --- | --- |
| 10 m | 707 ys | 70870 days | 7 days, 1 hour, 41 minutes, and 49 seconds |
| 100 m | 70 days | 71 7 days, 1 hour, 41 minutes, and 49 seconds | 16 hours, 58 minutes, and 10 seconds |
| 1000 m | 7 days, 1 hour, 41 minutes, and 49 seconds | 16 hours, 58 minutes, and 10 seconds | 1 hour, 41 minutes, and 4 seconds |

For example, a difference of 100 meters from sea level between two clock devices 3112 will result in time dilation of 1.000000000000011 seconds. Even if this change may be too small to be represented by an offset scaled rate ratio in gPTP frames, this leads to a cumulated drift of eleven femtoseconds per second of usage. Time dilation effects become important after fourteen days and three hours, causing a time-sensitive frame of 128 bytes to miss its schedule at 100 Gbps.

Special relativity applies to devices in motion. In general, this effect can be neglected. However, when high precision timing is required, correction may need to be applied to the scheduler device 3102. Note that this time dilation differs from the Doppler-Fizeau effect impacting the frequency of communication of mobile devices. As the gravitational time dilation, this cannot be measured by gPTP, and a GNSS receiver is not able to apply correction induced by the speed of the device. Table 2 shows different effects of speed on the time dilation observed by a device in motion. Three different speed are shown here and correspond respectively to a car driving on a highway, a high-speed train, and an airplane in motion. Table 2 shows the difference of speed on the scheduler device 3102, for a time-sensitive frame of 64 bytes, and as a function of the network transmission speed. The times expressed in the table show how long a service must be uninterrupted before seeing such a frame miss its time window.

TABLE 2

| Δ Speed | 10 Gbps | 100 Gbps | 1 Tbps |
| --- | --- | --- | --- |
| 30 s$^{-1}$ | 31 159 days | 2 weeks | 3 38 hours, 15 minutes, and 5 seconds |

TABLE 2-continued

| Δ Speed | 10 Gbps | 100 Gbps | 1 Tbps |
|---|---|---|---|
| 90 s$^{-1}$ | 91 2 weeks | 41 hours, 28 minutes, and 53 seconds | 4 hours, 8 minutes, and 53 seconds |
| 300$^{-1}$ | 30137 hours and 20 minutes | 3 hours and 44 minutes | 22 minutes and 24 seconds |

Special relativity applies to devices in motion. In general, this effect can be neglected. When high precision timing is required, however, correction may need to be applied to the scheduler device 3102. Note that this time dilation can differ from the Doppler-Fizeau effect impacting the frequency of communication of mobile devices. As the gravitational time dilation, this may not be measured by gPTP, and a GNSS receiver may not be able to apply correction induced by the speed of the device.

Table 2 shows different effects of speed on the time dilation observed by a device in motion. Three different speed are shown here and correspond respectively to a car driving on a highway, a high-speed train, and an airplane in motion. Table 2 shows the difference of speed on the scheduler device 3102, for a time-sensitive frame of 64 bytes, and as a function of the network transmission speed. The times expressed in the table show how long a service must be uninterrupted before seeing such a frame miss its time window.

As a result, the scheduler device 3102 optionally can dynamically change the size of a guard band for a node 3105 depending on or based on motion of the node 3105. The scheduler device 3102 can calculate larger guard bands for nodes 3105 that are moving or moving faster than the guard bands for stationary or slower moving nodes 3105.

In one embodiment, a method includes determining a clock drift and a clock variance of each node in plural nodes of a time-sensitive Ethernet network, determining an accumulated clock offset along a time-sensitive network path in the time-sensitive network based on the clock drifts and the clock variances that are determined, determining a guard band having a dynamic size based on the accumulated clock offset, and restricting when Ethernet frames are communicated through the nodes by communicating the guard band with the dynamic size to one or more of the nodes.

Optionally, the method also includes determining an eigenvalue centrality metric based on a location of one or more of the nodes in the time-sensitive network, where the dynamic size of the guard band is based on the eigenvalue centrality metric.

Optionally, the method also includes determining a rate at which clock synchronization messages are reported to the nodes along the time-sensitive network path, where the dynamic size of the guard band is based on the rate at which clock synchronization messages are reported to the nodes along the time-sensitive network path.

Optionally, the method also includes inserting the guard band before and after a scheduled window time of forwarding a time-sensitive network frame at each of the nodes.

Optionally, the clock drift and the clock variance are determined for local clock devices of the nodes relative to a master clock device for the Ethernet network.

Optionally, the guard band is determined as one or more of a time period or a bandwidth in which non-time-critical Ethernet frame traffic cannot be communicated through the nodes.

Optionally, the guard band is determined based on distances between clock devices of the nodes and a master clock device of the Ethernet network.

Optionally, the guard band is determined based on one or more of altitudes or speeds of clock devices of the nodes.

Optionally, the guard band is determined based on motion of one or more of the nodes.

In one embodiment, a system includes one or more processors configured to determine a clock drift and a clock variance of each node in plural nodes of a time-sensitive network. The one or more processors also are configured to determine an accumulated clock offset along a time-sensitive network path in the time-sensitive network based on the clock drifts and the clock variances that are determined. The one or more processors also are configured to determine a guard band having a dynamic size based on the accumulated clock offset and to communicate the guard band with the dynamic size to the nodes. The one or more processors are configured to allocate the guard band to at least one of the nodes. The guard band restricts when Ethernet frames are communicated through the at least one of the nodes.

Optionally, the one or more processors also are configured to determine an eigenvalue centrality metric based on a location of one or more of the nodes in the time-sensitive network. The one or more processors can be configured to determine the dynamic size of the guard band based on the eigenvalue centrality metric.

Optionally, the one or more processors are configured to determine a rate at which clock synchronization messages are reported to the nodes along the time-sensitive network path. The one or more processors can be configured to determine the dynamic size of the guard band based on the rate at which clock synchronization messages are reported to the nodes along the time-sensitive network path.

Optionally, one or more processors are configured to insert the guard band before and after a scheduled window time of forwarding a time-sensitive network frame at each of the nodes.

Optionally, the one or more processors are configured to determine the clock drift and the clock variance for local clock devices of the nodes relative to a master clock device for the Ethernet network.

Optionally, the one or more processors are configured to determine the guard band as one or more of a time period or a bandwidth in which non-time-critical Ethernet frame traffic cannot be communicated through the nodes.

Optionally, the one or more processors are configured to determine distances between clock devices of the nodes and a master clock device of the Ethernet network. The one or more processors also are configured to determine the guard band based on the distances that are determined.

Optionally, the one or more processors are configured to determine the guard band based on one or more of altitudes or speeds of clock devices of the nodes.

In one embodiment, a system includes one or more processors configured to determine clock drifts and clock variances of plural nodes in a time-sensitive Ethernet network. The one or more processors also are configured to determine an eigenvalue centrality metric based on a location of one or more of the nodes in the time-sensitive network. The one or more processors are configured to dynamically allocate a guard band to one or more of the nodes to prevent communication of one or more Ethernet frames through the one or more nodes during the guard band in a time sensitive network schedule of the Ethernet network. The one or more processors are configured to dynamically allocate the guard band based on the clock drifts, the clock variances, and the eigenvalue centrality metric.

Optionally, the one or more processors are configured to dynamically allocate the guard band by changing a size of the guard band responsive to a change in one or more of the clock drifts, the clock variances, or the eigenvalue centrality metric.

Optionally, the one or more processors are configured to determine an accumulated clock offset of the nodes along a path between two or more computer devices based on the clock drifts and the clock variances associated with the nodes along the path. The one or more processor can be configured to allocate the guard band based on the accumulated clock offset.

Communicating with moving devices can be problematic in time-sensitive networks. Communications with (e.g., to and/or from) moving devices can be subject to changes due to the Doppler effect and propagation time variations. Additionally, communications with devices subject to different gravitational forces can be subject to changes due to the different inertial reference frames of the devices. For example, a device located high on a mountain may experience shorter communication cycle times than a device located closer to sea level. Variations in the communication propagation times and/or cycle times can potentially interfere with synchronization among the switches in the network, which can result in a failure to meet the time delivery requirements of time-sensitive network frames. While the propagation delays and variations in cycle times may be relatively short, these delays and variations can have a significant impact as communication speeds continue to increase.

One or more embodiments of the subject matter described herein relate to scheduling devices and methods for computerized communication networks that adapt to and correct for communication propagation delays and/or cycle time variations due to moving communication devices and/or communication devices having different reference frames. The devices and methods described herein can operate to mitigate or eliminate the Doppler effect when timing and synchronization stays inside a moving device (e.g., a vehicle such as a locomotive, plane, marine vessel, automobile, etc.) and deterministic transmissions are exchanged outside the device in motion. Temporal offsets in the communications also can be mitigated or accounted for as being the addition of or the decrease in propagation time delays experienced by a device in motion.

For example, a land-based vehicle (e.g., a locomotive, automobile, or the like) may be moving while transmitting voice signals over a time-sensitive network to a centralized server computer. Relay devices are stored in cabinets in fixed (e.g., stationary) positions along the routes being traveled by the vehicle. With respect to non-land-based vehicles, an aircraft can be transmitting radio signals to a control tower. The communication device on the vehicle can establish a communication link with the closest relay device and either negotiate a communication schedule with the relay device or have the communication schedule pre-provisioned by a centralized network configurator (CNC) device of the time-sensitive network.

The vehicle can repeatedly calculate a distance from the vehicle to the relay device (or the closest relay device as the vehicle moves). This distance can be calculated as a communication propagation delay in a real-time fashion, either by the vehicle determining its position (e.g., global positioning system-based location) and the position of the relay device, or by computing a round trip time for the communication of messages with the relay device. If time synchronization information is exchanged between the vehicle and the relay device, the neighbor propagation delay can be used.

The communication schedule can be updated to be kept consistent to reflect the variation of propagation delay so that the relay device is guaranteed to receive the data frames at the expected times when the vehicle sends the frames, or the vehicle when the relay device sends the frames.

Doppler effects can be handled by applying a compensation or offset on the slot and the time interval of each of the entries or communication time slots in the communication schedule. With speed as input, and considering that no synchronization message is exchanged between the vehicle and the relay device, the amount of compensation can be calculated and applied to apply the inverse of the distortion that the schedule is subject to under Doppler effects.

The offset can be calculated by the delta of propagation time over one schedule slot, times the compensation required by the Doppler effect. This offset can be applied at the beginning of the next slot. The offset can be a temporally positive offset, which is added to the schedule, or can be a temporally negative offset, which is subtracted to the schedule. The positive offset can add an extra delay to the last entry that was obtained in the schedule, while a negative offset can reduce or eliminate any delay. The positive offset can be used for vehicles moving away from a relay device, while the negative offset can be used for vehicles moving toward the relay device.

At least one technical effect of the subject matter described herein includes the successful wireless communication of data frames within a time-sensitive network, such that those data frames are successfully sent and received in connection with the operation or control of one or more powered systems, such as vehicles.

Figure 31:
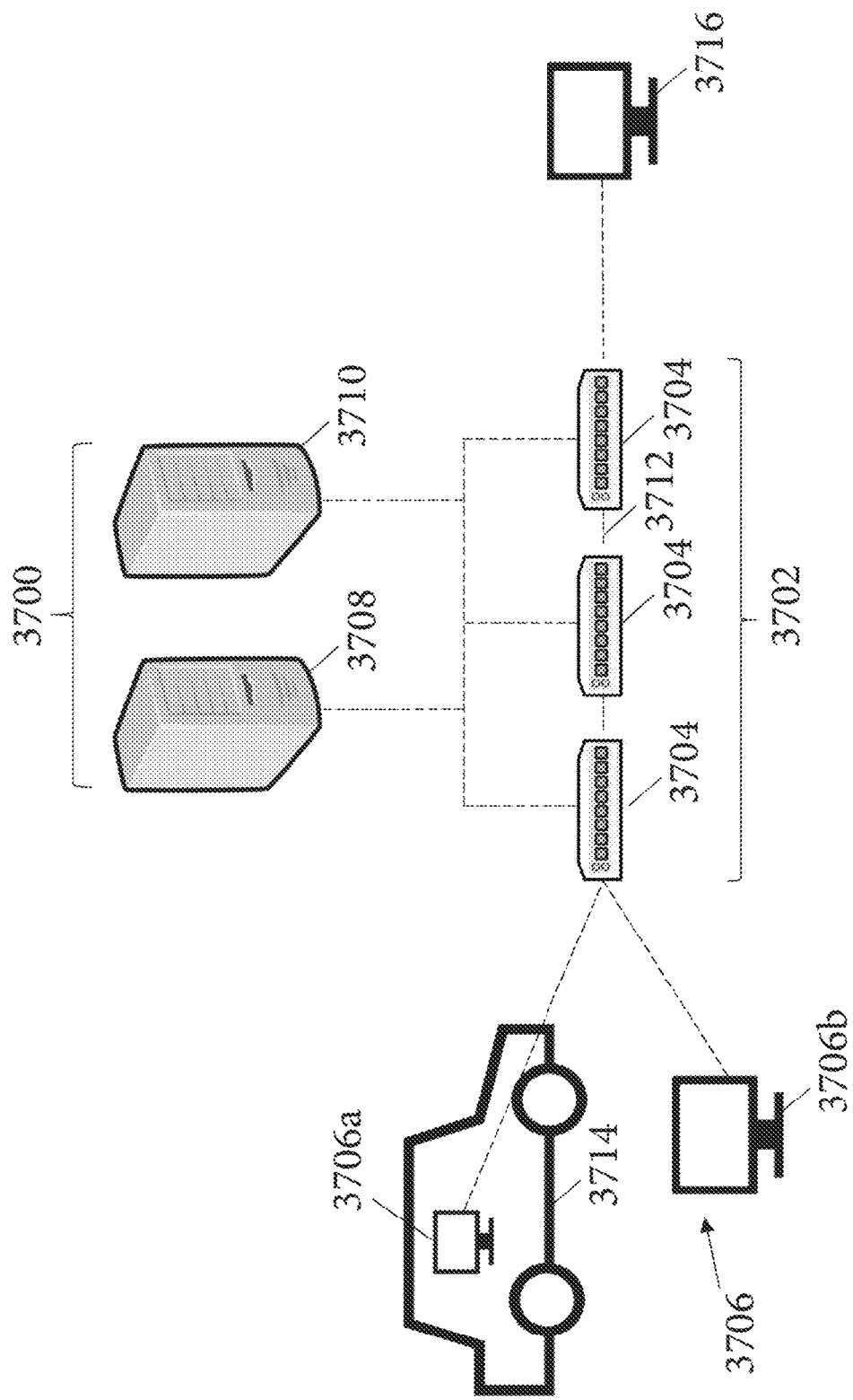
FIG. 31 schematically illustrates one embodiment of a network control system of a time-sensitive network system.

FIG. 31 schematically illustrates one embodiment of a network control system 3700 of a time-sensitive network system 3702. The components shown in FIG. 31 represent hardware circuitry that includes and/or is connected with one or more processors (e.g., one or more microprocessors, field programmable gate arrays, and/or integrated circuits) that operate to perform the functions described herein. The components of the network system 3702 can be communicatively coupled with each other by one or more wired and/or wireless connections. Not all connections between the components of the network system 3702 are shown herein. The network system 3702 can be a time-sensitive network in that the network 3702 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3br™-2016 Standard. This is a partial list of some time-sensitive network standards, and is not an exhaustive or exclusive list of all standards that describe or define time-sensitive networks.

The network 3702 includes several switches 3704 that are used for communication devices 3706 (e.g., devices 3706a, 3706b), 3716 to communicate with each other. The communication devices 3706, 3716 can be computers or computerized devices that send signals to each other within or during scheduled time slots established by a scheduling device 3710 of the network 3702. The communication device 3706 that is sending data frames to communicate with the other device 3716 can be referred to as a talking device, while the device 3716 that receives the data frames from the talking device 3706 can be referred to as the listening device 3716. Alternatively, the device 3716 may be the talking device while the device 3706 is the listening device.

The network 3702 can be an Ethernet network that communicates data signals along, through, or via communication links 3712 between the devices 3706, 3716 and switches 3704. Not all communication links 3712 are labeled in FIG. 31. The links 3712 can represent one or more of a variety of different communication paths, such as Ethernet links, optical links, copper links, and the like. The data signals are communicated as data packets or frames sent between the switches 3704 on a schedule of the network 3702, with the schedule restricting what data signals can be communicated by each of the switches 3704 at different times.

For example, different data signals can be communicated at different repeating scheduled time slots based on traffic classifications of the signals. Some signals are classified as time-critical traffic while other signals are classified as best effort traffic. The time-critical traffic can be data signals that need or are required to be communicated at or within designated slots of time to ensure the safe operation of a powered system. The best effort traffic includes data signals that are not required to ensure the safe operation of the powered system, but that are communicated for other purposes (e.g., monitoring operation of components of the powered system). The schedule for the time-sensitive network 3702 also can allocate or dedicate repeating scheduled time slots for other types of traffic, such as data frames of traffic that is not time-critical traffic and is not best effort traffic. This other traffic can be low or the lowest priority of traffic among the time-critical traffic (which has the highest priority), the best effort traffic (which has the second highest priority), and the other traffic.

The control system 3700 includes the scheduler device 3710 that enables each switch 3704 to transmit or otherwise communicate an Ethernet frame at a prescheduled time, creating deterministic traffic flows while sharing the same media with legacy, best-effort Ethernet traffic. The time-sensitive network 3702 has been developed to support hard, real-time applications where delivery of frames of time-critical traffic must meet tight schedules without causing failure, particularly in life-critical industrial control systems. The scheduler device 3710 computes a schedule that is installed at each switch 3704 in the network 3702. This schedule dictates when different types or classification of signals are communicated by the switches 3704.

A centralized network configurator device 3708 of the control system 3700 is comprised of software and/or hardware that has knowledge of the physical topology of the network 3702 as well as desired time-sensitive network traffic flows. The configurator device 3708 can be formed from hardware circuitry that is connected with and/or includes one or more processors that determine or otherwise obtain the topology information from the switches 3704 and/or user input. The hardware circuitry and/or processors of the configurator device 3708 can be at least partially shared with the hardware circuitry and/or processors of the scheduler device 3710.

The topology knowledge of the network 3702 can include locations of the switches 3704 (e.g., absolute and/or relative locations), which switches 3704 are directly coupled with other switches 3704, etc. The configurator device 3708 can provide this information to the scheduler device 3710, which uses the topology information to determine the schedules for communication of information (e.g., data frames) between the devices 3706, 3716. The configurator device 3708 and/or scheduler device 3710 can communicate the schedule to the different switches 3704.

As described above, there may be propagation delays and/or Doppler effects that impact the timely communication of data frames communicated to and/or from the communication device 3706a that is moving. The communication device 3706a may be onboard a moving system, such as a vehicle 3714. The vehicle 3714 is illustrated as an automobile, but optionally can be a rail vehicle (e.g., a locomotive), an airplane, a marine vessel, another off-highway vehicle (e.g., a mining vehicle or other vehicle that is not legally permitted and/or is not designed for travel on public roadways), or the like.

The vehicle 3714 may be moving relative to the communication device 3716 with which the communication device 3706a is communicating. The communication link 3712 between the moving communication device 3706a and the stationary switch or switches 3704 is a wireless link in one embodiment. Currently, time-sensitive networks 3702 rely on usage of wired communication links 3712 due to the strict communication schedules of the networks 3702. Wireless communication links 3712 can pose problems that prevent timely communication of data frames according to the schedules of the time-sensitive networks 3702 (e.g., due to relative movement), which can prevent some other time-sensitive networks from using, including, or relying on wireless communication links 3712. The movement of the vehicle 3714 and the communication device 3706a can cause data frames communicated from the moving communication device 3706a to miss the scheduled time slots in which the data frames are to be communicated by the switches 3704.

Figure 32:
FIG. 32 illustrates a change in a communication propagation delay for communication between communication devices shown in FIG. 31.
Figure 33:
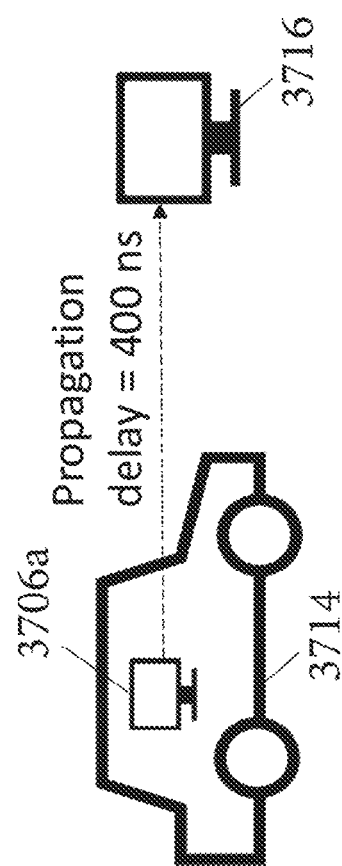
FIG. 33 illustrates a change in a communication propagation delay for communication between communication devices shown in FIG. 31.

FIGS. 32 and 33 illustrate a change in a communication propagation delay for communication between the communication devices 3706a, 3716 shown in FIG. 31. The vehicle 3714 is moving toward the communication device 3716. At a first time shown in FIG. 32, the vehicle 3714 is located far enough from the communication device 3716 that wirelessly sending a data frame from the moving communication device 3706a onboard the vehicle 3714 to the communication device 3716 takes a first length of time, such as six hundred nanoseconds. At a subsequent second time shown in FIG. 33, however, the vehicle 3714 is located closer to the communication device 3716. As a result, wirelessly sending data frames from the moving communication device 3706a onboard the vehicle 3714 to the communication device 3716 takes a shorter second length of time, such as four hundred nanoseconds.

The time needed for the data frame to travel from the communication device 3706a to the communication device 3716 can be referred to as a propagation delay. Therefore, for the vehicle 3714 moving toward the communication device 3716, the propagation delay decreases with respect to time as the vehicle 3714 is moving. Alternatively, the vehicle 3714 may be moving away from the communication device 3716 such that the propagation delay increases with respect to time. Movement of one communication device 3706 or 3716 relative to another communication device 3716 or 3706 (and/or movement relative to the switches 3704) can result in propagation delays that change over time.

The schedule dictated by the scheduler device 3710 for the time-sensitive network 3702 includes a repeating schedule slot, which also can be referred to as a communication cycle. Within this scheduled slot, different types or categories of data frames may be communicated during non-overlapping slots of each communication cycle. For example, during the first time slot of the communication cycle, a first type or category of data frames may be communicated from the moving communication device 3706*a* to the communication device 3716. During a subsequent, second time slot of the communication cycle, a different, second type or category of data frames may be communicated from the moving communication device 3706*a* to the communication device 3716. During a subsequent, third time slot of the communication cycle, a different, third type or category of data frames may be communicated from the moving communication device 3706*a* to the communication device 3716, and so on.

Changes in the propagation delay due to movement of the communication device 3706*a* and/or 3716 can be long enough to cause one or more wirelessly communicated data frames to miss the scheduled time of the communication cycle for communication of those data frames. As a result, information that is needed or required for safe operation of the vehicle 3714 may not be successfully communicated within the scheduled time in the time-sensitive network 3702.

Figure 34:
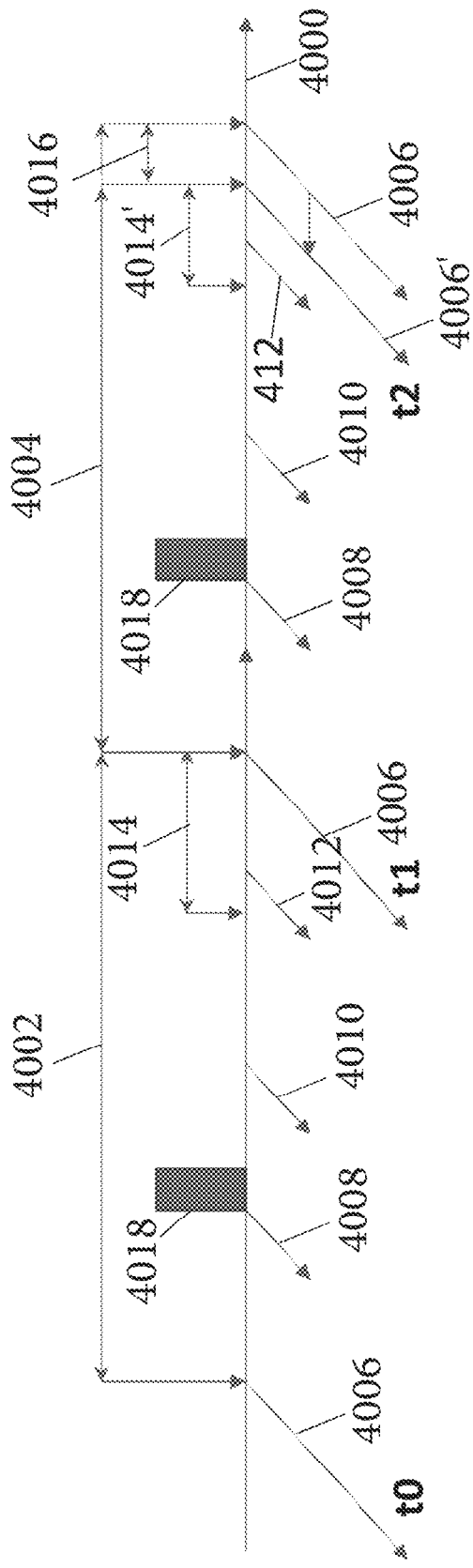
FIG. 34 illustrates one method or technique for modifying a scheduled communication cycle of the time-sensitive network shown in FIG. 31 due to a change in propagation delay according to one example.

FIG. 34 illustrates one method or technique for modifying a scheduled communication cycle of the time-sensitive network 3702 due to a change in propagation delay according to one example. Two communication cycles 4002, 4004 are shown alongside a horizontal axis 4000 representative of time. Each of the communication cycles 4002, 4004 begins at a fetching time 4006 (also referred to as to) and includes several additional fetching times 4008, 4010, 4012. The fetching times 4006, 4008, 4010, 4012 can designate when different types or categories of data frames are scheduled to be communicated in the communication cycle 4002, 4004.

Optionally, each fetching time 4006, 4008, 4010, 4012 can be a scheduled time or beginning of a scheduled gate, where a different category or type of data frames are communicated within that gate of the communication cycle 4002, 4004. For example, the gate extending from the first fetching time 4006 to the second fetching time 4008 in each repeating communication cycle 4002, 4004 may be scheduled or otherwise dedicated for the communication of data frames of time-critical traffic. The gate extending from the second fetching time 4008 to the third fetching time 4010 in each repeating communication cycle 4002, 4004 may be scheduled or otherwise dedicated for the communication of data frames for best-effort traffic. The gate extending from the third fetching time 4010 to the fourth fetching time 4012 in each repeating communication cycle 4002, 4004 may be scheduled or otherwise dedicated for the communication of data frames of other types of traffic (for example, the data frames that are not time-critical communications or best-effort communications). Optionally, another gate can extend from the fourth fetching time 4012 to the end of the corresponding communication cycle 4002, 4004 (for example, the first fetching time 4006 of the subsequent communication cycle). This other scheduled time slot can be scheduled for time-critical data frames, best-effort data frames, or other data frames.

In one example, at the first fetching time 4006 at to, the propagation delay may be six hundred nanoseconds. For example, communication of data frames from the communication device 3706*a* onboard the moving vehicle 3714 may require six hundred nanoseconds to travel from the communication device 3706*a*, through the switches 3704, and to the communication device 3716. If the communication cycle 4002 was provisioned or created to account for this propagation delay of six hundred nanoseconds, then no change to the communication cycle 4002 by the scheduling device 3710 may be needed (assuming other factors are not relevant or are accounted for, as described below).

The propagation delay can be determined by the scheduling device 3710 based on movement information associated with the vehicle 3714 and/or the communication device 3706*a*. For example, the communication devices 3706, 3716 may report propagation delays to the scheduling device 3710, or the scheduling device 3710 may calculate or estimate the propagation delays based on a separation distance between the vehicle 3714 and the communication device 3716, the velocity and/or direction (e.g., the movement vector) at which the vehicle 3714 is moving, or a combination thereof.

The scheduling device 3710 may calculate longer propagation delays for communication devices 3706 that are farther from the communication device 3716, for communication devices 3706 that are moving more slowly toward the communication device 3716, or for communication devices 3706 that are moving away from the communication device 3716. The location and/or velocity of the communication devices 3706 can be reported to the scheduling device 3710 by one or more different sensors or sources of information, such as a global positioning receiver on board the vehicle 3714, from roadside sensors that report when the vehicle 3714 passes the sensors (e.g., roadside transponders), from wireless triangulation systems onboard the vehicle 3714, cameras, or the like.

In the illustrated example, the scheduling device 3710 determines that the propagation delay from the communication device 3706*a* to the communication device 3716 is currently six hundred nanoseconds. To account for this additional time needed to communicate data frames from the communication device 3706*a* to the communication device 3716, the scheduling device 3710 may advance or otherwise start the subsequent communication cycle 4004 ahead of a currently or previously scheduled starting time. For example, instead of starting the second communication cycle 4004 at a time ti, the scheduling device 3710 may modify the communication schedule so that the communication cycle 4004 begins at an earlier time. The schedule also can be modified so that the fetching times within the communication cycle 4004 are advanced or moved to earlier times as well.

The scheduling device 3710 can calculate a propagation offset time 4014, which may be equal to the propagation delay. In situations where the propagation delay represents the total time-of-flight for data frames to be communicated from the communication device 106*a* to the communication device 3716 and back, the offset time 4014 may be the propagation delay.

The scheduling device 3710 may revise the schedule of the communication cycle 4004 to begin at a starting time that is earlier than the previously or currently scheduled starting time ti. This earlier starting time may precede the starting time ti by the offset time 4014. For example, the starting time ti can be moved up and begin six hundred nanoseconds prior to the previously or currently scheduled starting time ti of the communication cycle 4004. This also can, in effect, result in one or more, or all, of the fetching times 4006, 4008, 4010, 4012 of the communication cycle 4004 being scheduled to occur at earlier times (e.g. six hundred nanoseconds earlier).

At or prior to the time ti in FIG. 34, the vehicle 3714 may be closer to the communication device 3716. As a result, the propagation delay may be reduced. For example, the propagation delay may be reduced from six hundred nanoseconds to four hundred nanoseconds. The scheduling device 3710 may continue monitoring the speed, acceleration, and/or location of the vehicle 3714, and repeatedly modify, update, or determine whether to modify or update the offset 4014 that is used to reschedule one or more of the communication cycles. In the illustrated example of FIG. 34, at or prior to the time ti, the scheduling device 3710 may calculate a new propagation offset 4014', which may be shorter than the propagation offset 4014, due to the propagation delay being shorter. For example, while the offset 4014 was six hundred nanoseconds, the new or updated propagation offset 4014' may only be four hundred nanoseconds.

Additionally, changes in the moving speed of the vehicle 3714 may introduce error in the offsets 4014, 4014' that are calculated by the scheduling device 3710. To account for this error in the offsets 414, 414', the scheduling device 3710 can advance or delay the start of one or more subsequent communication cycles. In the example illustrated in FIG. 34, the communication cycle (not shown) that is subsequent to the communication cycle 4004 may have the starting time 4006 of the subsequent communication cycle moved up or occur earlier in time by a temporal offset or compensation 4016. This compensation 4016 can make the starting time 4006' of the subsequent communication cycle match with the communication cycle schedules of the communication device 3716.

The scheduling device 3710 can repeatedly update or otherwise modify the scheduled times of communication cycles while the communication device 3706a is moving. The scheduling device 3710 can repeatedly calculate offsets 4014 and/or compensations 4016 to apply to the schedules of the communication cycles. The scheduling device 3710 can repeatedly determine and apply these offsets and compensations so that changes in the speed of the communication device 3706a are accounted for.

The scheduling device 3710 optionally can determine and apply one or more guard bands 4018 to the scheduled communication cycles. The communication cycles may be scheduled with the assumption of perfect clock synchronization among and between the devices 3706, 3716 and the switches 3704. If clock synchronization fails to achieve a sufficient degree of synchronization, this failure could cause multiple Ethernet frames from different time-sensitive network flows to be simultaneously transmitted on the same link 3712. This would cause an alternate scheduling mechanism to mitigate potential collision and frame loss at the expense of an unnecessary and unpredictable delay in transmission. Thus, in the presence of synchronization error, Ethernet frames in time-sensitive network flows will have a probability of exceeding a maximum, deterministic latency requirement and suffer significant jitter. Under certain synchronization errors, it may even be possible for Ethernet frames to completely miss scheduled transmission window time and catch another open window, thus impacting other time-sensitive network flows that were initially scheduled on different time windows.

The guard bands 4018 are determined by the scheduling device 3710 as time slots and/or network bandwidths in which non-time-critical Ethernet frame traffic cannot be communicated through the switch 3704 associated with the scheduled communication cycle 4002, 4004 that is allocated or assigned the guard band 4018. Time-sensitive data flows cross diverse local time references and may be subject to time dilation. For example, clocks of communication devices or switches located at different elevations may be synchronized to a master time or clock, but the time-sensitive network data flows may accelerate due to time dilation. The scheduling device 3710 can prevent or correct for this acceleration by applying compensation on the configuration of the scheduler device 3710. This compensation can occur by determining the guard band 4018 to be applied for communication of data flows at one or more of the switches 3704. This guard band 4018 can dynamically change as the compensation needed to correct for clock drift changes over time.

The scheduling device 3710 can dynamically calculate and add the guard band 4018 to the communication cycles 4002, 4004 to mitigate clock error and ensure that time-critical traffic is successfully communicated. Dynamically altering the guard band can ensure that data frames (that are needed to be delivered at certain designated times to ensure the same operation of systems using the time-sensitive network) are delivered on time, even with drift of clocks away from each other or a master clock and/or movement of the vehicle 3714.

The guard bands 4018 allow for extra time to be added to a previously scheduled time slot by increasing the duration that a scheduled gate is open at a switch 3704. A gate of a switch 3704 is open during a time slot that is scheduled by the scheduler device 3710 for communication of data frames through the switch 3704. The scheduler device 3710 can determine a guard band 4018 as a time slot or bandwidth that a gate in a switch 3704 remains open for communicating data frames. The scheduler device 3710 can repeatedly determine clock drift and variance for multiple switches 3704 and, based on the drift and/or variance, determine a probability that Ethernet frames will collide along one or more paths 3712 in the network 3702. If the probability is sufficiently large (e.g., greater than a non-zero, previously defined threshold, such as 15%, 20%, or the like), then the scheduler device 3710 determines and creates a dynamically adjustable guard band 4018 that is applied to one or more gates of one or more of the communication cycles 4002, 4004.

The scheduler device 3710 can rely on several metrics and values to allocate a guard band 4018 of a variable (e.g., dynamic, or changing with respect to time) size. The scheduler device 3710 can calculate an eigenvalue centrality measure for one or more of the switches 3704, which can represent an overall shape of the network 3702. Longer, thin networks 3702 are subject to bigger guard bands than small compact networks 3702. For example, networks 3702 formed from fewer switches 3704, fewer links 3712, and/or having fewer alternate paths of links 3712 and switches 3704 between the devices 3706, 3716 for data frame communication can be allocated larger guard bands 4018 by the scheduler device 3710 than networks 3702 formed from more switches 3704, more links 3712, and/or having more alternate paths of links 3712 and switches 3704 for communication of data frames between the devices 3706, 3716.

Movement of one communication device 3706 relative to another communication device 3716 that are communicating through the time-sensitive network 3702 also can negatively impact communication of data frames due to the Doppler effect.

Figure 35:
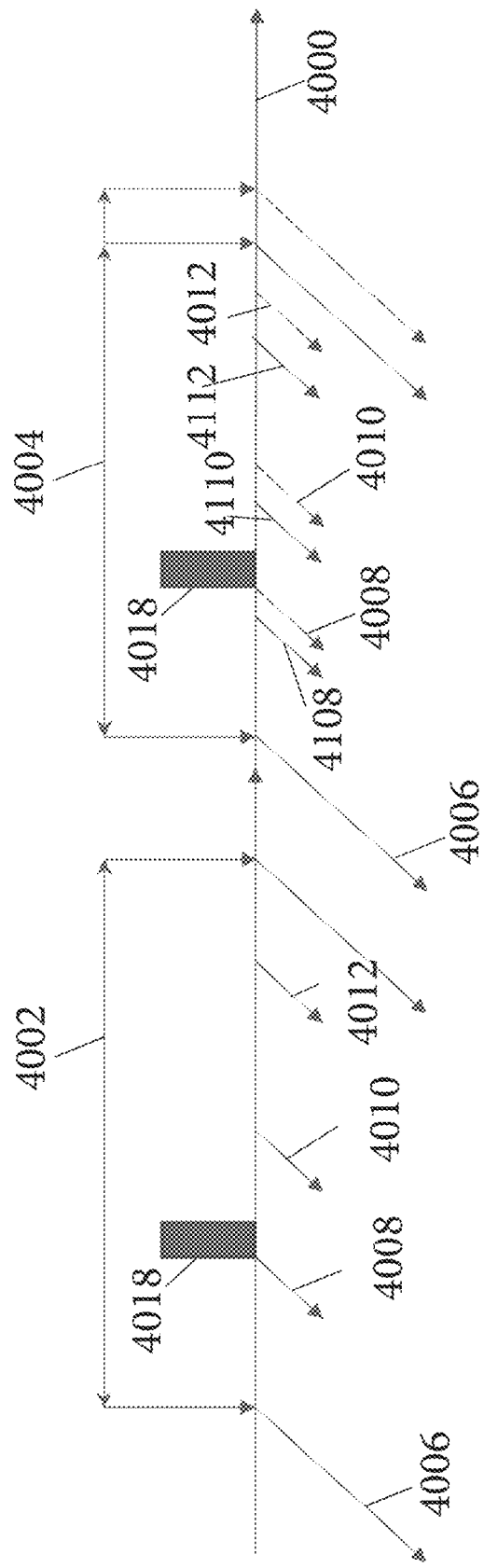
FIG. 35 illustrates another timeline of communication cycles shown in FIG. 34 that are scheduled by a scheduling device shown in FIG. 31 according to another example.

FIG. 35 illustrates another timeline of the communication cycles 4002, 4004 scheduled by the scheduling device 3710 according to another example. The Doppler effect can result in frequency changes in data frames communicated from a moving communication device 3706a to another communication device 3716. This effect results in the data frames being received by the listening device 3716 sooner than expected (e.g., before a scheduled fetching time associated with that category of data frames).

For example, the communication cycles 4002, 4004 may be scheduled such that each communication cycle 4002, 4004 begins at a starting time 4006, followed by the fetching times 4008, 4010, 4012, as described above. Due to the communication device 3706a moving relative to the communication device 3716, one or more data frames may be communicated before or after the proper scheduled fetching time 4006, 4008, 4010, 4012. For example, a data frame scheduled to be delivered at the fetching time 4008 may be received at the device 3716 at an earlier fetching time 4108 if the communication device 3706a is moving toward or closer to the communication device 3716. Similarly, a data frame scheduled to be received by the communication device 3716 at the fetching time 4010 may actually be received at an earlier fetching time 4110, and a data frame expected or scheduled to be received by the communication device 3716 at the fetching time 4012 may be received at an earlier fetching time 4112.

The scheduling device 3710 can determine that the Doppler effect is impacting when data frames are received by the communication device 3716 based on the relative motion of the communication devices 3706a, 3716. For example, responsive to determining that the communication device 3706a is moving toward or closer to the communication device 3716, the scheduling device 3710 may contract (e.g., reschedule to earlier times) the scheduled fetching times 4008, 4010, 4012 in the communication cycle 4004. For example, the scheduling device 3710 may apply a default or predetermined advancement to each of the fetching times 4008, 4010, 4012 so that the scheduled fetching times 4008, 4010, 4012 are re-scheduled to occur at or near the earlier fetching times 4108, 4110, 4112. The advancement applied to the fetching times 4008, 4010, 4012 can be based on how rapidly the communication device 3706a is moving toward the communication device 3716. For example, the advancement applied to the re-scheduled fetching times can increase with communication devices 3706a that are moving faster toward the communication device 3716. As a result, the device 3716 receives the data frames at or near the earlier, re-scheduled fetching times 4108, 4110, 4112 instead of expecting to receive the data frames at the previously scheduled fetching times 4008, 4010, 4012.

Optionally, the scheduling device 3710 can determine the Doppler effect on a communication device 3706a that is moving away from the communication device 3716. The preceding example focused on the communication device 3706a moving toward the communication device 3716, and as a result, the Doppler effect resulted in data frames being received earlier than scheduled fetching times. But, when the communication device 3706a moves away from the communication device 3716, the data frames may be received at later fetching times than the scheduled fetching times 4008, 4010, 4012. The scheduling device 3710 can compensate for the delayed receipt of the data frames by revising the schedule of the communication cycle 4004. For example, the fetching times 4008, 4010, 4012 may be re-scheduled by pushing back those fetching times 4008, 4010, 4012 to later fetching times. The delay applied to the fetching times 4008, 4010, 4012 can be based on how rapidly the communication device 3706a is moving away from communication device 3716. For example, the delay applied to the re-scheduled fetching times can increase with communication devices 3706a that are moving faster from the communication device 3716.

In one embodiment, the scheduling device 3710 may only revise the schedule of a communication cycle 4002, 4004 responsive to the communication device 3706a moving at least a minimum speed, such as one hundred miles per hour or faster. Alternatively, the scheduling device 3710 may revise the schedule of the communication cycle responsive to the communication device 3706a moving at a slower minimum speed, or responsive to the communication device 3706a moving at any speed.

Figure 36:
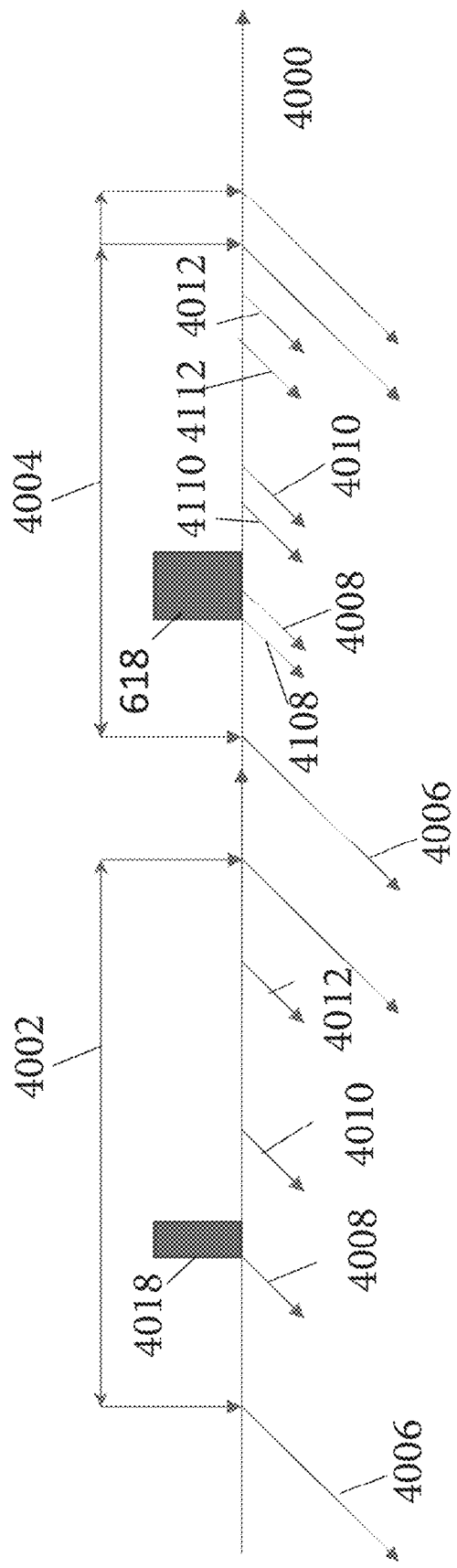
FIG. 36 illustrates another timeline of the communication cycles shown in FIG. 34 that are scheduled by the scheduling device shown in FIG. 31 according to another example.

FIG. 36 illustrates another timeline of the communication cycles 4002, 4004 scheduled by the scheduling device 3710 according to another example. The relativity of simultaneity specifies that whether spatially separated events occur at the same time is dependent upon the reference frame of the observer. Accelerations such as gravity, movement, different elevations (due to differences in gravitational pull at the different elevations), being located over portions of the Earth with different densities (due to differences in gravitational pull at the different densities), and the like, can cause the moving communication device 3706a and the stationary communication device 3716 to observe the scheduled fetching times 4006, 4008, 4010, 4012 to occur at different times. As another example, if the stationary communication device 3706b and the stationary communication device 3716 are located at different elevations, above different densities of the Earth, or otherwise experiencing different accelerations, then the communication devices 3706b, 3716 may observe the scheduled fetching times 4006, 4008, 4010, 4012 to occur at different times.

Due to the time-critical nature of communications within the time-sensitive network 3702, observing the scheduled fetching times 4006, 4008, 4010, 4012 to occur at different times at the different communication devices 3706, 3716 can result in data frames being sent too late or too early. This can result in data frames being missed or otherwise not communicated between the devices 3706, 3716. For example, the communication device 3706a or 3706b may observe one or more of the fetching times 4006, 4008, 4010, 4012 to occur at times that are earlier than the times at which the communication device 3716 observes the corresponding fetching time 4006, 4008, 4010, 4012. Therefore, the communication device 106a or 106b may send one or more data frames to the communication device 116 at a time that is earlier than the scheduled fetching time 4006, 4008, 4010, 4012 (from the reference of the communication device 3716).

The relativity of simultaneity also can result in the communication devices 3706, 3716 observing the simultaneously scheduled fetching times 4006, 4008, 4010, 4012 to occur at different points in time in networks 3702 having very fast bandwidths or communication speeds. After many hours or days of the network 3702 operating by communicating frames between the communication devices 3706, 3716, the communication devices 3706, 3716 may begin to perceive or observe relative differences in the fetching times 4006, 4008, 4010, 4012 that are scheduled to occur at exactly the same time.

In one embodiment, the scheduling device 3710 can determine that the relativity of simultaneity may impact, hinder, or prevent successful and timely communication of data frames in the network 3702 responsive to the location, movement, or the like, of the communication device 3706a, 3706b and/or the communication device 3716 indicating that the communication devices 3706, 3716 are experiencing different accelerations. The scheduling device 3710 can then attempt to remediate any impact of the relativity of simultaneity by scheduling a dynamic guard band 4218 to expand the time slot of one or more of the fetching times 4006, 4008, 4010, 4012. For example, the scheduling device 3710 can schedule the guard band 4218 at the fetching time 4008 so that the time slot over which the communication devices 3706, 3716 communicate data frames at the fetching time 4008 is extended. This can prevent data frames being sent from or to one or more of the communication devices 3706 or 3716 missing the scheduled fetching time 4006, 4008, 4010, 4012, as perceived by the other of the communication devices 3716 or 3706.

The scheduling device 3710 can dynamically adjust the guard band 4218, such as by changing the length of time over which the guard band 4218 extends based on the differences in accelerations between the communication devices 3706, 3716. For example, for larger acceleration differences between the communication devices 3706, 3716, the scheduling device 3710 can expand the length of the guard band 4218. For smaller acceleration differences between the communication devices 3706, 3716, the scheduling device 3710 can reduce the length of the guard band 4218.

Figure 37:
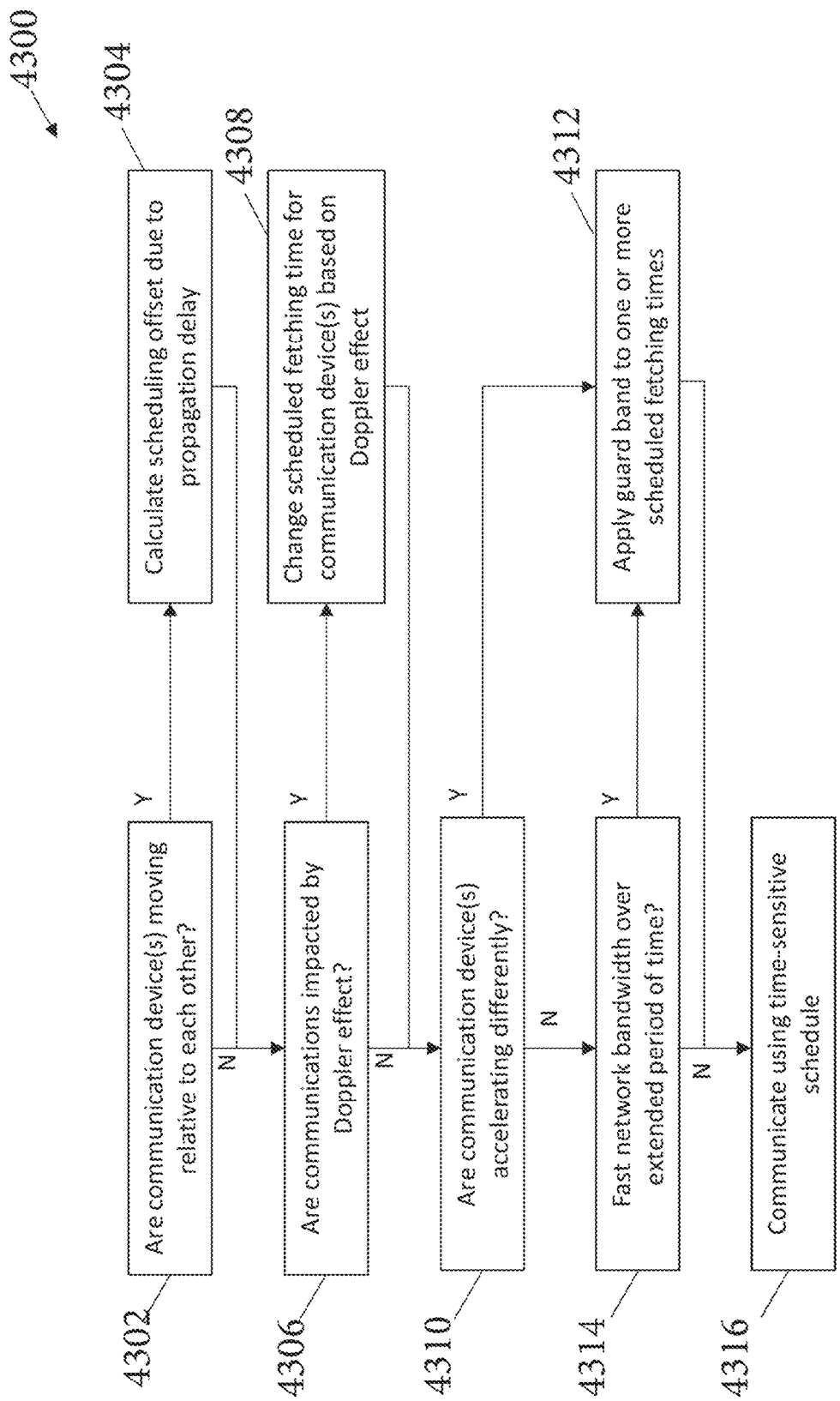
FIG. 37 illustrates a flowchart of one embodiment of a method for modifying the communication schedule of a time-sensitive network.

FIG. 37 illustrates a flowchart of one embodiment of a method 4300 for modifying the communication schedule of a time-sensitive network. The method 4300 represent operations performed by the scheduling device 3710 or one or more other devices of the time-sensitive network 3702 to account for various factors that could negatively impact the communication of data frames in the network 3702, as described herein.

At 4302, a determination is made as to whether communication devices are moving relative to each other. For example, the scheduling device 3710 can examine locations, accelerations, moving speeds, or the like, as reported by sensors on board one or more of the communication devices 3706, 3716. The sensors can include, but are not limited to, global positioning system receivers, wireless triangulation systems, roadside transponders that report the passing of a vehicle 3714, cameras, or the like.

If the scheduling device 3710 determines that one or more of the communication devices 3706, 3716 are moving relative to each other, then flow of the method 4300 can proceed toward 4304. But, if the scheduling device 3710 determines that the communication devices 3706, 3716 are not moving relative to each other, or the relative movement of the communication devices 3706, 3716 is not significant when compared to the time needed to send a bit (for example, one nanosecond or one picosecond), then flow of the method 4300 can flow from 4302 toward 4306.

At 4304, a scheduling offset is calculated to account for communication propagation delay caused by relative movement between the communication devices. For example, the scheduling device 3710 can apply a temporal offset 4016 to the beginning of a subsequent communication cycle 4002, 4004. The duration of this offset 4016 may be equal to or substantially equal to (within 1%, within 3%, within 5%, or another range) the duration of the propagation delay calculated by the scheduling device 3710. The scheduling device 3710 calculates for the propagation delay based on quickly the communication devices 3706, 3716 are moving relative to each other. Flow the method 4300 can proceed from 4304 toward 4306.

At 4306, a determination is made as to whether or not communications between the communication devices are impacted by the Doppler effect. For example, the scheduling device 3710 can determine whether the movement of the communication device 3706a toward or away from the communication device 3716 results in or will result in data frames being received by the communication device 3716 from the communication device 3706a before or after corresponding scheduled fetching times 4006, 4008, 4010, and/or 4012. If the scheduling device 3710 determines that the Doppler effect will delay or advance communication of data frames due to the Doppler effect, then flow of the method 4300 can proceed toward 4308. Otherwise, if the scheduling device 3710 determines that the Doppler effect will not negatively impact communication of data frames, then flow of the method 4300 can proceed from 4306 toward 4310.

At 4308, one or more of the scheduled fetching times for one or more communication cycles are changed to account for the Doppler effect. The scheduling device 3710 can modify one or more of the fetching times 4006, 4008, 4010, 4012 in one or more subsequent or upcoming communication cycles 4002, 4004 to account for the Doppler effect. For example, if the communication device 3706a is moving toward the communication device 3716, then one or more data frames may arrive at the communication device 3716 sooner the scheduled fetching time. The scheduling device 3710 can move up the corresponding fetching time in a subsequent communication cycle based on the Doppler effect so that the data frames arrive at the correct time during the correct revised schedule of the fetching times.

If the communication device 3706a is moving away from the communication device 3716, the one or more data frames may arrive in the communication device 3716 later than the scheduled fetching time. The scheduling device 3710 can delay or push back the corresponding fetching time in a subsequent communication cycle based on the Doppler effect. This results the data frames arrive at the correct time during the correct revised schedule of the fetching times.

Flow of the method 4300 can proceed from 4308 toward 4310.

At 4310, a determination is made as to whether or not the communication devices are accelerating differently. The scheduling device 3710 can determine if the communication devices 3706, 3716 are located at different elevations and thereby experiencing different accelerations due to differences in gravity. The scheduling device 3710 can determine whether the communication devices 3706, 3716 are located on or above portions of the earth having different densities (which can cause changes in accelerations due to changes in gravitational pull). The scheduling device 3710 can determine whether the communication devices are experiencing different accelerations based on locations of the communication devices 3706, 3716 as reported to the scheduling device 3710. If the communication devices 3706, 3716 are accelerating differently, the flow of the method 4300 can proceed from 4310 toward 4312. But, if the communication devices 3706, 3716 are not accelerating differently, then flow of the method 4300 can proceed from 4310 toward 4314.

At 4314, a determination is made as to whether or not the time-sensitive network has fast network bandwidth over extended slot of time. For example, the scheduling device 3710 may determine whether data frames are communicated within the time-sensitive network 3702 at speeds of at least ten gigabytes per second (Gbps), forty Gbps, one hundred Gbps, four hundred Gbps, or one terabyte per second (Tbps) or faster for at least several hours, such as three or more hours at one Tbps. If data frames are being communicated within a high-bandwidth network for an extended slot of time, then flow of the method 4300 can proceed from 4314 toward 4312. Otherwise, flow the method 4300 can proceed toward 4316.

At 4312, a guard band is applied to one or more of the scheduled fetching times. The scheduling device 3710 can calculate a dynamic guard band that extends one or more of the fetching times for at least one of the communication devices. The size or duration of this guard band can be based on the difference in accelerations between the communication devices. For example, the scheduling device 3710 can apply a longer guard band if the difference in accelerations between the communication devices 3706, 3716 is large, or can apply a shorter guard band if the difference in accelerations is smaller.

The guard band may dynamically change in that the scheduling device 3710 can repeatedly determine the difference in accelerations between the communication devices 3706, 3716, and then modify the guard band as the difference in accelerations changes. The guard band may be applied by the scheduling device 3710 changing the scheduled fetching time for one or more of the communication devices 3706, 3716 to include the guard band. Flow of the method 4300 can proceed from 4312 toward 4316.

At 4316, data frames are communicated between the communication devices using the time-sensitive network schedule. If a previous communication schedule of the network 3702 was modified by the scheduling device 3710 at one or more of 4304, 4308, 4312, the communication of the data frames at 4316 may be performed using the modified, revised, updated, or new communication schedule of the network 3702. But, if the previous communication schedule was not modified at one or more of 4304, 4308, 4312, the data frames may be communicated at 4316 using the previously or currently implemented communication schedule of the network 3702.

Flow of the method 4300 can proceed from 4316 back toward 4302, or one or more other operations described in connection with the method 4300. For example, the method 4300 may proceed in a loop so that the scheduling device 3710 repeatedly determines if the communication schedule needs to be revised due to relative movements of the communication devices 3706, 3716, due to the Doppler effect, and/or due to differences in accelerations between the communication devices 3706, 3716.

In one embodiment, a method includes determining whether communication devices that communicate data frames with each other in a time-sensitive network are moving relative to each other, calculating a temporal offset based on relative movement of the communication devices, and changing a scheduled communication cycle of at least one of the communication devices based on the temporal offset.

Optionally, the scheduled communication cycle includes two or more scheduled fetching times representative of when different categories of the data frames are to be communicated. Changing the scheduled communication cycle can include advancing or delaying a start of the scheduled communication cycle and the scheduled fetching times of the scheduled communication cycle by the temporal offset.

Optionally, at least one of the communication devices wirelessly communicates the data frames in the time-sensitive network.

Optionally, the relative movement of the communication devices changes a propagation delay in communication of one or more of the data frames with at least one of the communication devices.

Optionally, the temporal offset is repeatedly calculated to account for changing speeds of the relative movement of the communication devices.

Optionally, at least one of the communication devices is onboard a moving vehicle.

In one embodiment, a method includes determining whether communication devices that communicate data frames with each other in a time-sensitive network are moving relative to each other, determining an impact of the Doppler effect on when the data frames are received by at least one of the communication devices due to relative movement between the communication devices, and contracting or delaying one or more fetching times of a scheduled communication cycle for at least one of the communication devices based on the impact of the Doppler effect.

Optionally, the scheduled communication cycle includes two or more scheduled fetching times representative of when different categories of the data frames are to be communicated. Contracting or delaying the one or more fetching times can include advancing or delaying the one or more fetching times without changing a start time of the scheduled communication cycle.

Optionally, at least one of the communication devices wirelessly communicates the data frames in the time-sensitive network.

Optionally, a compensation time that the one or more fetching times are contracted or delayed is based on how rapidly at least one of the communication devices is moving.

Optionally, at least one of the communication devices is onboard a moving vehicle.

In one embodiment, a method includes determining whether communication devices that communicate data frames with each other in a time-sensitive network have different accelerations, calculating a guard band based on the different accelerations of the communication devices, and applying the guard band to one or more scheduled fetching times of a scheduled communication cycle of at least one of the communication devices. The one or more scheduled fetching times indicate when different types of the data frames are scheduled to be communicated. The guard band extends a duration of the one or more scheduled fetching times to which the guard band is applied.

Optionally, the guard band is dynamically calculated and applied.

Optionally, at least one of the communication devices wirelessly communicates the data frames in the time-sensitive network.

Optionally, the different accelerations of the communication devices are different elevations of the communication devices.

Optionally, the different accelerations of the communication devices are different gravitational pulls on the communication devices.

Optionally, at least one of the communication devices is onboard a moving vehicle.

In one embodiment, a system includes a scheduling device of a time-sensitive network. The scheduling device is configured to determine whether communication devices that communicate data frames with each other in the time-sensitive network are moving relative to each other. The scheduling device also is configured to calculate a temporal offset based on relative movement of the communication devices and to change a scheduled communication cycle of at least one of the communication devices based on the temporal offset.

Optionally, the scheduled communication cycle includes two or more scheduled fetching times representative of when different categories of the data frames are to be communicated. The scheduling device can be configured to change the scheduled communication cycle by advancing or delaying a start of the scheduled communication cycle and the scheduled fetching times of the scheduled communication cycle by the temporal offset.

Optionally, at least one of the communication devices wirelessly communicates the data frames in the time-sensitive network.

Optionally, the relative movement of the communication devices changes a propagation delay in communication of one or more of the data frames with at least one of the communication devices.

Optionally, the scheduling device is configured to repeatedly calculate the temporal offset to account for changing speeds of the relative movement of the communication devices.

Optionally, at least one of the communication devices is onboard a moving vehicle.

In one embodiment, a system includes a scheduling device of a time-sensitive network, the scheduling device configured to determine whether communication devices that communicate data frames with each other in a time-sensitive network are moving relative to each other. The scheduling device also is configured to determine an impact of the Doppler effect on when the data frames are received by at least one of the communication devices due to relative movement between the communication devices. The scheduling device also is configured to contract or delay one or more fetching times of a scheduled communication cycle for at least one of the communication devices based on the impact of the Doppler effect.

Optionally, the scheduled communication cycle includes two or more scheduled fetching times representative of when different categories of the data frames are to be communicated. The scheduling device can be configured to contract or delay the one or more fetching times by advancing or delaying the one or more fetching times without changing a start time of the scheduled communication cycle.

Optionally, at least one of the communication devices wirelessly communicates the data frames in the time-sensitive network.

Optionally, the scheduling device is configured to contract or delay the one or more fetching times by a compensation time that is based on how rapidly at least one of the communication devices is moving.

Optionally, at least one of the communication devices is onboard a moving vehicle.

In one embodiment, a system includes a scheduling device of a time-sensitive network. The scheduling device is configured to determine whether communication devices that communicate data frames with each other in a time-sensitive network have different accelerations. The scheduling device also is configured to calculate a guard band based on the different accelerations of the communication devices. The scheduling device also is configured to apply the guard band to one or more scheduled fetching times of a scheduled communication cycle of at least one of the communication devices. The one or more scheduled fetching times indicate times at which different types of the data frames are (scheduled) to be communicated. The guard band extends a duration of the one or more scheduled fetching times to which the guard band is applied.

Optionally, the scheduling device is configured to dynamically calculate and apply the guard band.

Optionally, at least one of the communication devices wirelessly communicates the data frames in the time-sensitive network.

Optionally, the different accelerations of the communication devices are different elevations of the communication devices.

Optionally, the different accelerations of the communication devices are different gravitational pulls on the communication devices.

Optionally, at least one of the communication devices is onboard a moving vehicle.

In one embodiment, a system includes a scheduling device of a time-sensitive network. The scheduling device is configured to do at least two, or all three, of the following: (a) determine whether communication devices that communicate data frames with each other in the time-sensitive network are moving relative to each other (where the scheduling device also is configured to calculate a temporal offset based on relative movement of the communication devices and to change a scheduled communication cycle of at least one of the communication devices based on the temporal offset), (b) determine whether the communication devices that communicate data frames with each other in the time-sensitive network are moving relative to each other (where the scheduling device also is configured to determine an impact of the Doppler effect on when the data frames are received by at least one of the communication devices due to relative movement between the communication devices, the scheduling device also configured to contract or delay one or more fetching times of a scheduled communication cycle for at least one of the communication devices based on the impact of the Doppler effect), and/or (c) determine whether the communication devices that communicate the data frames with each other in the time-sensitive network have different accelerations (where the scheduling device also is configured to calculate a guard band based on the different accelerations of the communication devices, and the scheduling device also is configured to apply the guard band to one or more scheduled fetching times of a scheduled communication cycle of at least one of the communication devices, the one or more scheduled fetching times indicating times at which different types of the data frames are to be communicated, where the guard band extends a duration of the one or more scheduled fetching times to which the guard band is applied).

Optionally, the communication devices communicate, and/or are configured to communicate, the data frames based on the scheduled communication cycle that is changed, and/or based on the one or more fetching times that are contracted or delayed, and/or based on the guard band that is applied.

One or more embodiments of the subject matter described herein relate to systems and methods that use symmetrically communicated secret information in time-sensitive networking to increase cybersecurity. The systems and methods can use a quantum and classical channel to securely generate and distribute a common shared secret for information-theoretic security, also known as perfect cybersecurity, for time-sensitive networking. This shared secret is information that is not publicly available outside of the parties or devices that exchange the information. The information can include an encryption key, an indication of non-repudiation, hashing information (e.g., a data hash), etc. While the description herein may focus on the sharing of encryption keys, not all embodiments are limited to the sharing of encryption keys.

Quantum key distribution can be used to protect time-sensitive networking while time-sensitive networking provides support for implementing quantum key distribution. Precise synchronization and timing are needed on the quantum channel and efficient utilization of the classical channel is required to generate quantum keys at higher and more deterministic rates for use in time-sensitive networking. Quantum key distribution uses components of quantum mechanics by allowing computing devices (e.g., computers, sensors, controllers, etc.) to produce a shared random secret key known only to the computing devices. This shared key is used to encrypt and decrypt messages communicated between the computing devices. Information can be encoded in quantum states (e.g., qubits) instead of bits, which allows the computing devices to detect when a third party computing device is attempting to detect or listen in to the communications using the quantum key. This third party attempt can slightly introduce errors during reception of the shared quantum key, which is detected by one or more of the computing devices.

In one embodiment, a control system and method for a time-sensitive network transmits symmetric secret information (e.g., information that is not publicly available outside of the parties or devices that exchange the information) through the time-sensitive network using deterministic scheduling of the network to enforce the life-time of the secret information. The life-time of the secret information can be for the exchange of a single message in the network. For example, a quantum key can be created and shared between computing devices that are communicating through or via the time-sensitive network, with the key only being valid and used for the sending of a single message from one computing device to another computing device, and not for any reply or other message between the computing devices. At least one technical effect of the subject matter described herein provides for increased security in the communication of time-sensitive packets in a time-sensitive network. This can help ensure the safe and secure communication of information that is communicated in a time critical manner.

The computing devices can use a schedule dictated by a scheduler device of the time-sensitive network to determine when to communicate time-sensitive messages, and the scheduler device can create the schedule to generate secret information for the computing devices so that each secret information is used for the communication of only a single message in the time-sensitive network. The valid life-time of the secret information is determined by scheduled time-sensitive network windows or via output from the scheduler device of the time-sensitive network. After the life-time of the key or the scheduled window has expired, the secret information is no longer valid for communications via the time-sensitive network. The time periods or windows over which the secret information is valid are very short, tightly-controlled timescales.

Figure 38:
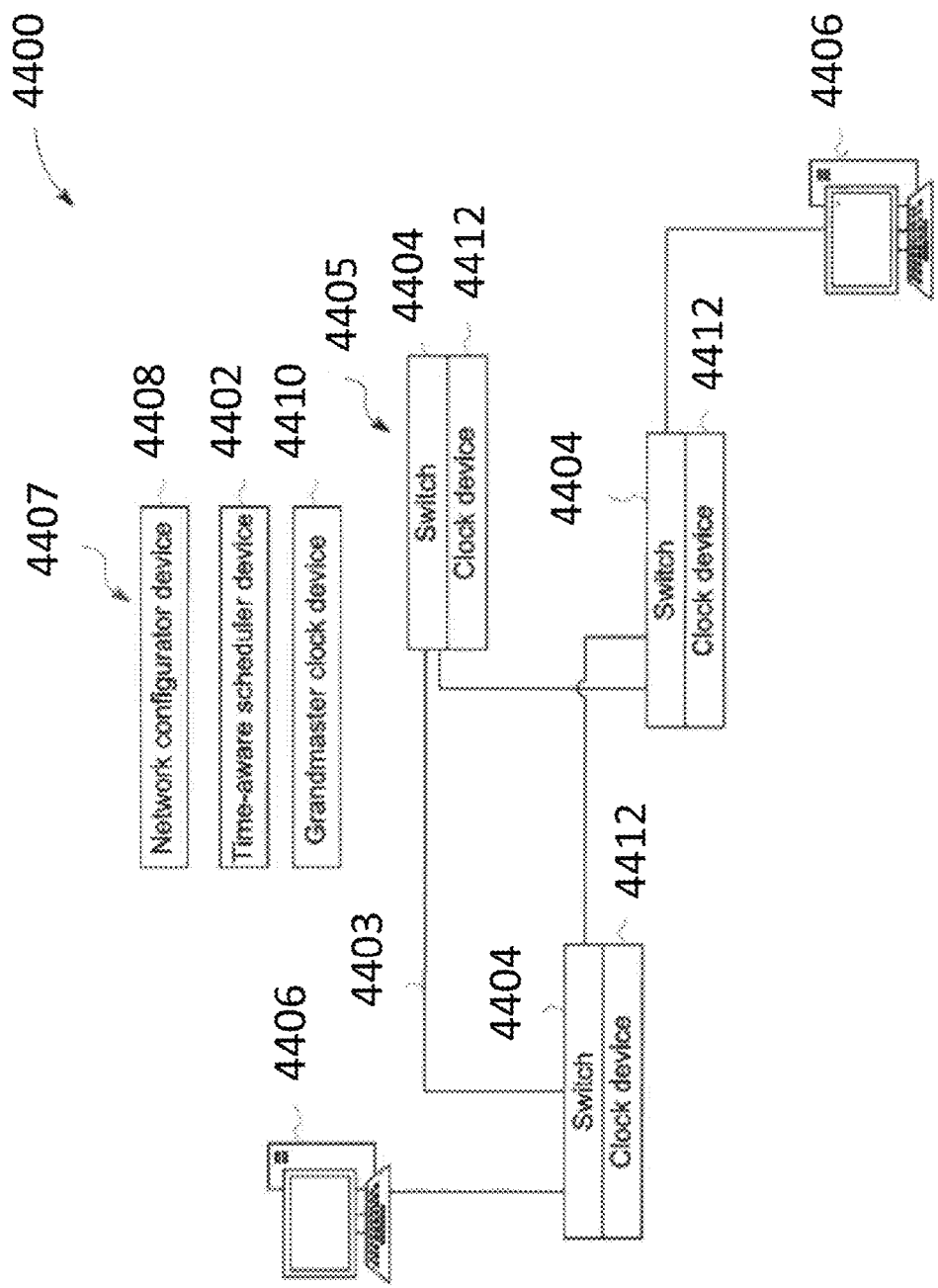
FIG. 38 schematically illustrates one embodiment of a network control system of a time-sensitive network system.

FIG. 38 schematically illustrates one embodiment of a network control system 4407 of a time-sensitive network system 4400. The components shown in FIG. 38 represent hardware circuitry that includes and/or is connected with one or more processors (e.g., one or more microprocessors, field programmable gate arrays, and/or integrated circuits) that operate to perform the functions described herein. The components of the network system 4400 can be communicatively coupled with each other by one or more wired and/or wireless connections. Not all connections between the components of the network system 4400 are shown herein. The network system 4400 can be a time-sensitive network in that the network system 4400 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3br™-2016 Standard.

The network system 4400 includes several nodes 4405 formed of network switches 4404 and associated clocks 4412 ("clock devices" in FIG. 38). While only a few nodes 4405 are shown in FIG. 38, the network system 4400 can be formed of many more nodes 4405 distributed over a large geographic area. The network system 4400 can be an Ethernet network that communicates data signals along, through, or via communication links 4403 between computing devices 4406 (e.g., computers, control systems, sensors, etc.) through or via the nodes 4405. The links 4403 can represent one or more of a variety of different communication paths, such as Ethernet links, optical links, copper links, and the like. The data signals are communicated as data packets sent between the nodes 4405 on a schedule of the network system 4400, with the schedule restricted what data signals can be communicated by each of the nodes 4405 at different times.

For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 4407 includes a time-aware scheduler device 4402 that enables each interface of a node 4405 to transmit an Ethernet frame (e.g., between nodes 4405 from one computer device 4406 to another device 4406) at a prescheduled time, creating deterministic traffic flows while sharing the same media with legacy, best-effort Ethernet traffic. The time-sensitive network 4400 has been developed to support hard, real-time applications where delivery of frames of time-critical traffic must meet tight schedules without causing failure, particularly in life-critical industrial control systems. The scheduler device 4402 computes a schedule that is installed at each node 4405 in the network system 4400. This schedule dictates when different types or classification of signals are communicated by the switches 4404.

The scheduler device 4402 remains synchronized with a grandmaster clock device 4410 that includes is a clock to which clock devices 4412 of the nodes 4405 are synchronized. A centralized network configurator device 4408 of the control system 4407 is comprised of software and/or hardware that has knowledge of the physical topology of the network 4400 as well as desired time-sensitive network traffic flows. The configurator device 4408 can be formed from hardware circuitry that is connected with and/or includes one or more processors that determine or otherwise obtain the topology information from the nodes 4405 and/or user input. The hardware circuitry and/or processors of the configurator device 4408 can be at least partially shared with the hardware circuitry and/or processors of the scheduler device 4402.

The topology knowledge of the network system 4400 can include locations of nodes 4405 (e.g., absolute and/or relative locations), which nodes 4405 are directly coupled with other nodes 4405, etc. The configurator device 4408 can provide this information to the scheduler device 4402, which uses the topology information to determine the schedules for communication of secret information (e.g., encryption keys) and messages between the devices 4406 (that may be encrypted using the secret information). The configurator device 4408 and/or scheduler device 4402 can communicate the schedule to the different nodes 4405.

A link layer discovery protocol can be used to exchange the data between the configurator device 4408 and the scheduler device 4402. The scheduler device 4402 communicates with the time-aware systems (e.g., the switches 4404 with respective clocks 4412) through a network management protocol. The time-aware systems implement a control plane element that forwards the commands from the centralized scheduler device 4402 to their respective hardware.

In one embodiment, the configurator device 4408 creates and distributes secret information, such as quantum encryption keys, among the computing devices 4406 for time-sensitive network cybersecurity. Quantum states can be robustly created for the quantum keys using time-bin encoding, which can require extremely small-time scales to increase the quantum key rate (e.g., the rate at which the encryption keys are created).

Time-sensitive networks can be used in life-critical industrial control applications such as the power grid where cybersecurity is important. The configurator device 4408 can use quantum mechanics in the form of quantum photonics to create and share secret information, such as quantum keys. There are many variants of quantum keys that impact both the quantum and classical channels. A quantum state is exchanged between the devices 4406 over a quantum channel in the network and is protected by the physics of quantum mechanics. A third party eavesdropper is detected by causing a change to the quantum state. Then a series of classical processing is performed to extract and refine the key material. This processing can involve sifting or extraction of the raw key, quantum bit error rate estimation, key reconciliation, and privacy amplification and authentication. This series of classical processing usually requires a public channel, typically by means of TCP connections in the network. For the classical channel, current implementations of quantum key distribution rely upon TCP. However, operating directly over Ethernet with time-sensitive networks can be more efficient. TCP guarantees that the information exchanged on the public channel is delivered. However, it is vulnerable to congestion and to Denial of Service (DoS) attacks that disrupt key generation. TCP congestion can have a significant impact on the quantum key generation rate.

On the contrary, time-sensitive networking via the scheduler device 4402 can guarantee the delivery of the information and be more efficient. The time-sensitive network can remove the need for handshaking processes, resending of TCP segments, and rate adjustment by the scheduler device 4402 scheduling or otherwise allocating dedicated time slots for secret information generation and distribution. Implementing the classical channel over a time-sensitive network eliminates variability and ensures more robust and deterministic generation of secret information, which can be required by a time-sensitive network.

Control of a quantum channel in the network 4400 requires precise timing that time-sensitive networks provide. The quantum channel can be a dedicated link 4403, such as a fiber optic connection, between the devices 4406, or can be available bandwidth space within the network 4400. The quantum state can be encoded in various ways, including polarization. Alternatively, time-bin encoding and entanglement can be used for encoding the quantum state in the secret information. Time-bin encoding implements the superposition of different relative phases onto the same photon. Quantum measurement is implemented by measuring the time of arrive of the photon. This requires precise and stable time synchronization, typically an accuracy of thirty nanoseconds is required.

An eavesdropper will cause the quantum bit error rate of the secret information to increase, thereby alerting the configurator device 4408 to the presence of the eavesdropper. Because the time-sensitive network 4400 is assumed to provide deterministic traffic flow for life-critical control systems, a reaction to an attack by the configurator device 4408 maintains determinism throughout the network 4400. For example, if the time-sensitive network flow shares the optical channel used by the quantum secret information, then the quantum and classical communication flows may be rerouted by the configurator device 4408 to avoid potential tampering. Stated differently, the time-sensitive communications sent between the switches 4404 (according to the schedules dictated by the scheduler device 4402) and the quantum secret information can be communicated over the same links 4403 in the network 4400. The configurator device 4408 can maintain the existing schedule solution for the links 4403 that are safe (where no third party action occurred), and removing the link or links 4403 exhibiting greater or higher quantum bit error rates from use in the network 4400.

For example, the configurator device 4408 can monitor the quantum bit error rate on or in the links 4403 of the time sensitive network 4400. The configurator device 4408 can detect an increase in the quantum bit error rate in one link 4403 relative to the quantum bit error rate in one or more (or all) other links 4403 in the network 4400. The configurator device 4408 can then remove the link 4403 with the larger error rate from the configuration of the network 4400 and can inform the scheduler device 4402 of this removal. The scheduler device 4402 can then update or revise the schedule(s) for the time sensitive network 4400 with this link 4403 being removed and, therefore, not used for the communication of time-sensitive signals or messages, or for the communication of secret information.

Figure 39:
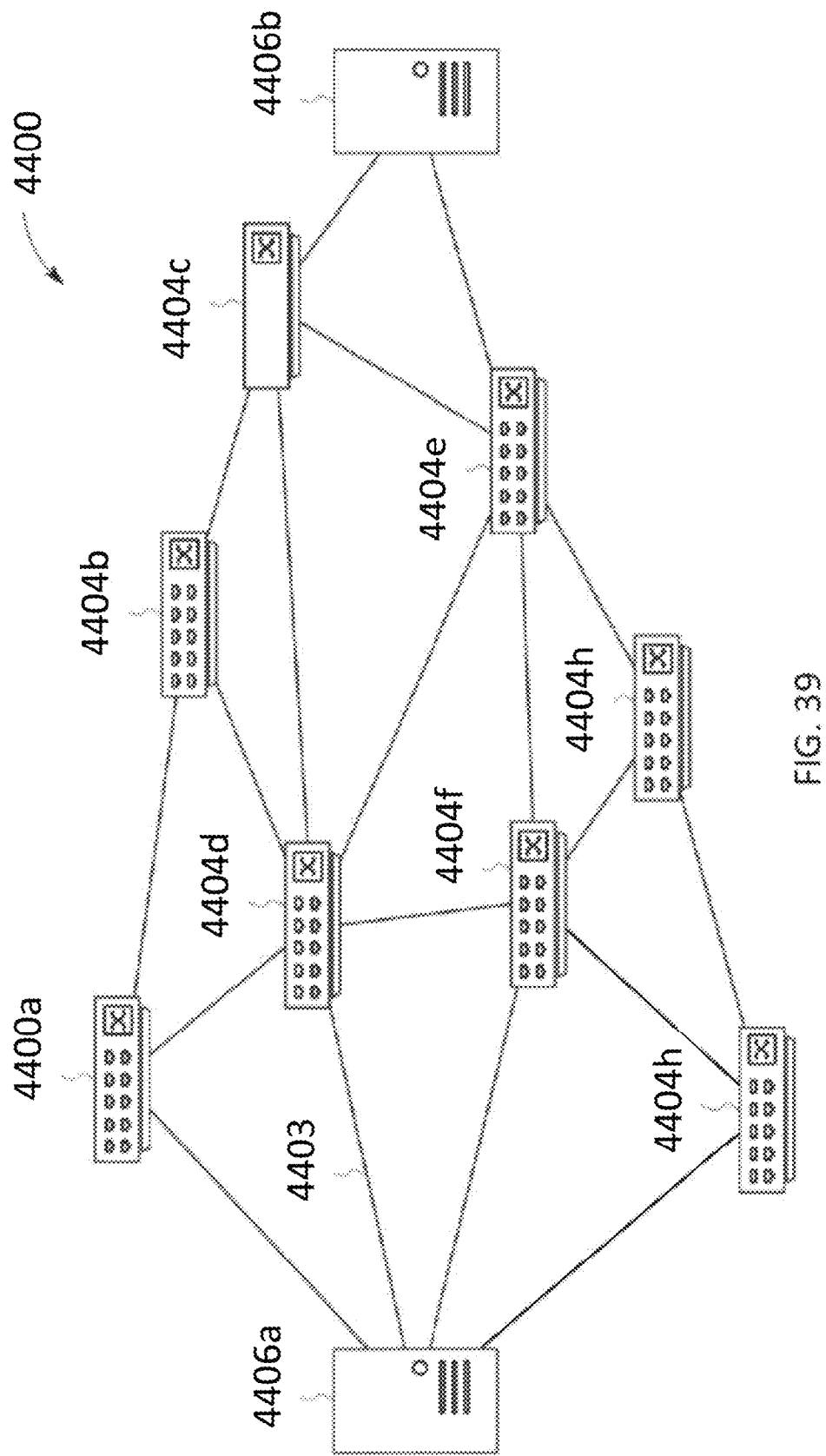
FIG. 39 is another illustration of the time-sensitive network system shown in FIG. 38.

As a result, the scheduler device 4402 finds or creates a schedule that maintains the existing safe flows of messages and adds a new flow that bypasses the suspected link. FIG. 39 is another illustration of the time-sensitive network 4400 shown in FIG. 38. As described above, plural computing devices 4406 (e.g., devices 4406A, 4406B in FIG. 39) communicate frames of messages with each other on a schedule dictated by the scheduler device 4402. The frames are sent from the device 4406A to the device 4406B along one or more paths defined by a combination of links 4403 and switches 4404 (e.g., switches 4404A-H in FIG. 39). The secret information can be exchanged along a first path (e.g., the path that is formed by the switches 4404C, 4404D and the links 4403 between the devices 4406A, 4406B and the switches 4404C, 4404D), and time-sensitive messages can be exchanged along another path that does not include any of the same links 4403 or switches 4404, or that includes at least one different link 4403 or switch 4404. For example, the messages can be sent along a path that extends through the switches 4404G, 4404F, 4404E and the links 4403 that connect the devices 4406A, 4406B and the switches 4404G, 4404F, 4404E. The path used to exchange the secret information can be referred to as the quantum channel.

In one embodiment, the schedule for the network 4400 is created by the configurator device 4408 to include the constraints of creating and transmitting the secret information (e.g., the quantum key) to protect an Ethernet frame. For example, the configurator device 4408 may solve a system of scheduling equations to create a time-sensitive schedule for the switches to send Ethernet frames in a time-sensitive manner in the network 4400. This schedule may be subject to various constraints, such as the topology of the network 4400, the speed of communication by and/or between switches in the network 4400, the amount of Ethernet frames to be communicated through different switches, etc. This schedule can be created to avoid two or more Ethernet frames colliding with each other at a switch (e.g., to prevent multiple frames from being communicated through the same switch at the same time). One additional constraint for generation of the time-sensitive schedule by the configurator device 4408 can be the generation and communication of the secret information through the time-sensitive network 4400. For example, the schedule may include or be required to include time(s) dedicated to communication of only the shared information along or via one or more links in the network 4400. Other frames may not be allowed by the schedule to be communicated during these dedicated times. The configurator device 4408 may be restricted to generating the time-sensitive schedule to include these times dedicated to communication of the secret information.

The configurator device 4408 can detect an increase in the quantum bit error rate in one or more of the links 4403, such as the link 4403 between the switches 4404C, 4404D. Detection of this increase can cause the configurator device 108 to stop sending the secret information between the devices 4406A, 4406B across, through, or via the link 4403 between the switches 4404C, 4404D. This increase can indicate that an unauthorized third party is attempting to obtain or change the secret information exchanged between the devices 4406A, 4406B. The configurator device 4408 can change to sending the secret information between the devices 4406A, 4406B (or directing the devices 4406A, 4406B to send the secret information) through, across, or via a path that extends through the switches 4404A, 4404B, 4404C (and the links 4403 between these switches 4404A, 4404B, 4404C). This causes the secret information to avoid or no longer be communicated through or over the link 4403 associated with the increase in the quantum bit error rate. This increases security in the network 4400, as the configurator device 4408 can repeatedly change which paths are used or dedicated for exchanging secret information so as to avoid those portions of network paths that are associated with increases in the quantum bit error rate.

Another approach to an increasing or a suspiciously high quantum bit error rate is to decrease lifetimes of the secret information and thereby generate new secret information at a faster rate. For example, the configurator device 4408 can create or instruct the devices 4406A, 4406B to create a new quantum of secret information for each message that is exchanged between the devices 4406A, 4406B. If the device 4406A is a sensor and the device 4406B is a controller that changes operation of a powered system in response to a sensed parameter, then a first quantum of secret information can be created and used to encrypt and send a first message from the sensor device 4406A to the controller device 4406B (that includes sensed information from the sensor device 4406A). The controller device 4406B can receive the encrypted message, decrypt the message, and perform an action based on the sensed parameter. The controller device 4406B can send a message back to the sensor device 4406A using a different quantum of secret information, such as an encrypted confirmation message indicating receipt of the sensed parameter. Subsequent sensed parameters can be communicated using messages each encrypted with a different quantum of secret information.

For example, the scheduler device 4402 can compute a secret information update rate that is a given or designated fraction of the time-sensitive network frame transmission rate. This fraction can be less than one such that a new quantum of secret information is created for each message or each frame of a message. Stated differently, a new encryption key can be generated and used for encrypting each time-sensitive network frames that is sent between the devices 4406. The secret information can be symmetric secret information that is transmitted through the time-sensitive network 4400 using deterministic scheduling to enforce the life-time of the secret information (e.g., which can be as short as the exchange of a single frame or a single message formed of two or more frames). Such a constraint is added to the scheduler device 4402 so that the scheduler device 4402 will find a schedule that is feasible for the given topology, requested flow latency, frame sizes, and update rate of the secret information for each link 4403. For example, the scheduler device 4402 can balance (e.g., adjust) the scheduled time periods of when new quantum keys are exchanged, when time-sensitive frames are communicated, when best effort frames are communicated, and the like, to ensure that the time-sensitive frames are successfully communicated between the devices 4406 within designated time limits while also providing a new encryption key for each message or each frame.

Figure 40:
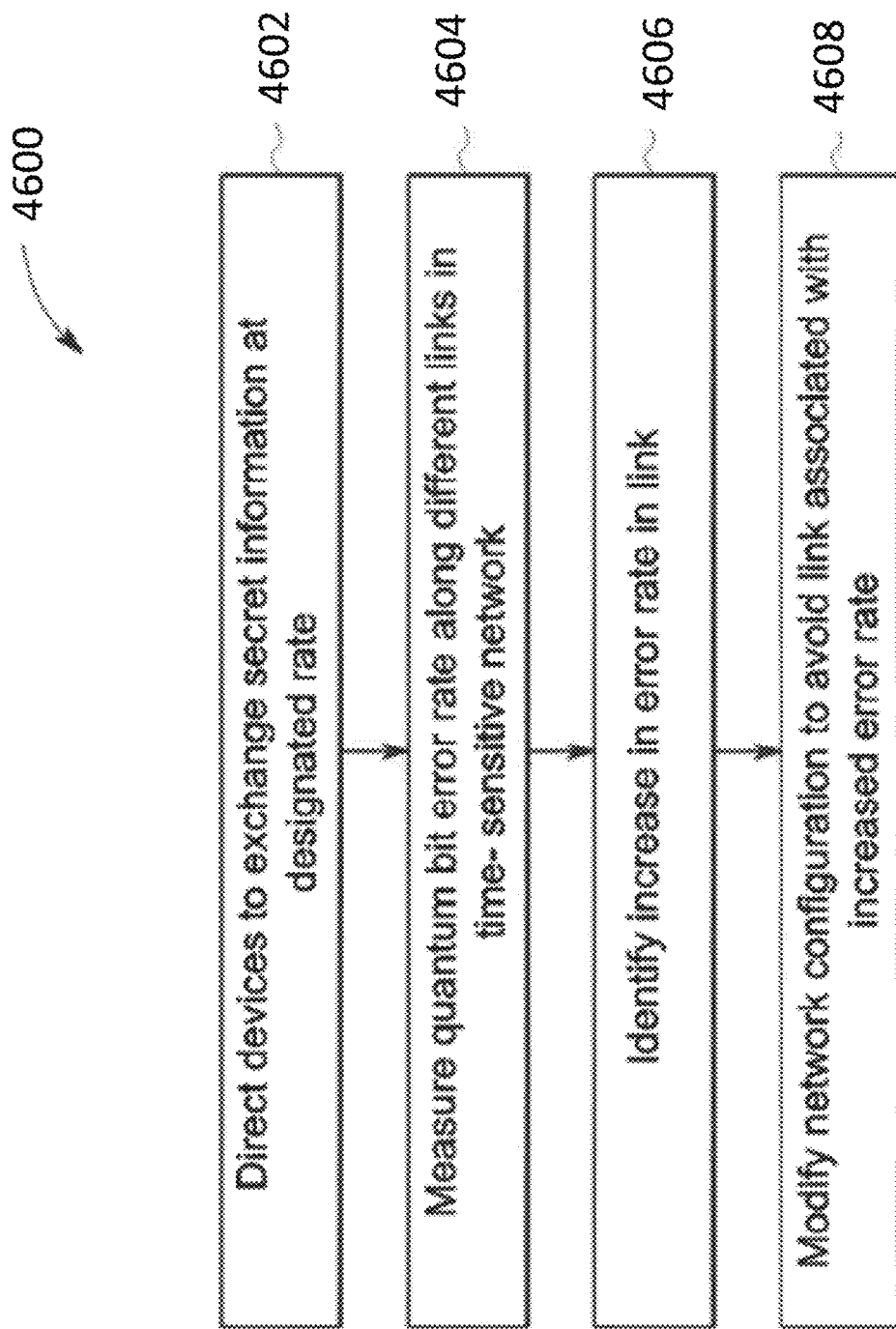
FIG. 40 illustrates a flowchart of one embodiment of a method for securing communications in a time-sensitive network.

FIG. 40 illustrates a flowchart of one embodiment of a method 4600 for securing communications in a time-sensitive network. The method 4600 can represent operations performed by the control system 4407 (e.g., by the configurator device 4408 and/or the scheduler device 4402). At 4602, computing devices are directed to exchange secret information at a designated rate. For example, the configurator device 4408 or scheduler device 4402 can instruct the devices 4406 to exchange encryption keys at a designated rate so that a new key is created on a repeating basis. In one embodiment, the configurator device 4408 or scheduler device 4402 instructs the devices 4406 to create a new portion of secret information for each message that is sent from one device 4406 to another device 4406. A message is formed from two or more data frames in an Ethernet network such as the network system 4400. Optionally, the configurator device 4408 or scheduler device 4402 can instruct the devices 4406 to create a new portion of secret information at a greater or faster rate, such as for each frame of a message formed from two or more frames.

At 4604, an error rate along one or more links in the time-sensitive network is measured. For example, the configurator device 4408 can measure the quantum bit error rate along each link 4403 in a quantum channel between the devices 4406. This channel may be dedicated to exchanging secret information between the devices 4406, and can be formed of a combination of links 4403 and switches 4404. The configurator device 4408 can measure or calculate the quantum bit error rate in each link 4403 along this channel.

At 4606, in increase in the error rate of one or more of the links that is monitored is identified. For example, the configurator device 4408 can determine that the quantum bit error rate in a link 4403 between two switches 4404 is increasing or is increasing by more than a designated threshold (e.g., more than 10%). This increase can indicate that an unauthorized third party is attempting to obtain the secret information along the quantum channel. As a result, the configurator device 4408 can identify which link 4403 is associated with the increased error rate and can instruct the scheduler device 4402 to modify the communication schedules of the time-sensitive network.

At 4608, the configuration of the network is modified to avoid exchanging the secret information over the link associated with the increased error rate. For example, the configurator device 4408 can instruct the scheduler device 4402 to no longer communicate quantum keys along, through, or over the link 4403 associated with the increased error rate. The scheduler device 4402 can modify the schedule of the time-sensitive network to allow for the secret information to be exchanged over a different path, while scheduling sufficient resources for successful and timely communication of time-sensitive messages.

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the quantum bit error rates are measured in the links that form a quantum channel between computing devices that is dedicated to exchanging the secret information.

Optionally, modifying the configuration of the time-sensitive network includes changing a schedule for communication of the secret information, time-sensitive messages, and best-effort messages within the time-sensitive network.

Optionally, changing the schedule includes changing which of the links are used to form a dedicated quantum channel over which the secret information is exchanged between computing devices.

Optionally, the method also includes instructing computing devices that exchange the secret information to change the secret information at a rate that is a fraction of a rate at which one or more of messages or frames of the messages are exchanged between the computing devices.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the one or more processors are configured to measure the quantum bit error rates in the links that form a quantum channel between computing devices that is dedicated to exchanging the secret information.

Optionally, the one or more processors are configured to modify the configuration of the time-sensitive network by changing a schedule for communication of the secret information, time-sensitive messages, and best-effort messages within the time-sensitive network.

Optionally, the one or more processors are configured to change the schedule by changing which of the links are used to form a dedicated quantum channel over which the secret information are exchanged between computing devices.

Optionally, the one or more processors are configured to instruct computing devices that exchange the secret information to change the secret information at a rate that is a fraction of a rate at which one or more of messages or frames of the messages are exchanged between the computing devices.

Optionally, the one or more processors are configured to instruct the computing devices to change the secret information at least once for each new message of the messages that are exchanged between the computing devices.

Optionally, the one or more processors are configured to instruct the computing devices to change the secret information at least once for each frame of each new message of the messages that are exchanged between the computing devices.

In one embodiment, a method includes instructing computing devices that communicate messages with each other via a time-sensitive network to encrypt the messages using a secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

Optionally, the secret information includes one or more of a quantum encryption key, an indication of non-repudiation, or a data hash.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

Optionally, the method includes measuring quantum bit error rates in links between switches in the time-sensitive network, identifying an increase in the quantum bit error rate in a monitored link of the links between the switches, and modifying a configuration of the time-sensitive network so that the secret information is not exchanged between the computing devices over the monitored link associated with the increase in the quantum bit error rate.

Optionally, the quantum bit error rates are measured in the links that form the quantum channel.

Optionally, modifying the configuration of the time-sensitive network includes changing a schedule for communication of the secret information, time-sensitive messages, and best-effort messages within the time-sensitive network.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A vehicle control system comprising:
a controller configured to control communication between or among plural vehicle devices that control operation of a vehicle via a network that communicatively couples the vehicle devices, the controller configured to control the communication using a data distribution service (DDS) and with the network operating as a time sensitive network (TSN),
wherein the controller is configured to:
concurrently direct and designate a first set of the vehicle devices to communicate using time sensitive communications, a different, second set of the vehicle devices to communicate using best effort communications, and a different, third set of the vehicle devices to communicate using rate constrained communications; and
determine data transmission schedules within the TSN based on quality of service (QoS) parameters.

2. The vehicle control system of claim 1, wherein the network is an Ethernet network at least partially disposed onboard the vehicle.

3. The vehicle control system of claim 1, wherein the vehicle devices include two or more of an input or output device, an engine control unit, a traction motor controller, a display device, an auxiliary load controller, or one or more sensors.

4. The vehicle control system of claim 3, wherein one or more of the engine control unit or the traction motor controller is included in the first set of the vehicle devices using the time sensitive communications.

5. The vehicle control system of claim 1, wherein the controller is configured to concurrently direct the first set of the vehicle devices to communicate using the time sensitive communications such that the time sensitive communications are completed using bandwidth of the network while the second and third set of the vehicle devices communicate the best effort communications and the rate constrained communications using a remaining amount of bandwidth of the network that is not used by the time sensitive communications.

6. The vehicle control system of claim 1, wherein the controller is configured to receive data frames via the time sensitive network, determine classifications for the data frames, communicate the data frames based on the data transmission schedule, and control one or more operations of the vehicle based on the data frames that are communicated.

7. The vehicle control system of claim 6, wherein the controller is configured to determine the classifications for the data frames based on a presence of at least one pattern in the data frames.

8. The vehicle control system of claim 7, wherein the controller includes a ternary content addressable memory and is configured to determine the presence of the at least one pattern based on a comparison of data in the data frames to a pattern data map received at the ternary content addressable memory.

9. The vehicle control system of claim 1, further comprising: a linking gateway coupled to the controller and configured to selectively permit and prevent the communication to pass between the first set of the vehicle devices, the second set of the vehicle devices, and third set of the vehicle devices.

10. The vehicle control system of claim 1, wherein:
the vehicle is coupled to one or more other vehicles; and
the plural vehicle devices include one or more first vehicle devices onboard the vehicle and one or more second vehicle devices onboard the one or more other vehicles.

11. The vehicle control system of claim 10, wherein the vehicle and the one or more other vehicles comprise rail vehicles in a consist.

12. The vehicle control system of claim 1, wherein the data transmission schedules provide times at which data is communicated within the TSN at nodes along a communication path.

13. The vehicle control system of claim 12, wherein the data transmission schedule provides the communication path.

14. A method for controlling one or more operations of a vehicle, the method comprising:
- controlling communication between or among plural vehicle devices that control operation of a vehicle via a network that communicatively couples the vehicle devices, the communication controlled using a data distribution service (DDS) and with the network operating as a time sensitive network (TSN);
- directing and designating a first set of the vehicle devices to communicate using time sensitive communications;
- concurrently directing and designating a different, second set of the vehicle devices to communicate using best effort communications; and
- concurrently directing and designating a different, third set of the vehicle devices to communicate using rate constrained communications; and
- determining a data transmission schedule within the TSN based on quality of service (QoS) parameters.

15. The method of claim 14, wherein directing the first set of the vehicle devices includes controlling operation of one or more of an engine control unit or a traction motor controller of the vehicle using the time sensitive communications.

16. The method of claim 14, wherein directing the first set of the vehicle devices to communicate using the time sensitive communications includes completing the time sensitive communications using bandwidth of the network, and
- wherein concurrently directing the second set of the vehicle devices to communicate using the best effort communications and concurrently directing the third set of the vehicle devices to communicate using the rate constrained communications are completed using a remaining amount of bandwidth of the network that is not used by the time sensitive communications.

17. The method of claim 14, further comprising:
- receiving data frames via the time sensitive network;
- determining classifications for the data frames; and
- controlling one or more operations of the vehicle based on the data frames.

18. The method of claim 14, further comprising:
- receiving the data transmission schedule for communication of data frames to one or more of the vehicle devices via the time sensitive network;
- receiving destinations for the data frames;
- receiving an upper limit on a tolerable latency for the data frames;
- communicating one or more of the data frames according to the data transmission schedule;
- accessing the one or more of the vehicle devices;
- verifying that the one or more data frames were communicated to the one or more of the vehicle devices within the upper limit on the tolerable latency based on accessing the one or more of the vehicle devices; and
- controlling one or more operations of the vehicle based on the one or more data frames that are communicated.

19. The method of claim 14 comprising:
- communicating with the first set of the vehicle devices using time sensitive communications based on designating the first set of the vehicle devices to communicate using the time sensitive communications;
- communicating with the second set of the vehicle devices using best effort communications based on designating the second set of the vehicle devices to communicate using the best effort communications; and
- communicating with the third set of the vehicle devices using rate constrained communications based on designating the third set of the vehicle devices to communicate using the rate constrained communications.

20. The method of claim 14, wherein the data transmission schedule provides times at which data is communicated within the TSN at nodes along a communication path.

21. A vehicle control system comprising:
- a controller configured to control communication between or among plural vehicle devices that control operation of a vehicle via an Ethernet network that communicatively couples the vehicle devices, the controller configured to control the communication using a data distribution service (DDS) and with the network operating as a time sensitive network (TSN),
- wherein the controller is configured to concurrently direct a first set of the vehicle devices to communicate using time sensitive communications, a different, second set of the vehicle devices to communicate using best effort communications, and a different, third set of the vehicle devices to communicate using rate constrained communications,
- wherein the controller is configured to:
  - concurrently direct and designate the first set of the vehicle devices to communicate using the time sensitive communications such that the time sensitive communications are completed using bandwidth of the network while the second and third set of the vehicle devices communicate the best effort communications and the rate constrained communications using a remaining amount of bandwidth of the network that is not used by the time sensitive communications; and
  - determine data transmission schedules within the TSN based on quality of service (QoS) parameters.

22. The vehicle control system of claim 21, wherein the controller is configured to receive data frames via the time sensitive network, determine classifications for the data frames, and control one or more operations of the vehicle based on the data frames.

23. The vehicle control system of claim 22, wherein the controller is configured to determine the classifications for the data frames based on a presence of at least one pattern in the data frames.

24. The vehicle control system of claim 21, wherein the data transmission schedules provide times at which data is communicated within the TSN at nodes along a communication path.

* * * * *